(12) United States Patent
Daneshvar et al.

(10) Patent No.: US 11,317,305 B2
(45) Date of Patent: Apr. 26, 2022

(54) USER INTERFACE FOR MIMO NETWORKS

(71) Applicant: SILVUS TECHNOLOGIES, INC., Los Angeles, CA (US)

(72) Inventors: Neema Daneshvar, Los Angeles, CA (US); Ajit Warrier, Los Angeles, CA (US); Chris Nersesyan, Los Angeles, CA (US); Jimi Henderson, La Mesa, CA (US); Weijun Zhu, Walnut, CA (US)

(73) Assignee: SILVUS TECHNOLOGIES, INC., Los Angeles, CA (US)

( * ) Notice: Subject to any disclaimer, the term of this patent is extended or adjusted under 35 U.S.C. 154(b) by 64 days.

(21) Appl. No.: 17/010,629

(22) Filed: Sep. 2, 2020

(65) Prior Publication Data

US 2021/0067988 A1    Mar. 4, 2021

Related U.S. Application Data

(60) Provisional application No. 62/895,376, filed on Sep. 3, 2019.

(51) Int. Cl.
*H04W 24/08* (2009.01)
*H04W 16/14* (2009.01)
*H04B 7/0413* (2017.01)
*H04W 40/20* (2009.01)
*H04B 17/15* (2015.01)

(52) U.S. Cl.
CPC .......... *H04W 24/08* (2013.01); *H04B 7/0413* (2013.01); *H04B 17/15* (2015.01); *H04W 16/14* (2013.01); *H04W 40/20* (2013.01)

(58) Field of Classification Search
CPC ..... H04W 24/08; H04W 16/14; H04W 40/20; H04W 76/45; H04W 16/18; H04W 40/02; H04W 4/029; H04W 64/003; H04W 24/10; H04W 4/06; H04W 72/00; H04W 64/00; H04W 4/33; H04W 84/12; H04W 4/90; H04B 7/0413; H04B 17/15; H04B 17/23; H04B 17/391; H04B 17/318; H04L 47/23; G01S 1/0428; G01S 5/0252; G01S 1/042; G01S 19/46; G06F 3/0481
See application file for complete search history.

(56) References Cited

U.S. PATENT DOCUMENTS

2011/0314145 A1* 12/2011 Raleigh ............... H04L 43/0882
709/224
2019/0053293 A1*  2/2019 Akoum ................ H04W 24/10

OTHER PUBLICATIONS

SC3500 Quick Start Guide CSMA, Doc. 10009C000 Version 1.2, dated May 10, 2012; 10 pages.
SteamCaster MIMO Radio User Manual, Doc. 10017C000 Version 3.12, dated Jun. 2, 2015; 70 pages.
SteamCaster MIMO Radio User Manual, Doc. 10017C000 Version 3.12.5, dated Oct. 7, 2016; 92 pages.
SteamCaster MIMO Radio User Manual, Doc. 10017C000 Version 3.15.0.3, dated Sep. 4, 2018; 146 pages.

(Continued)

*Primary Examiner* — Fred A Casca
(74) *Attorney, Agent, or Firm* — Knobbe Martens Olson & Bear, LLP

(57) ABSTRACT

A graphical user interface for use with one or more radios in a network can include any number of interfaces for providing access to features associated with one or more radios or the network.

23 Claims, 46 Drawing Sheets

(56) References Cited

OTHER PUBLICATIONS

SteamCaster MIMO Radio User Manual, Doc. 10017C000 Version 3.15.0.4, dated Oct. 23, 2018; 134 pages.
SteamCaster MIMO Radio User Manual, Doc. 10017C000 Version 3.15.0.5, dated Dec. 19, 2018; 137 pages.
SteamCaster MIMO Radio User Manual, Doc. 10017C000 Version 3.17.0.5, dated Apr. 19, 2019; 158 pages.

* cited by examiner

USER INTERFACE FOR MIMO NETWORKS

CROSS-REFERENCE TO RELATED APPLICATIONS

This application claims the benefit of priority under 35 U.S.C. § 119(e) of U.S. Provisional Patent Application No. 62/895,376, filed on Sep. 3, 2019 and titled "USER INTERFACE FOR MIMO NETWORKS," which is hereby incorporated by reference herein in its entirety for all purposes. This application is related to U.S. Design application No. 29/704,276, filed on Sep. 3, 2019 and titled "DISPLAY SCREEN OR PORTION THEREOF WITH GRAPHICAL USER INTERFACE", which is hereby incorporated by reference herein in its entirety for all purposes.

FIELD

This disclosure relates generally to communication systems and, more particularly, to a user interface for accessing and managing radios on a MIMO network.

BACKGROUND

A MIMO network can include multiple input and multiple output radios that may exchange data. Management of devices on such a network can involve accessing device settings through a web interface.

SUMMARY

For purposes of summarizing the disclosure, certain aspects, advantages and novel features have been described herein. It can be to be understood that not necessarily all such advantages can be achieved in accordance with any particular embodiment disclosed herein. Thus, the embodiments disclosed herein can be embodied or carried out in a manner that achieves or optimizes one advantage or group of advantages as taught or suggested herein without necessarily achieving others.

A system can include: a non-transitory computer storage medium that can be configured to at least store computer-readable instructions; and one or more hardware processors in communication with the non-transitory computer storage medium, the one or more hardware processors can be configured to execute the computer-readable instructions to at least: receive information associated with a plurality of radios, such as a route between two radios of the plurality of radios; route health information associated with the route; and a number of data packets associated with one or more of the plurality of radios; determine a root node can include a radio of the plurality of radios based on a user selection; determine a representation of each radio of the plurality of radios based on the information associated with the plurality of radios; select one or more routes between two or more of the plurality of radios to display based on the root node, wherein the one or more routes include signal paths between the root node and the other radios in the plurality of radios; determine a representation of the one or more selected routes; and cause presentation, within a window on a display, of the representation of each radio of the plurality of radios and the representation of the one or more selected routes.

The representation of each radio of the plurality of radios can include a solid circle. The solid circle for a radio can be red when greater than 100 data packets are associated with the radio. The solid circle for a radio can be yellow when there are between 10 and 100 packets associated with the radio. The solid circle for a radio can be green when less than 10 data packets are associated with the radio.

The representation of the one or more selected routes can include a line. The line for a route between two radios of the selected routes can be red when there can be greater than 20 dB of traffic associated with the route. The line for a route between two radios of the selected routes can be yellow when there can be between 10 dB and 20 dB of traffic associated with the route. The line for a route between two radios of the selected routes can be green when there can be less than 10 dB of traffic associated with the route.

To cause presentation, the one or more hardware processors can be configured to apply a force directed graph algorithm to the representations of the plurality of radios and the representation of the selected one or more routes.

The one or more hardware processors can be configured to update the location of one or more representations of the plurality of radios based on a user input.

The system of claim 1 wherein the one or more hardware processors can be configured to: determine a test source node and a test destination node of the plurality of nodes; generate test traffic between the test source node and the test destination node; and display information associated with the test traffic in a second window on the display.

A system can include: a non-transitory computer storage medium that can be configured to at least store computer-readable instructions; and one or more first hardware processors in communication with the non-transitory computer storage medium, the one or more hardware processors can be configured to execute the computer-readable instructions to at least: display a first window containing a plurality of settings associated with a button on a radio within a graphical user interface on a computer screen, wherein the plurality of settings can include: one or more multicast group addresses associated with one or more multicast groups; one or more multicast group active status settings can include an active or inactive selection; receive an indication of a press of the button on the radio; determine an active status of one or more multicast groups based on the one or more active multicast group status settings; determine a receiving status of the radio; and transmit data to the one or more multicast groups based on the receiving status of the radio.

The plurality of settings can include a speaker volume setting and the one or more hardware processors can be configured to cause to play a received transmission at a speaker volume based on the speaker volume setting.

The plurality of settings can include a microphone volume setting and the one or more hardware processors can be configured to cause to transmit data at a microphone volume based on the microphone volume setting.

The plurality of settings can include a beep volume setting and the one or more hardware processors can be configured to cause to transmit a warning beep based on the receiving status of the radio, wherein a warning beep volume can be based on the beep volume setting.

The plurality of settings can include one or more link notification settings can include an HQ node identification setting and one or more link threshold traffic settings and the one or more hardware processors can be configured to: determine a current traffic level; and transmit a notification to an HQ node based on whether the current traffic level passes one or more traffic thresholds set by the one or more link threshold traffic settings.

A system can include: a non-transitory computer storage medium that can be configured to at least store computer-readable instructions; and one or more first hardware processors in communication with the non-transitory computer storage medium, the one or more hardware processors can be configured to execute the computer-readable instructions to at least: display a first window containing a plurality of settings associated with a multi position switch on a radio within a graphical user interface on a computer screen, wherein plurality of settings can include: an editing profile setting that can include a position on the multi position switch to edit; a group type setting; and one or more group type specific settings; determine a current position of a multi position switch; and update a group type setting based on the one or more group type settings.

The one or more hardware processors can be configured to: display information associated with one or more positions of the multi position switch in a table in the first window; and accent a current position of the multi position switch in the table.

The group type setting can include network settings and the group type specific settings can include network ID, frequency, or bandwidth.

The group type setting can include volume settings and the group type specific settings can include speaker volume.

A system can include: a non-transitory computer storage medium configured to at least store computer-readable instructions; and one or more hardware processors in communication with the non-transitory computer storage medium, the one or more hardware processors configured to execute the computer-readable instructions to at least: for each radio of the plurality of radios, assign the radio into a cluster of radios comprising a subset of the plurality of radios based on shared network traffic within the subset of the plurality of radios; determine, based on a user selection, a root node for display comprising a first radio of a plurality of radios; select for display at least one signal route involving the root node between each of the plurality of radios; display, within a window on a display, a representation of each radio of the plurality of radios within the radio's assigned cluster; and display, within the window on the display, a representation of the selected at least one signal route based on route health.

The representation of each radio and the representation of the selected at least one signal route can be displayed on a single screen without scrolling. The representation of each radio and the representation of the selected at least one signal route can be displayed to improve clarity of the graphical display of traffic information between each radio.

The one or more hardware processors can be configured to execute the computer-readable instructions to: receive an updated user selection of a new root node comprising a second radio of the plurality of radios; select for display at least one new signal route involving the new root node between each of the plurality of radios; and display, within the window on the display, a representation of the selected at least one new signal route based on route health.

The location of each radio of the plurality of radios within the window on the display may not be changed in some examples. The representation of the plurality of selected at least one signal route may not be displayed simultaneously with the representation of the plurality of selected at least one new signal route.

The cluster of radios can include a cluster source node and at least one peripheral node. The signal routes between the radios in the cluster may involve the cluster source node. The representation of the at least one signal route can include a representation of a signal route between the cluster source node and the root node. To assign the radio into a cluster of radios, the one or more hardware processors can be configured to execute the computer-readable instructions to: assign radios to a cluster of radios that share traffic with at least one cluster source node radio.

The selected at least one signal route may exclude routes that do not include traffic that originated from or is destined for the root node in some examples.

The one or more hardware processors may be configured to execute the computer-readable instructions to: select a color of the representation of each radio based on the traffic data associated with each radio.

To select a color of the representation based on the received information, the one or more hardware processors can be configured to: determine that the number of data packets falls within a range of values. The range of values can include greater than 100 data packets. The range of values can include between 10 and 100 data packets. The range of values can include less than 10 data packets.

The representation of the selected at least one signal route can include a red line when there is greater than 20 dB of traffic associated with the route. The representation of the selected at least one signal route can include a yellow line when there is between 10 dB and 20 dB of traffic associated with the route. The representation of the selected at least one signal route can include a green line when there is less than 10 dB of traffic associated with the route.

The one or more hardware processors can be configured to execute the computer-readable instructions to: update a location on the display of a representation of a selected radio of the plurality of radios based on a user input.

The one or more hardware processors can be configured to execute the computer-readable instructions to: display the representation of each of the plurality of radios at a location on the display corresponding to a location in a force directed graph configuration. The one or more hardware processors can be configured to execute the computer-readable instructions to: display the representation of each of the plurality of radios at a location on the display corresponding to a location on a grid.

The one or more hardware processors can be configured to execute the computer-readable instructions to: determine a test source radio and a test destination radio of the plurality of radios; generate test traffic between the test source radio and the test destination radio; and display information associated with the test traffic in a second window on the display.

A method of displaying a network of wireless communication devices on a display can include: for each radio of the plurality of radios, assigning the radio into a cluster of radios comprising a subset of the plurality of radios based on shared network traffic within the subset of the plurality of radios; determining, based on a user selection, a root node for display comprising a first radio of a plurality of radios; selecting for display at least one signal route involving the root node between each of the plurality of radios; displaying, within a window on a display, a representation of each radio of the plurality of radios within the radio's assigned cluster; and displaying, within the window on the display, a representation of the selected at least one signal route based on route health.

The representation of a radio of the plurality of radios can include a red circle when greater than 100 data packets are associated with the radio. The representation of a radio of the plurality of radios can include a yellow circle when there are between 10 and 100 packets associated with the radio. The representation of a radio of the plurality of radios can include a green circle when less than 10 data packets are associated with the radio.

The representation of the selected at least one signal route can include a red line when there is greater than 20 dB of traffic associated with the route. The representation of the selected at least one signal route can include a yellow line when there is between 10 dB and 20 dB of traffic associated with the route. The representation of the selected at least one signal route can include a green line when there is less than 10 dB of traffic associated with the route.

The method can include updating a location of a representation of a selected radio of the plurality of radios based on a user input.

The method can include: determining a test source node and a test destination node of the plurality of nodes; generating test traffic between the test source node and the test destination node; and displaying information associated with the test traffic.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIG. 1A-1 illustrates examples of an interface on different size and types of screens.

FIG. 2A-1 illustrates another example of a security key management interface.

FIG. 2C-1 illustrates another example encryption aspect of a security key management interface.

FIGS. 7A and 7A-1 illustrate example traffic flow configuration of an example large network topology interface.

FIGS. 7B and 7B-1 illustrate example interface interactions with an example large network interface.

FIGS. 7C and 7C-1 illustrate further example interface interactions with an example large network interface.

DETAILED DESCRIPTION

Figure 1A:
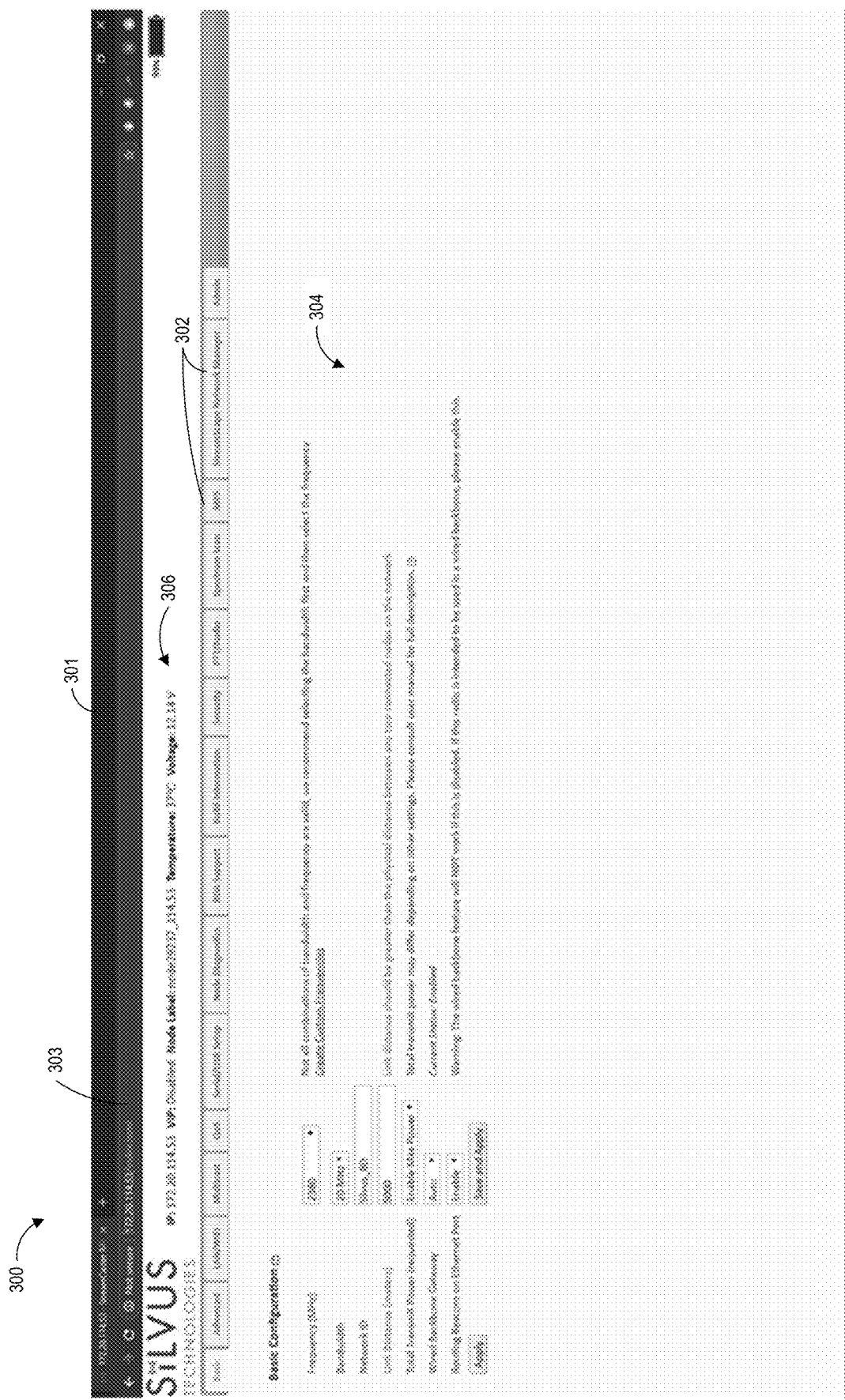
FIG. 1A illustrates an example an example graphical user interface for connecting to a radio on a network.

Although certain preferred embodiments and examples are disclosed below, inventive subject matter extends beyond the specifically disclosed embodiments to other alternative embodiments and/or uses of the invention, and to modifications and equivalents thereof. Thus, the scope of the inventions herein disclosed is not limited by any of the particular embodiments described below. For example, in any method or process disclosed herein, the acts or operations of the method or process may be performed in any suitable sequence and are not necessarily limited to any particular disclosed sequence. For purposes of contrasting various embodiments with the prior art, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

A. Overview

A graphical user interface 300 for use with one or more radios in a network can include any number of interfaces for providing access to features associated with one or more radios or the network.

Some example features of a graphical user interface 300 can include the ability to access and edit a basic configuration of one or more radios or a network of radios, including frequency, bandwidth, network ID, link distance, total transmit power, status of a wired backbone gateway, and status of routing beacons on an Ethernet port.

In another example, features of a graphical user interface 300 can include the ability to access and edit an advanced configuration of one or more radios or a network of radios, including MAC settings, such as a routing beacon period, a routing beacon MCS, a fragmentation threshold, a maximum ground speed, a burst time, number of RTS retries, status of retransmissions, status of MCS, status of one or more transmit channels, status of one or more receive channels, GI mode, status of beam forming, and a radio mode.

In another example, features of a graphical user interface 300 can include a LAN or WIFI network and the interface can include network settings, such as LAN or WIFI configuration settings. The LAN or WIFI configuration settings can include network settings, such as the status of virtual IP on the one or more radios, the virtual IP address, a virtual netmask, a gateway, a VPN status, a VPN server IP, a VPN server port, and a status of blocking DHCP packets on mesh. Additionally or alternatively, the LAN or WIFI configuration settings can include VLAN settings, such as a VLAN mode status, a default or native/PVID VLAN, a management VLAN, one or more trunk VLAN(s). Additionally or alternatively, the LAN or WIFI configuration settings can include WIFI settings of the one or more radios or adapters associated with the one or more radios, such as a WIFI status, WIFI mode, mode type, SSID, security mode, password, WIFI channel, WIFI standard, DHCP server mode, DHCP start IP, DHCP end IP, gateway IP, DHCP netmask, and DNS.

In another example, features of a graphical user interface 300 can include multicast communication and the interface can include multicast settings, such as Internet Group Management Protocol (IGMP) snooping mode, mesh mode for un-registered multicast traffic, custom pruning and augmenting settings for one or more multicast streams, and MANET Multicast or broadcast settings, such as multicast/broadcast status, multi hop or single hop mode settings, MCS settings, fragmentation threshold, multicast groups, target latency, and amount of error correction.

In another example, features of a graphical user interface 300 can include Quality of Service (QoS) settings, such as QoS port classification settings including TCP, UDP, and both TCP and UDP settings for low and high priority ports, and QoS specific parameters including for both low and high priority ports: contention window minimum and maximum, MCS, and retransmissions.

In another example, features of a graphical user interface 300 can include serial port or USB port access or modification of settings. The interface can include serial port or USB port settings. The serial port settings can include a serial port mode and settings related to the serial port mode. For example, the serial port mode can be RS-232 and the RS-232 settings can include baud rate, data bits, parity, stop bits, software flow control mode, transport protocol, peer IP, and peer port settings. The USB port settings can include USB mode settings.

In another example, features of a graphical user interface 300 can include node diagnostics and the interface can include node diagnostics settings, such as access to a temperature log of one or more radios, temperature (of one or more radios) reporting settings, Received Signal Strength Indicator (RSSI) reporting configuration, LED configuration, and voltage monitoring settings. For example, the temperature reporting configuration settings can include a temperature reporting mode, a temperature reporting IP, temperature reporting port, a minimum temperature threshold, a maximum temperature threshold, and a temperature reporting period. The RSSI reporting configuration can include an RSSI reporting mode, RSSI reporting IP, RSSI reporting port, and RSSI reporting period. The LED configuration can include an LED status reporting mode. The voltage monitoring settings can include access to the current voltage of one or more radios, a voltage reporting mode, a voltage reporting IP, a voltage reporting port, a minimum voltage threshold, a maximum reporting threshold, and a voltage reporting period. Advantageously, the voltage monitoring, temperature monitoring, or other node diagnostics or monitoring may be tied to an alert or alarm configured to alert a user regarding node conditions or perform a safety measure in the event of poor node conditions.

In another example, features of a graphical user interface 300 can include bi-directional amplifier (BDA) support and the interface can include BDA configuration settings. The BDA configuration settings can include, for example, auto noise estimation mode, PA mode, and basic settings such as, PA gains for one or more channels of one or more radios, LNA gains for one or more channels of one or more radios, and a maximum PA output power per channel.

In another example, features of a graphical user interface 300 can include access to build information of one or more radios and the interface can include build information and a release changelog. For example, the build information can include RF board information, such as the RF model, digital board information, model number, enclosure number and assembly date, a build tag, PHY bitfile revision, kernel image, power calibration version, and AGC calibration version. The changelog can include information and dates associated with new features added to radio or interface functionality or changes or bug fixes associated with the radio or interface functionality.

In another example, features of a graphical user interface 300 can include any number of security features and the interface can include any number of security related settings, as discussed in further detail below.

In another example, features of a graphical user interface 300 can include audio related settings on the one or more radios, such as Push to Talk (PTT) or other audio settings, as discussed in further detail below.

In another example, features of a graphical user interface 300 can include spectrum scanning and the interface can include any number of settings and outputs associated with spectrum scanning. For example, the settings can include a selection of radios or nodes to scan, a scanning mode, a center frequency, a span, antenna mask mode, resolution bandwidth, threshold dB, duration, and approximate time for the scan. The output can include graphs associated with an average, peak, and threshold frequency as a function of dB for one or more nodes selected to scan.

In another example, features of a graphical user interface 300 can include settings associated with hardware on the one or more radios, such as settings for a multi-position switch, as discussed in further detail below.

In another example, features of a graphical user interface 300 can include network management and the interface can include settings and outputs associated with a network of one or more radios. For example, the settings can include a network topology view and settings associated with the network routing and management, as discussed below. In another example, the settings can include a table view of the network, as discussed below. In another example, the settings can include network wide setup settings, such as settings to update one or more radios in a network at substantially the same time, such as frequency, bandwidth, Tx power mode, fragmentation threshold, MCS mode, GI mode, link distance, maximum ground speed, burst time, routing beacon period, routing beacon MCS, RTS retries, contention window minimum, broadcast update interval, and multicast stream configuration for one or more multicast streams. In another example, the settings can include individual node configuration within the network with node settings, such as node ID, frequency, bandwidth, noise level, interference, Tx power mode, a display of the actual Tx power, fragmentation threshold, MCS mode, GI mode, link distance, burst time, routing beacon period, routing beacon MCS, RTS retries, contention window minimum, maximum ground speed, IP address, netmask, and gateway. The node configuration can also include a display of information associated with current connected devices to the node. In another example, the settings can include a map overlay view of one or more nodes on the network and settings associated with the map view, as discussed below.

Figures 1, 1A:
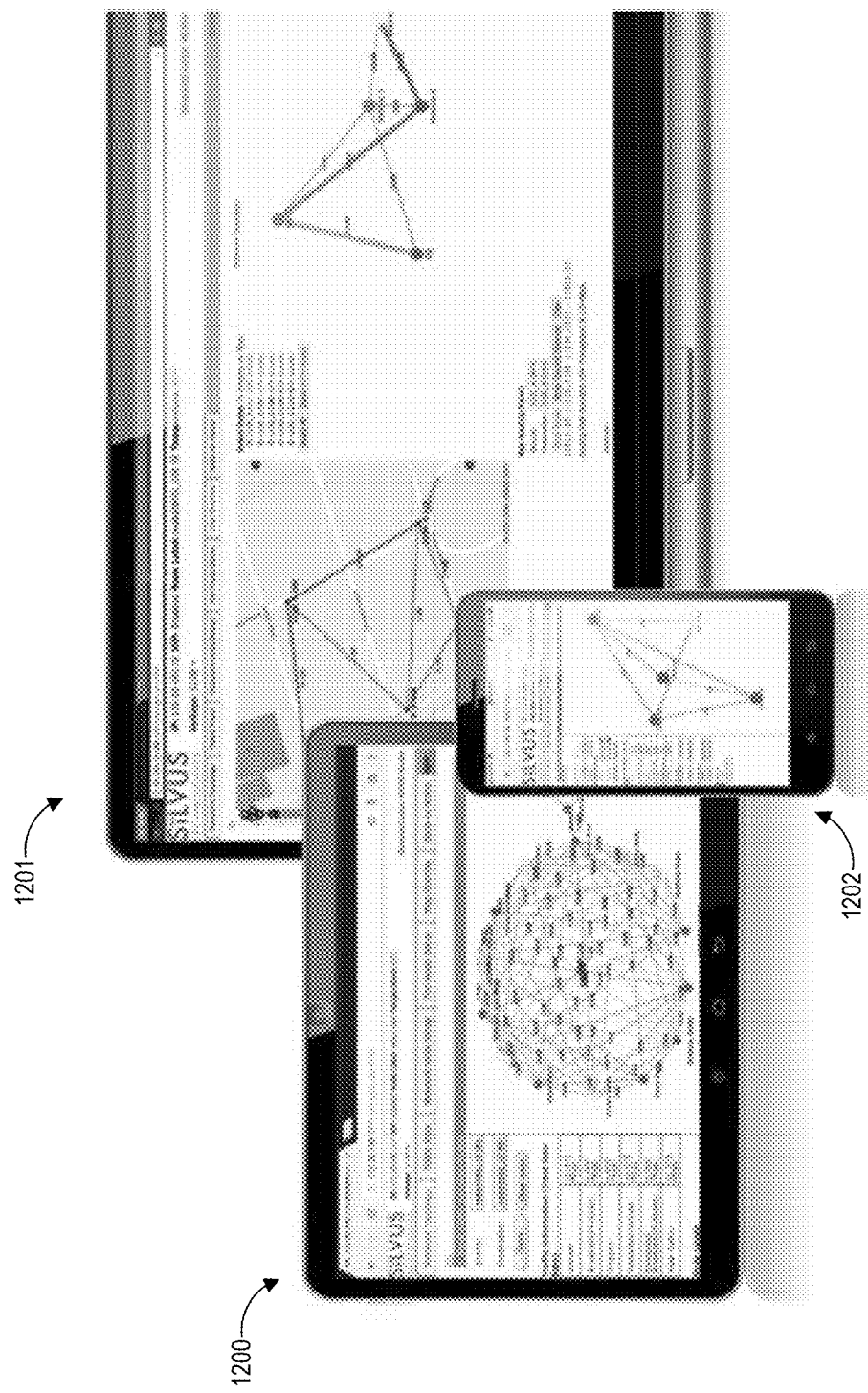

As illustrated in FIG. 1A, a graphical user interface 300 may be accessible to a user via a web browser 301 on a computing device. For example, a user may input an IP address associated with one or more radios or nodes into a browser address bar 303 in order to access the graphical user interface 300. As shown in FIG. 1, a graphical user interface 300 can include one or more tabs 302, one or more settings areas 304, and one or more information display areas 306.

A tab 302 can include an interactive component that allows a user to switch between different settings available within the interface 300, such as the settings described above. Advantageously, the tabs 302 may allow a user to quickly access different configuration settings or information relating to a wireless communication device or devices. For example, an interface 300 can include a basic configuration tab, an advanced configuration tab, a LAN/WIFI tab, a multicast tab, a QoS tab, a Serial/USB setup tab, a node diagnostics tab, a BDA support tab, a build information tab, a security tab, a PTT/Audio tab, a spectrum scan tab, an MPS tab, a StreamScape Network Manager tab, an admin tab, or other tab.

When a user clicks on a tab or otherwise indicates that the user would like to access information associated with the tab, an interface with one or more settings areas 304 may be displayed. The one or more settings areas 304 can include settings or displayed information associated with the features associated with the tab. For example, clicking on an advanced configuration tab can allow a user to access advanced configuration settings. In another example, clicking on a security tab can allow a user to access one or more interfaces or settings associated with security features of the device being accessed with the interface 300.

As illustrated in FIG. 1A-1, an interface 300 may be configured to display aspects of the interface on different types and sizes of display screens. For example, an interface may be configured to display on a tablet 1200, computer 1201, mobile device 1202, or other type of screen. Advantageously, the interface 300 can display more intuitive and interactive charts, menus, and other functions for programming and interacting with a wireless communication system than may otherwise be conventionally available. Additionally, the display formats of the features of the graphical user interface 300 may facilitate a much faster and easier navigation of data associated with multiple wireless communication devices on a limited display, such as a mobile device screen or web browser. In particular, the data visualizations disclosed herein improve data display and navigation on small screens (e.g., less than 8 inches in the diagonal for smart phones, less than 2 inches in the diagonal or in diameter for a smart watch) by allowing a user to quickly access and understand information and update advanced configurations of a device on a single screen that may have limited space. For example, in some visualizations described herein, such as FIG. 6A described below, a plurality of wireless communication devices and interactions between the wireless communication devices may be displayed in a graphical format so as to facilitate communication pathways, traffic status, and other information relating to large networks of wireless communication devices within a single screen.

Figure 1B:
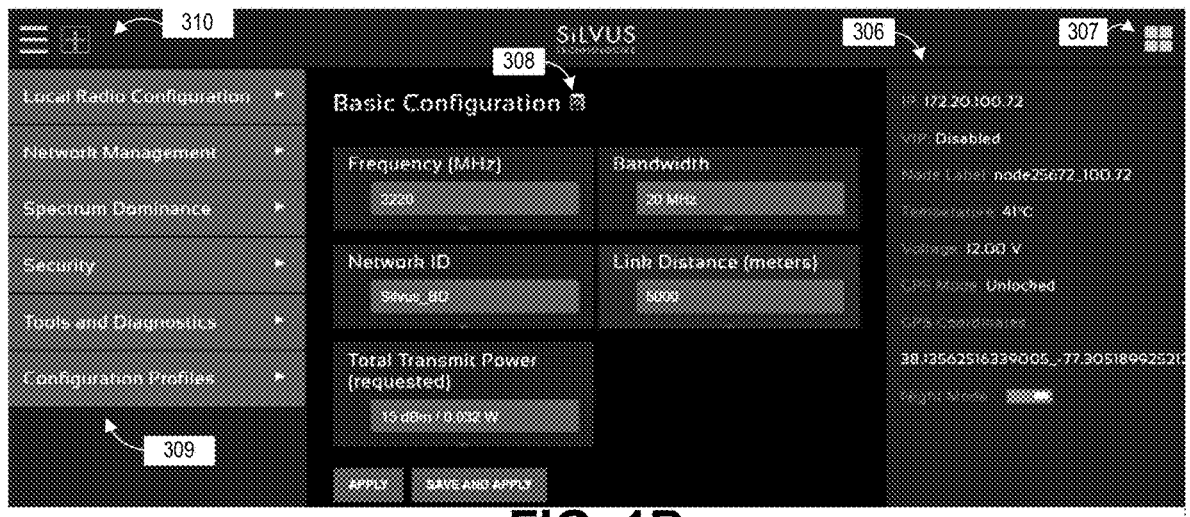
FIGS. 1B-1D illustrate example device configuration aspects of an example graphical user interface.

As illustrated in the example configuration in FIG. 1B, a graphical user interface 300 may include one or more expandable menus 309 in addition or in the alternative to the one or more tabs. A menu 309 may be hidden, accessed, expanded, or collapsed, in whole or in part using one or more menu control buttons 310. Menu items may include information associated with different aspects of the graphical user interface, such as a local radio configuration, network management, spectrum dominance, security, tools and diagnostics, configuration profiles, the like or a combination thereof. In some examples, the menu items may be grouped by category or may expand into further sections.

In some examples, an accessed part of the interface may include a button or link 308 to display or open one or more manuals or other sources of information relating to the interface or settings of the device related to the section of the interface. For example, a basic device configuration aspect of the interface may include a link to a user manual relating to the basic device configuration aspect. Other examples are also possible.

Additionally or alternatively, an interface 300 can include one or more information display areas 306. As illustrated in FIG. 1B, a device information area 308 may be accessed by an information access button 307. The information display area 306 can include information associated with the device being accessed with the interface 300. For example, the information display area 306 can include an IP address of the device, a Virtual IP address or status of the device, a node label of the device, a temperature of the device, and a voltage associated with the device, other device related data, interface design settings, such as night mode status to turn the background colors dark, or other relevant information. In some examples, information associated with the device may be updated, removed, added to, or otherwise changed by settings within the interface 300.

Figure 1C:
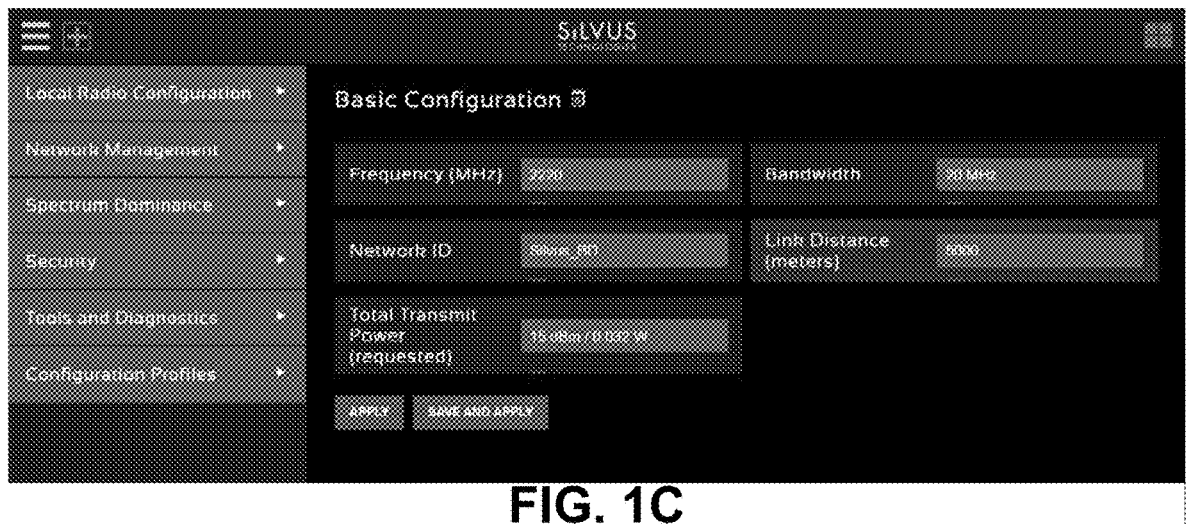
Figure 1D:
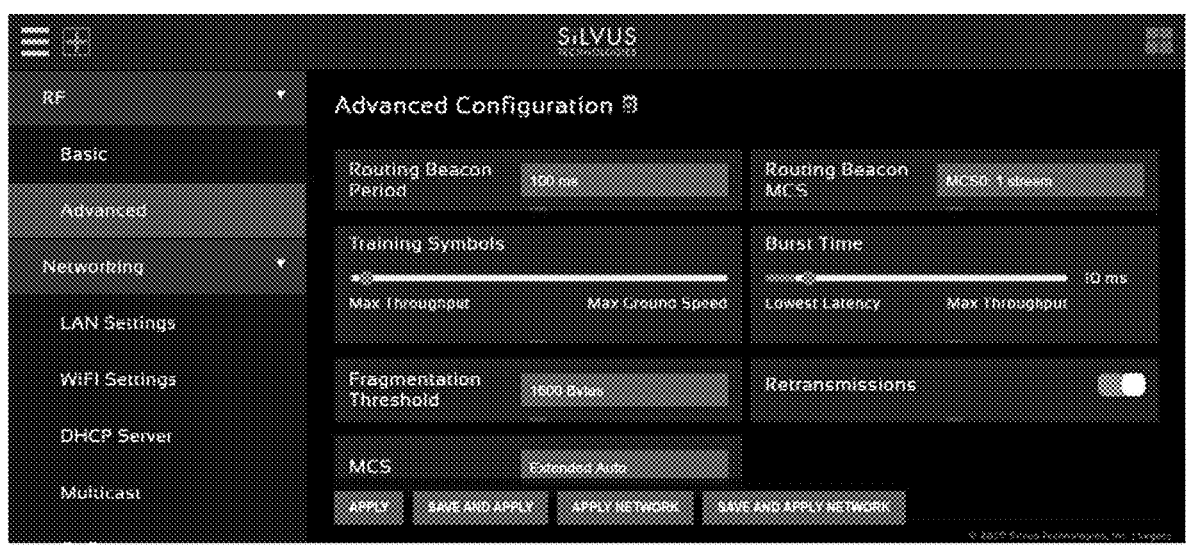

A user may configure a local radio or wireless communication device within the graphical user interface 300. FIGS. 1C-1D illustrate example device configuration aspects of a graphical user interface 300. For example, as illustrated in FIG. 1C, basic configuration settings may be modified or accessed in the interface, including, but not limited to frequency (MHz), bandwidth, network ID, link distance (meters), and total transmit power (requested). In another example, as illustrated in FIG. 1D, advanced configuration settings may be modified or accessed in the interface, including, but not limited to routing beacon period, routing beacon MCS, training symbols, burst time, fragmentation threshold, retransmissions, and MCS.

Figure 2A:
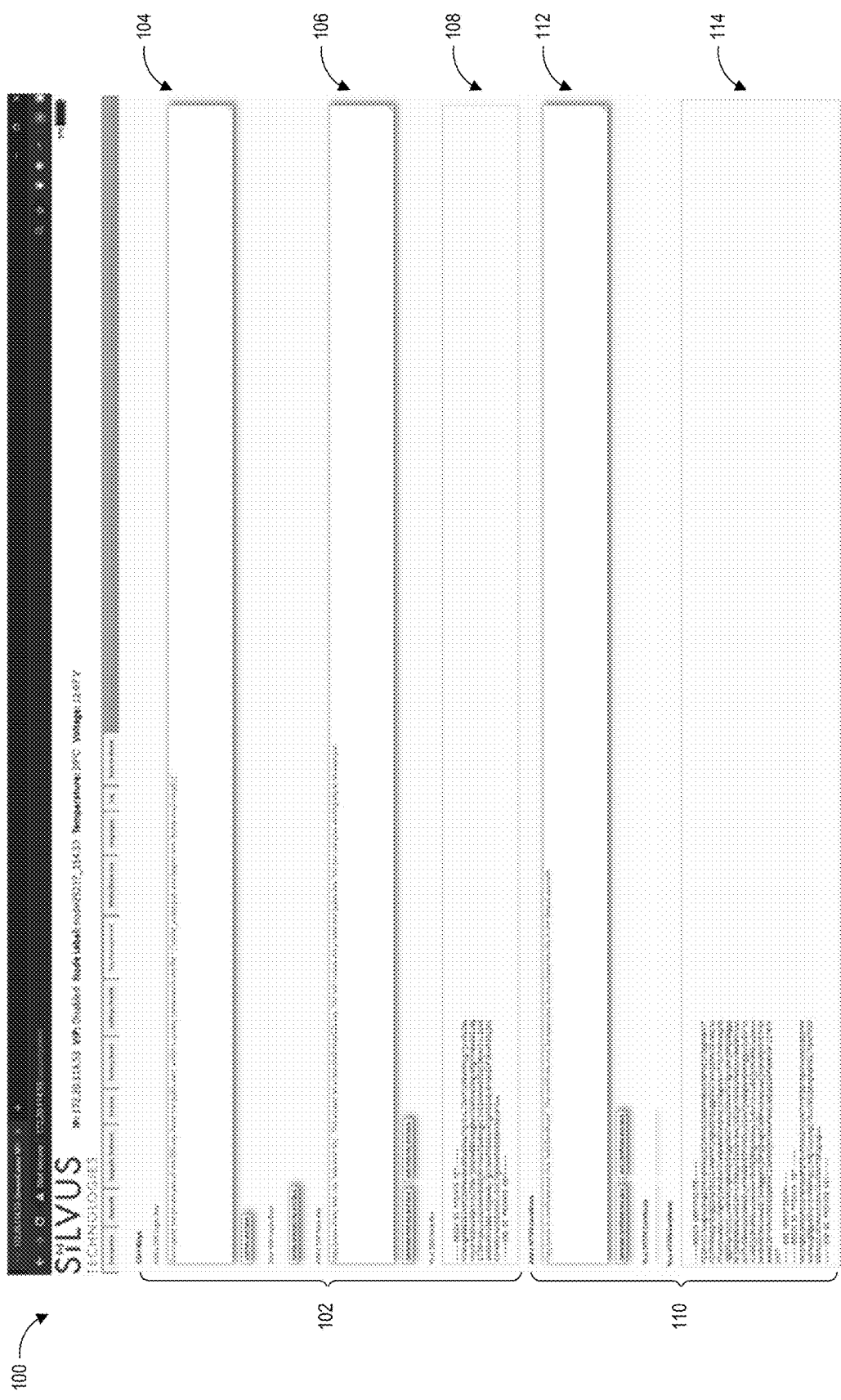
FIG. 2A illustrate an example of a security key management interface that may be part of an example graphical user interface.
Figures 1, 2A:
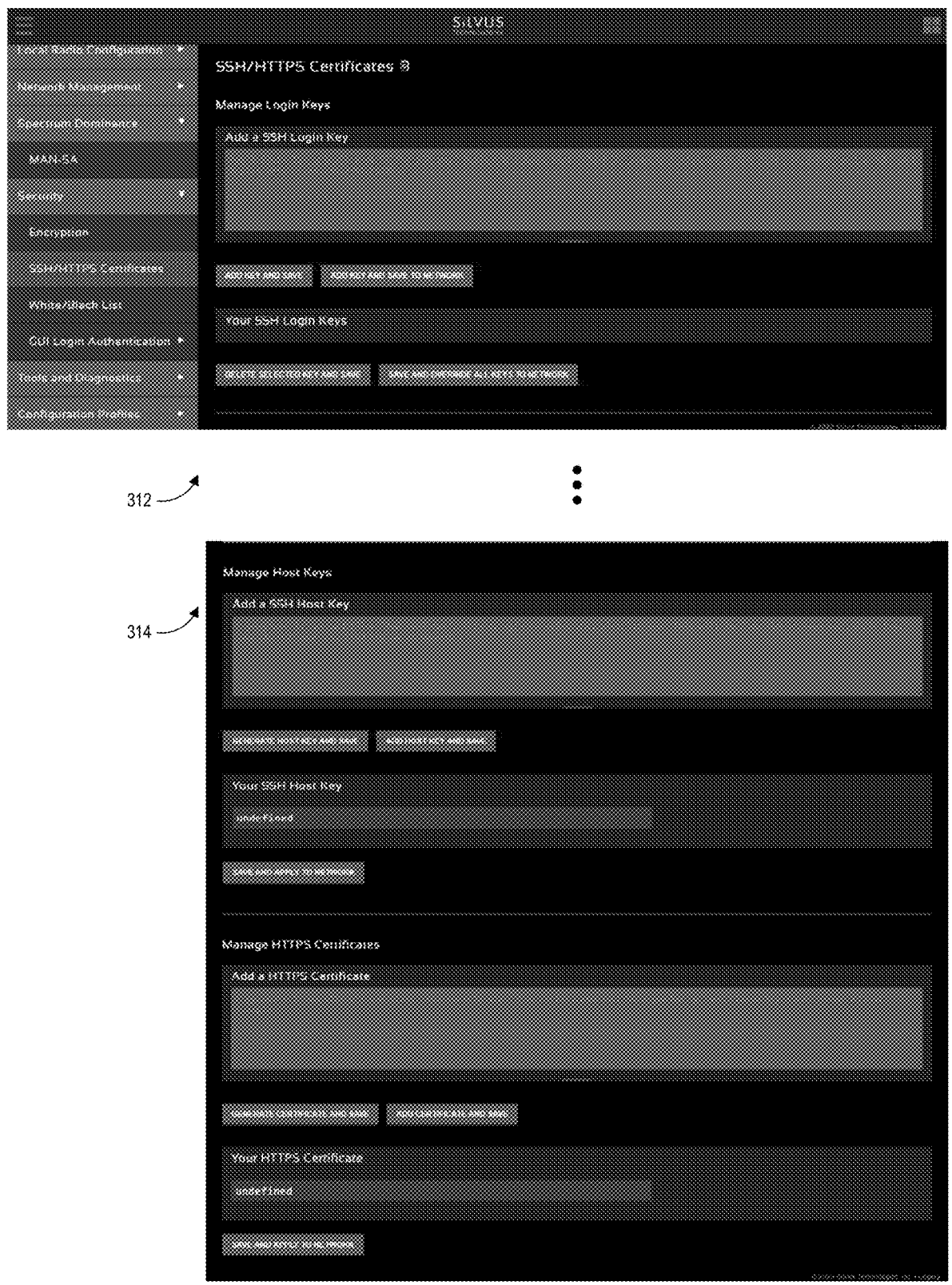

As shown, for example, in FIG. 2A-1, a configuration of the interface 300 may include a section 312 that fits within a single display screen. In aspects of the interface 300 that include a large number of items to access or display, such as illustrated in FIG. 2A-1, an interface 300 may allow a portion of the interface 300, such as the one or more menus described above or one or more save or apply settings, to remain static while a user scrolls through a movable area 314, such as a settings area described above.

B. Example Security Interface

A graphical user interface 300 for use with one or more radios in a network can include one or more security interfaces capable of providing access to security features of the one or more radios via access points capable of displaying the graphical user interface 300.

The security features can include the ability to enable and disable encryption on a radio using one or more encryption keys, the ability to upgrade the firmware on one or more radios on a network of radios individually or as a group, the ability to load license files for enabling features on one or more radios or the graphical user interface 300, the ability to reset the radio or graphical user interface 300 or aspects of the radio or graphical user interface 300 to factory settings or other predetermined settings, the ability to access or load one or more setting profiles, the ability to access and manage security keys for accessing one or more radios on a network, the ability to block or allow access for one or more radios from connecting to a network, the ability to load or access one or more language or other accessibility profiles of one or more radios or the graphical user interface 300, and the ability to load, access, and manage security or other logs associated with one or more radios on a network or the network itself.

1. Key Management

FIGS. 2A and 2A-1 illustrate example variations of a security key management interface 100. The security key management interface 100 can include a SSH key management area 102 and a HTTPS certificate management area 110.

The SSH key management area 102 can be used to view, manage, access, add, remove or otherwise interact with key pairs. For example, in order to secure shell login (SSH) into the radio, a user may first generate a key pair. The key pair may include a public key and a private key. The public key may be uploaded onto one or more radios. The private key can be used or accessed on any suitable machine capable of serving as an access point for the user interface, such as a computer, mobile phone, or other device. The upload can be done by any suitable means. For example, the upload can be done by executing a text-based command, such as "ssh-keygen -t ecdsa -b 521," on a computer or other capable device. A unique key pair can be generated for each radio or machine that a user wants to pair or a single key pair can be shared amongst multiple machines.

Key pairs can include any number of public-key cryptography keys, such as an SSH login key and an SSH host key. The key pairs can include any number of authentication or cryptographic key types, such as DSA, RSA, ECDSA, and Ed25519 keys, relying on any number of mathematical properties or problems to provide security, such as prime number factorization or elliptic curves.

An SSH Host Key can be used for authenticating one or more radios to all machines that want to connect to it via SSH. A user may upload a pre-generated key or generate a key on a radio. In some examples, the key can be generated by executing a text-based command, such as "openssl ecparam -name secp521r -genkey -noout -out yourfilename," on a computer or other capable device. Once a user uploads or generates a key, a previous key may be overwritten on the radio. An original key associated with the radio may be retrieved or uploaded by a Factory Reset or Zeroize setting within the security settings interface.

An SSH key may be uploaded, generated, added, or otherwise interacted with by a user of the interface 100 within the SSH key management area 102. For example, an SSH login key can be added or otherwise interacted with by a user of the interface 100 by entering one or more parts of a SSH login key to box 104 within the key management area 102. In another example, a user may add an SSH host key in box 106. For example, a user may add a host key by indicating within the interface to generate a host key or by manually adding host key text to box 106. For example, the user may indicate the desire to generate a host key using one or more interactive components within the interface, such as buttons or other icons within the key management area 102. In another example, the user may indicate the desire to generate a host key by executing a text-based command to generate a host key within an interactive area of the interface 100. The current host key may be displayed in a box 108 within the key management area 102.

The HTTPS certificate management area 110 can be used to view, manage, access, add, remove, or otherwise interact with one or more HTTPS certificates. An HTTPS Certificate may be used to establish an HTTPS connection with a radio. If a user is using a factory default or radio generated certificate and has not added an exception of the HTTPS certificate to the user's browser, a message indicating that a connection is not private may appear in the user's browser when trying to connect to the radio. This is because the certificate is signed by the radio and not a trusted Certificate Authority. In order to avoid this issue, a user can manage an HTTPS certificate in the HTTPS certificate management area 110. For example, a user may manage an HTTPS certificate by generating a new certificate. The user may generate a new certificate by indicating the desire to generate a new certificate using one or more interactive components, such as one or more buttons or other icons within the HTTPS certificate management area 110 (for example, a "Generate Certificate and Save" button). If a user is on HTTPS when a certificate is generated, the user may refresh the browser window to avoid error or incorrect information appearing on the interface. Additionally or alternatively, a user may input a pre-generated certificate. In some examples, the user may input a pre-generated certificate within box 112 of the HTTPS certificate management area 110. Prior to using the pre-generated certificate, a user may first generate a key pair (secp256r1, secp384r1, or secp521r1), create a X.509 certificate, and append the user's private key to it.

In some examples, an interface 100 can include a network wide rekeying feature. Advantageously, the network wide rekeying feature can help prevent a split network by ensuring that one or more radios on a network can share data by, for example, updating authentication or encryption information across the network. The network wide rekeying feature can include one or more interactive components capable of transmitting or uploading one or more security keys, such as a public key or private key, to one or more radios on the network. The one or more radios can include a radio other than a radio currently logged into with the user interface. Additionally or alternatively, the one or more radios can include multiple radios on a network, such as some or all of the network.

The network rekeying feature can include a key wrapping algorithm. For example, the key wrapping algorithm can include a FIPS compliant key wrapping algorithm. The key wrapping algorithm can include one or more encryption keys, an HMAC key, and a wrapping key. In some examples, the interface 100 can include one or more settings associated with an encryption configuration, such as an encryption key volatile memory setting, an encryption profile setting, an HTTPS setting, and a FIPS mode setting.

The interface 100 can include one or more interactive components for generating one or more encryption keys. For example, the interface 100 can include one or more key generator components 120, 122, 124, 126. The key generator components can be buttons or other interactive components for the user to indicate to the system to generate one or more encryption or security keys. For example, key generator 120 can include a button to generate an encryption key associated with unicast packets. In another example, key generator 122 can include a button to generate an encryption key associated with broadcast packets. In another example, key generator 124 can include a button to generate a hash based message authentication code (HMAC) key. In another example, key generator 126 can include a button to generate a wrapping key.

The interface 100 can include one or more interactive components for transmitting or broadcasting one or more encryption keys or data associated with one or more encryption keys to one or more radios on the network. For example, the interface 100 can include one or more buttons 128 or other interactive components for applying or saving one or more settings on the interface 100. In some examples, the interface 100 can include a setting to apply one or more settings on selected radios on the network. For example, the interface 100 can include a pop up window or other interactive component for receiving a user selection of which radios on the network to save or apply settings to.

Figure 2B:
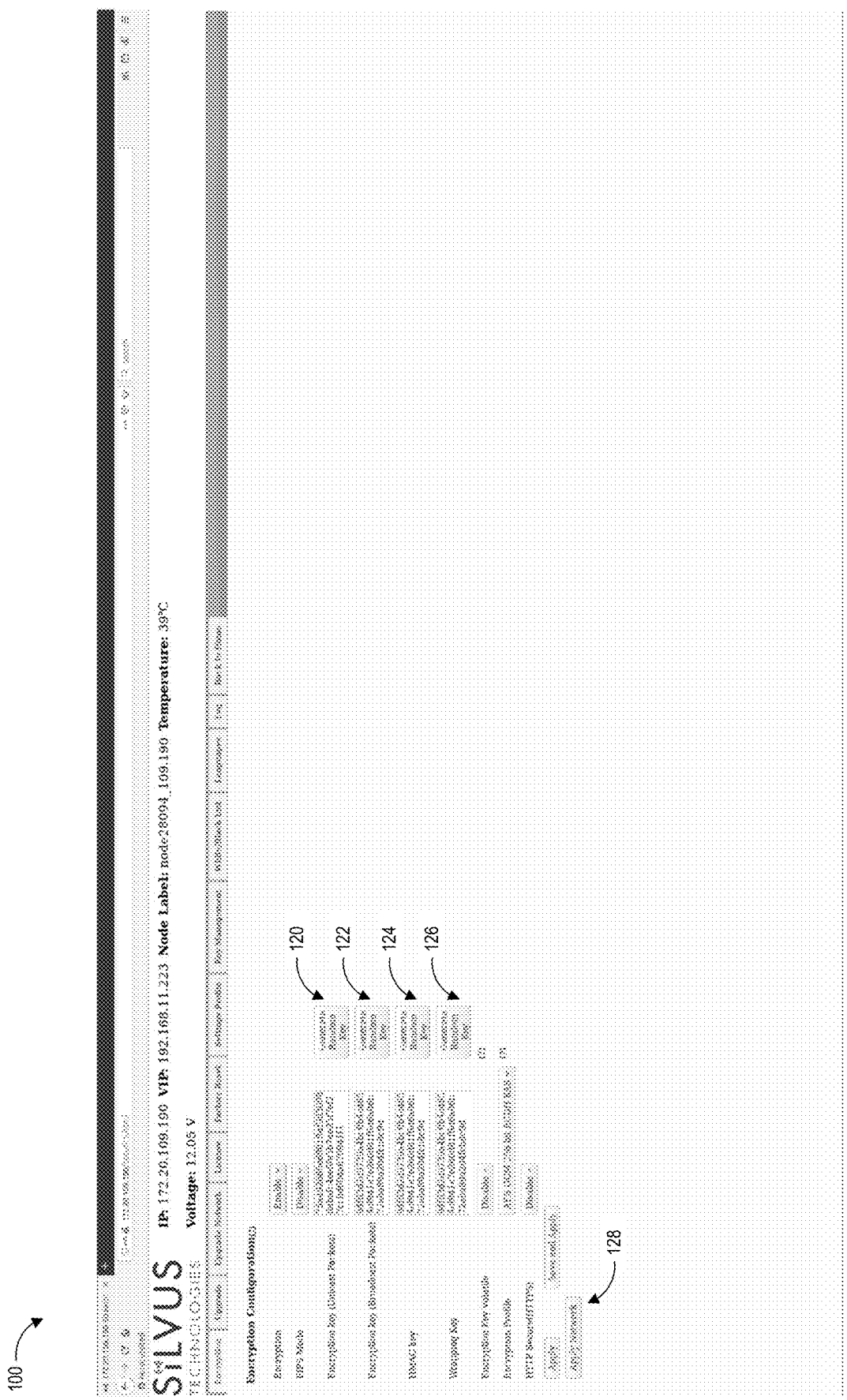
FIG. 2B-2C illustrate example encryption aspects of a security key management interface.
Figure 2C:
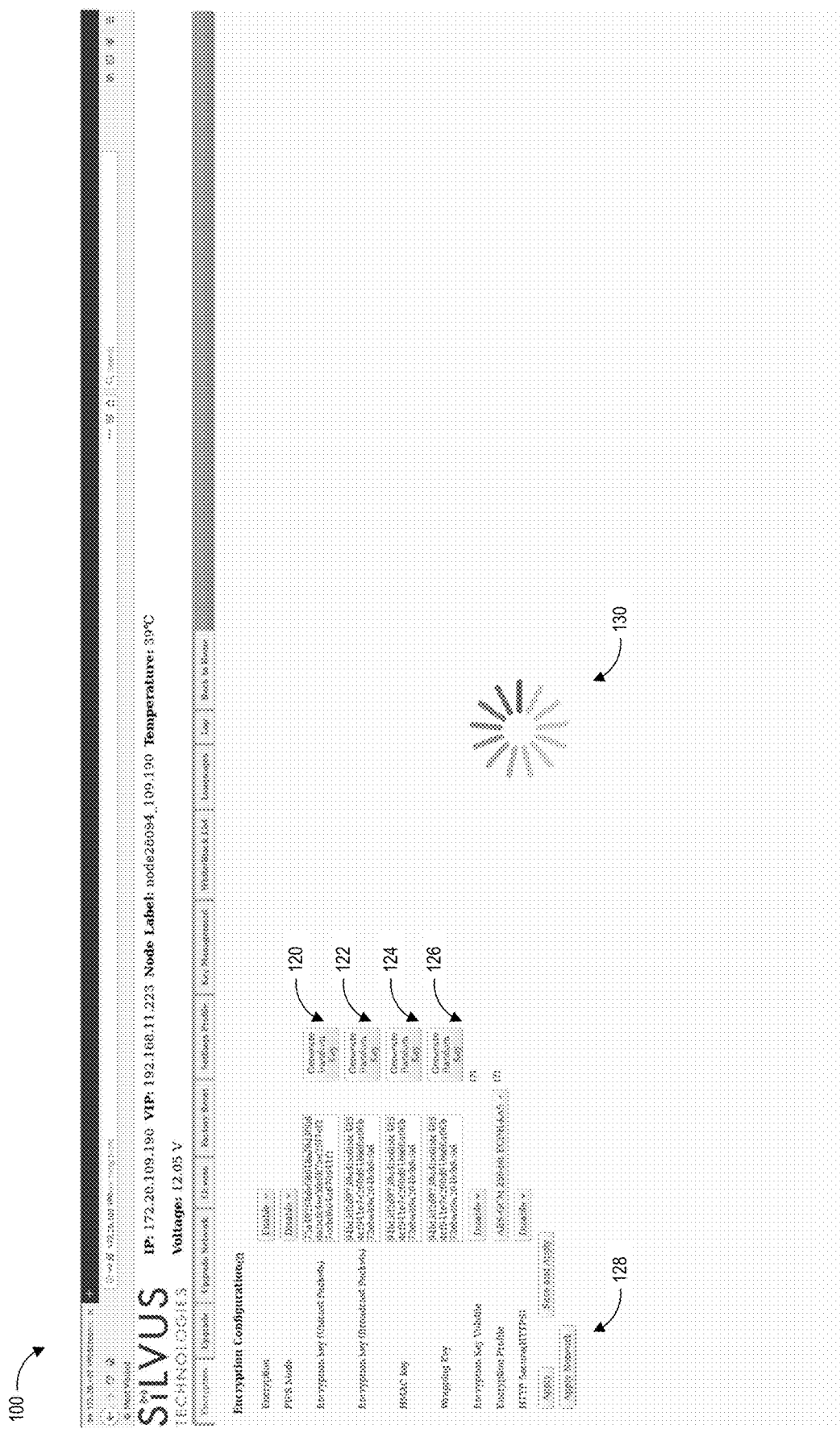
Figures 1, 2C:
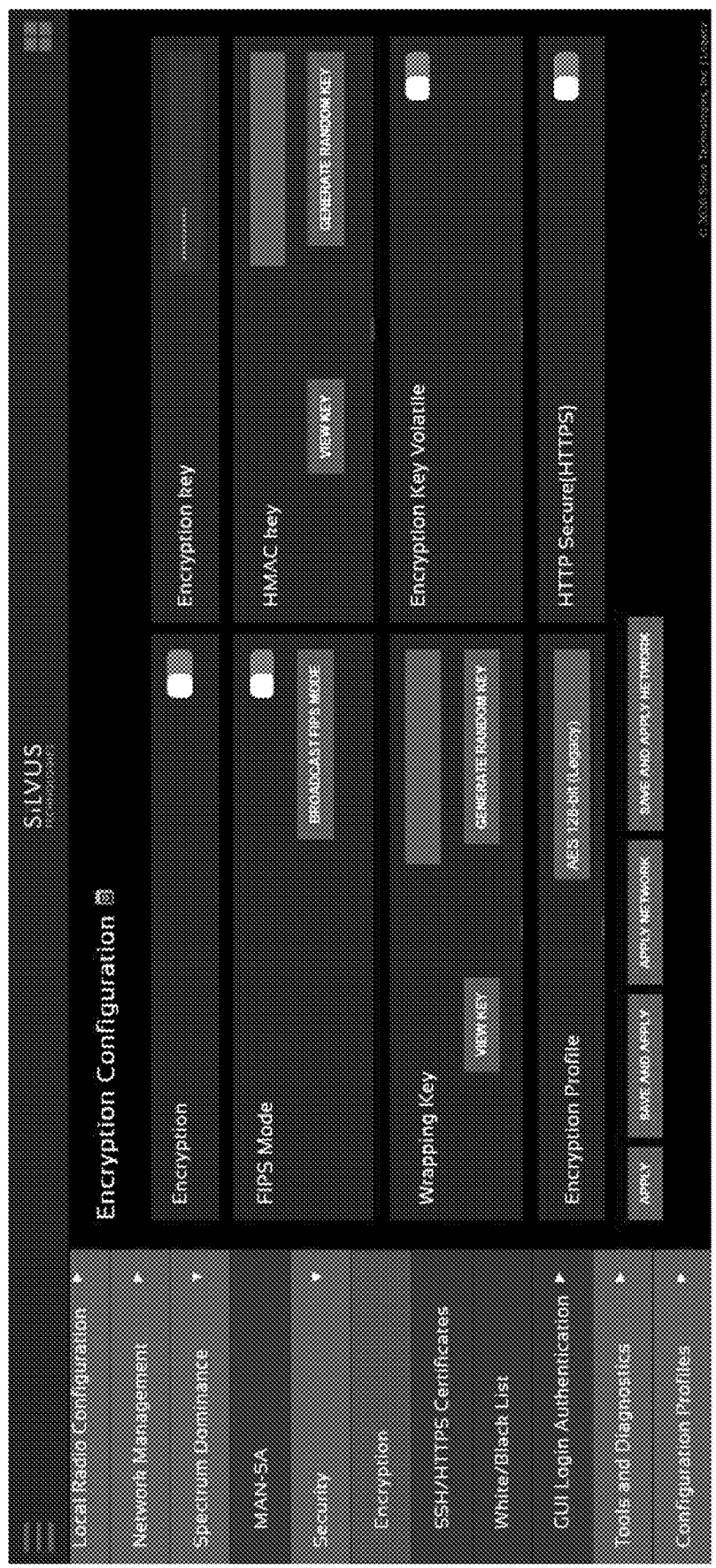

As illustrated in FIG. 2C, the interface 100 can include a graphic or animation for indicating that one or more encryption keys, data associated with one or more encryption keys, or other setting has been, will be, or is currently being saved, transmitted, or applied to one or more radios on the network.

FIG. 2C-1 illustrates an example variation of the example encryption interface aspect of the security interface 100 illustrated in FIGS. 2B and 2C. For example, the variation includes a tiled configuration of settings and a dark color variation of the interface 100.

2. Black and White List

Figure 3A:
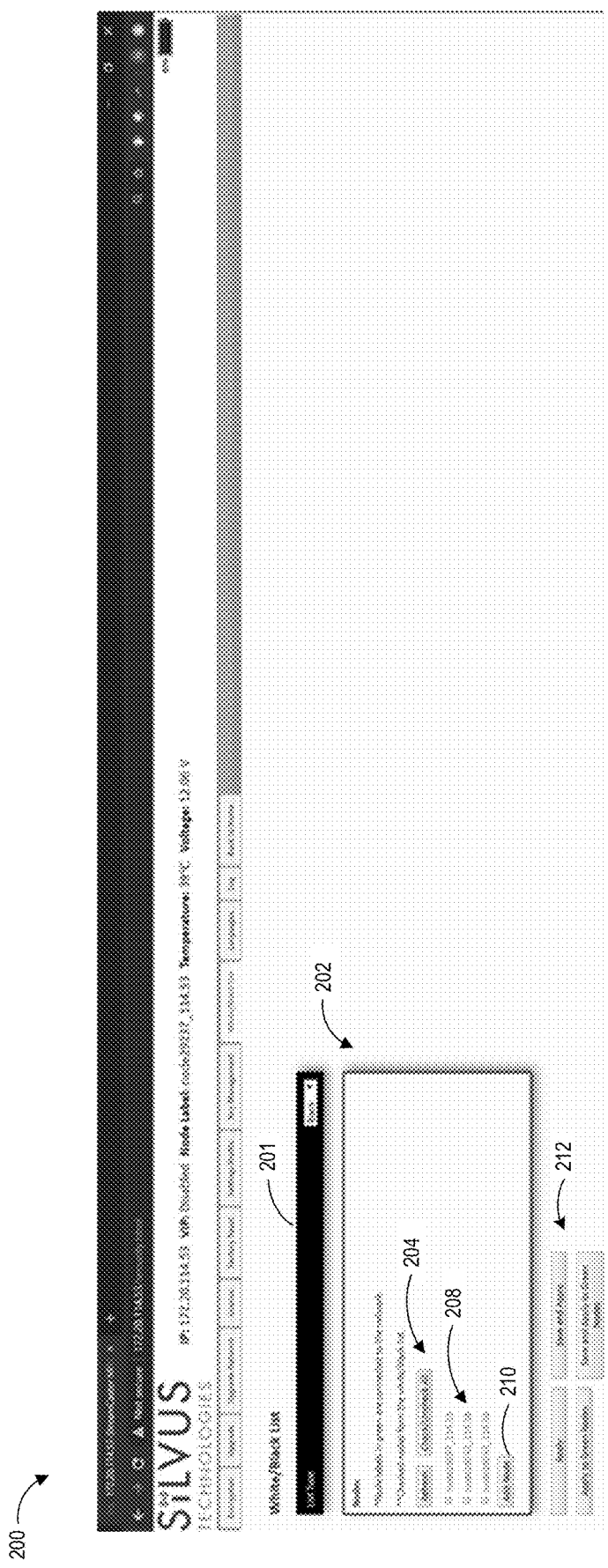
FIGS. 3A-3B illustrates an example security black and white list interface.
Figure 3B:
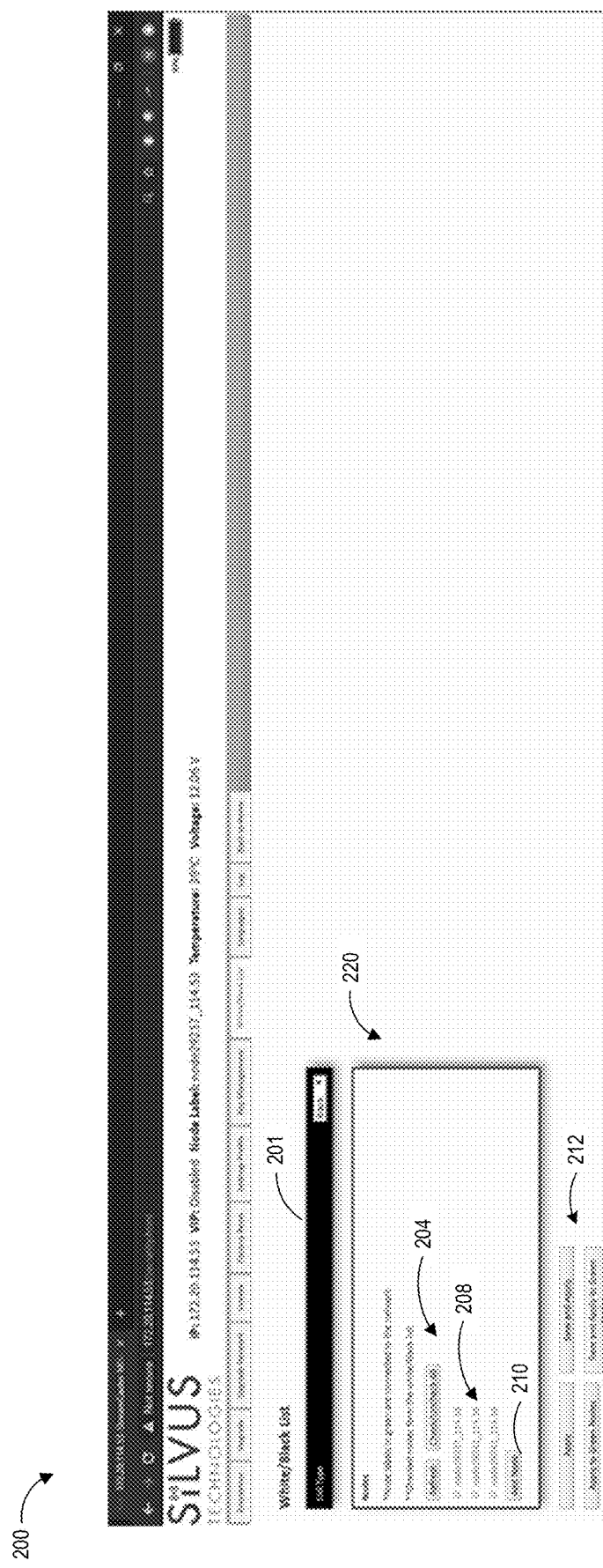
Figure 3C:
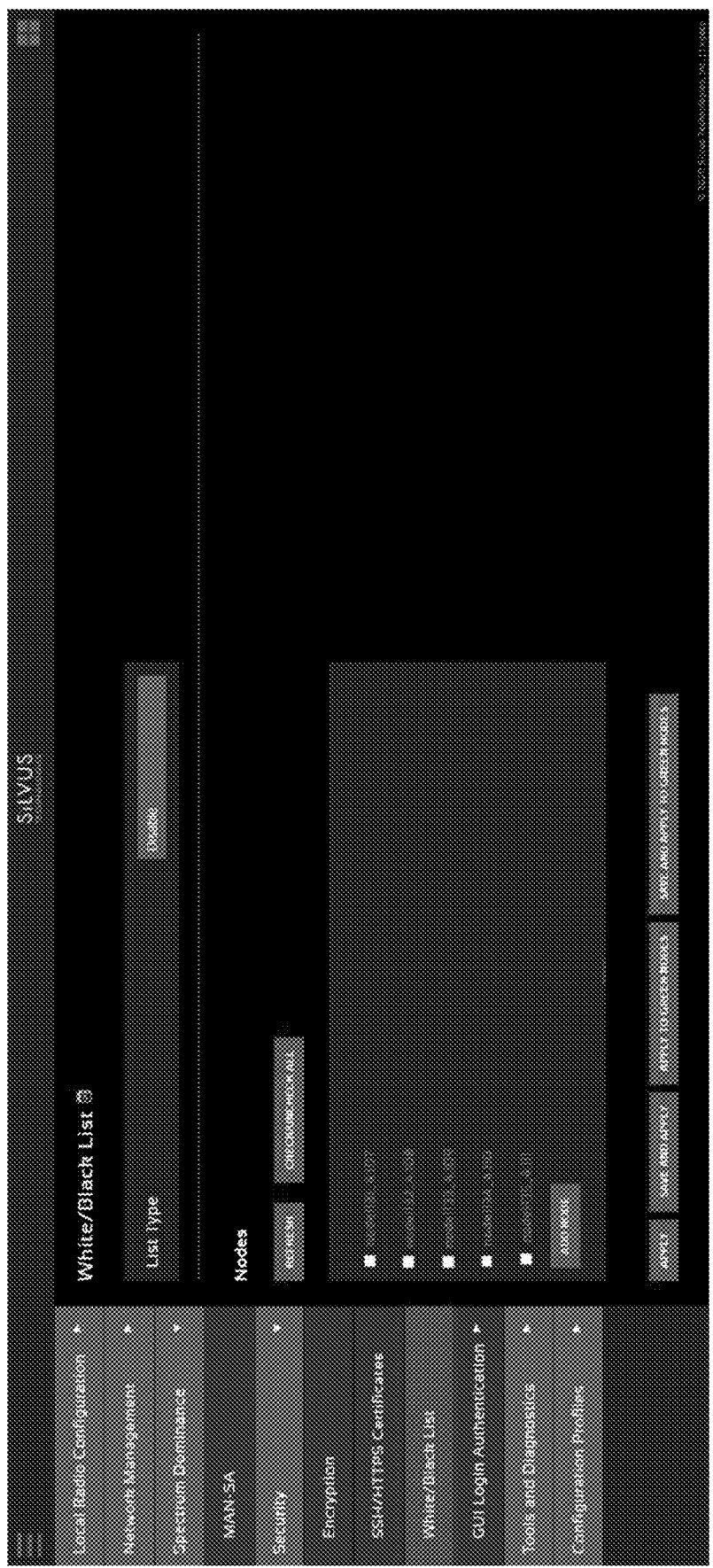
FIG. 3C illustrates another example security list interface.

FIGS. 3A-3C illustrates an example security white/black list interface 200. For example, white/black list interface 200 can include a list type setting 201, black list settings 202, white list settings 220, and implementation and save icons 212.

A list type setting 201 can include one or more interactive components that enable a user to select whether the user would like to configure information associated with a black list or a white list. For example, the list type setting 201 can include a drop down menu with a selection of either a black list or a white list. A black list can include a list of radios, nodes, or other devices that may be explicitly disallowed from connecting to a network in some or all aspects. In some examples, when a user selects a black list as the list type, the network may explicitly disallow the selected radios, nodes, or other devices and allow other radios, nodes, or other devices to connect to the network. A white list can include a list of radios, nodes, or other devices that may be explicitly allowed to connected to a network in some or all aspects. In some examples, when a user selects a white list as the list type, the network may explicitly allow the selected radios, nodes, or other devices to connect to the network and disallow other radios, nodes, or other devices to connect to the network.

As illustrated in FIGS. 3A and 3B, black list settings 202 and white list settings 220 can include a list 208 of nodes or devices that have connected to the network, are currently connected to the network, or have requested access to the network. Status of the nodes on the network may be indicated by any suitable indicator, such as a color, icon, or other emphasis. For example, nodes currently connected to a network in the list 208 can be indicated by the name of the connected node(s) appearing in the color green or nodes currently disconnected from the network can be indicated by the name of the disconnected node(s) appearing in the color red.

The list 208 of nodes or devices may be updated, refreshed, selected, or deselected using one or more interaction components 204. For example, the interaction components 204 can include one or more icons, check boxes, or buttons that enable the user to refresh the list 208 or select or deselect some or all of the list 208. A user may manually add a node by interacting with the interface using one or more interaction components 208. For example, the interaction components 208 can include an icon that the user can click on to add a node to the list 208.

The interface 200 can include one or more implementation and save icons 212 to apply or save the settings from black list settings 202 or white list settings 220 to some or all of the nodes in the list 208. For example, the icons 212 can include interaction components to save or apply the settings to just the nodes currently connected to the network or all nodes within the list 208.

Advantageously, the interface 200 can improve a user experience by allowing a user to graphically create, edit, or otherwise interact with a black or white list without having to manually enter node or radio data. For example, the interface 200 can include automatically populated lists from which the user can select, update, or otherwise interact with to create the black or white lists. Additionally or alternatively, the interface 200 can include a network wide update. The network wide update feature can include broadcasting or transmitting information associated with the black list or the white list to one or more nodes in the network. Thus, a user can add or remove a node to a black list or a white list without having to individually connect to a node to update the information. Thus, the interface 200 provides a greater ease of use to the user in generating a black or white list for the network.

FIG. 3C illustrates an example variation of the example white/black list configuration interface 200 illustrated in FIGS. 3A and 3B. For example, the variation includes a dark color variation of the interface 200.

C. Example Push to Talk Feature

A radio or other device may have a push to talk (PTT) button or other interactive component. The PTT button or other interactive component can allow a user to interact with other users in their talk group (or multicast group) or provide information associated with the device or the talk group.

For example, a user with a radio or other device may interact with other users within their radio's talk group or be warned regarding being unable to interact with other users within their radio's talk group by pressing the PTT button. For example, when the PTT button is pressed by a user, the device may stream audio from the user's device to other devices in the user's talk group or multicast network. In another example, when the PTT button is pressed while another user is speaking or while another device is streaming audio, a warning beep may be played. Pressing the PTT button a number of times greater than one or in a recognized pattern may result in a different occurrence. For example, pressing the PTT button three times (and, in some examples, holding on the third) within a set amount of time (for example, 1 second) can allow a user to override the channel and speak. In another example, pressing the PTT button two times within a set period of time (for example, 1 second) can allow a user to hear an audible notification of information associated with a radio, link, network, or other information. For example, pressing the PTT button may deliver notifications regarding the talk group, device, network, or other information depending on device settings. In some examples, the pattern, resulting feature, or notification settings may be customizable by the user.

Figure 4A:
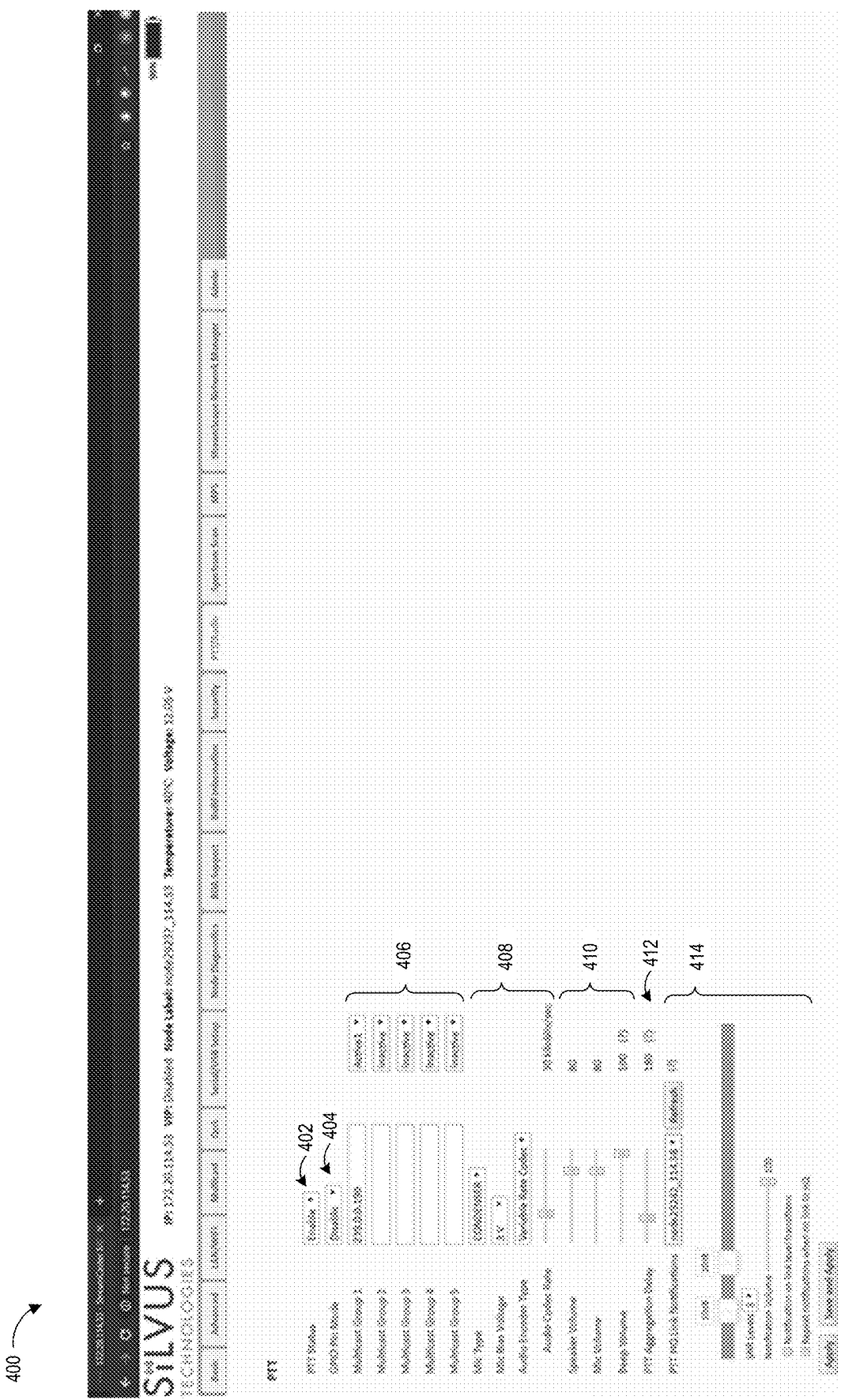
FIG. 4A illustrates an example push to talk interface.
Figure 4B:
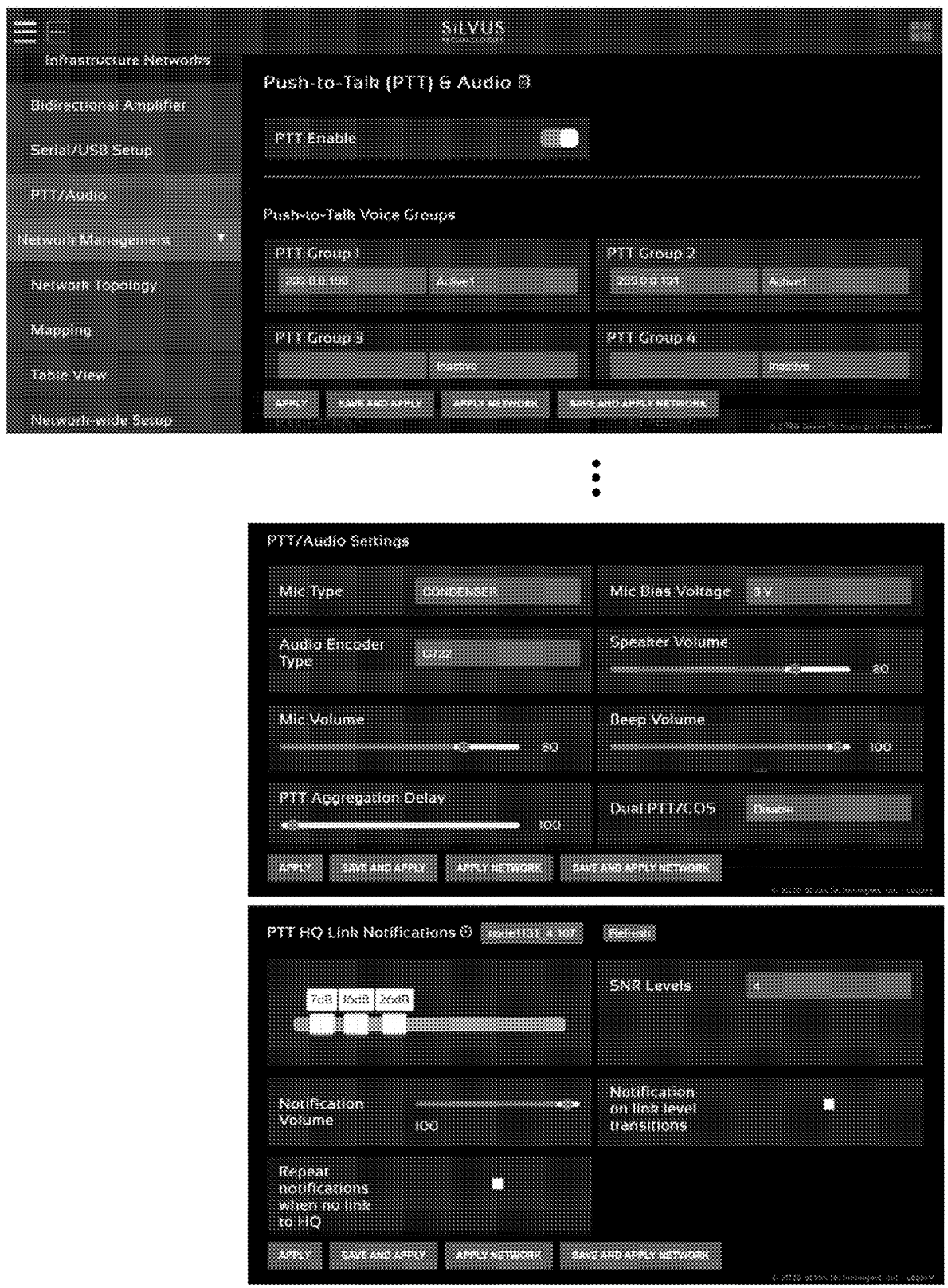
FIG. 4B illustrates further example aspects of a push to talk interface.

FIGS. 4A and 4B illustrates example configurations of an example push to talk interface 400 for modifying or accessing the settings a PTT button or other interactive component on one or more devices or radios. For example, the PTT interface 400 can include an enable or disable setting 402 for the PTT button on one or more radios, settings associated with a General Purpose Input Output Pin 404, settings associated with talk groups (for example, multicast groups or PTT groups) 406 or audio related settings for push to talk (PTT) enabled radios (408, 410, 412, 414). As illustrated in FIG. 4B, a variation of Push to talk interface 400 illustrated in FIG. 4A may include a dark color variation of the interface 400.

In some examples, the settings associated with talk groups 406 can include the IP address of one or more multicast groups and a setting to configure a mode regarding the behavior of a multicast group. Radios or other devices within a network can be configured to communicate with other radios that are subscribed to the same 'Multicast Group'. Radios or other devices can be active in multiple talk groups or multicast groups. In some examples, there may be three different modes to select which dictate how a radio or other device behaves within a group. For example, the three different modes can include an active mode, an inactive mode, or a monitor mode. The active mode can include a configuration where a radio or other device may send and receive PTT audio on the designated group. The inactive mode can include a configuration where the group is disabled or no PTT audio will be sent or received. The monitor mode can include a configuration where a radio or other device may listen to PTT audio from other users on the designated group, but may not talk.

The audio related settings can include microphone (mic) settings 408, such as mic type, mic bias voltage, and audio encoder type. Mic types can include moving coil, condenser, or other mic type. An input amplification may be adjusted based on the chosen mic type. A mic bias voltage setting can include a variety of bias voltage options, including but not limited to 90% (3V) and 65% (2.15V). An audio encoder type setting can include a 'Variable Rate Code (OPUS),' 'G.722 (high quality),' 'G.711,' or other audio encoder setting. The default audio encoder type may be any suitable type, such as variable rate code (OPUS). The one or more radios may support backwards compatibility of audio encoder type. The audio related settings may additionally or alternatively include a setting associated with an audio codec rate. The setting can include an interaction component to modify the codec rate. For example, the setting can include a movable slider for adjusting the audio codec rate.

The audio related settings can include volume related settings 410, such as speaker volume, mic volume, and beep volume. The volume related settings 410 can include any number of interactive components for adjusting volume. For example, the interactive components can include one or more movable sliders. In some examples, the speaker volume setting can include a movable slider to adjust the gain on the speaker. In some examples, the mic volume setting can include a movable slider to adjust the gain on the microphone. In some examples, the beep volume setting can include a movable slider to adjust the volume of a warning beep as a percentage of the speaker volume.

The audio related settings can include PTT aggregation delay setting 412. The aggregation delay setting 412 can include a movable slider to adjust the amount of time between when packet aggregation occurs and a time when the packet arrives at the aggregation queue for transmitting data over the network as a result of pushing the PTT button.

The audio related settings can include settings associated with PTT HQ Link Notifications 414. For example, when the PTT button is pressed twice within a determined period of time (for example, 1 second), an audio notification can read out the signal to noise ratio (SNR) level to a user-specified node or device. If a level transitions option is enabled, the notification can be played automatically when the SNR level crosses one or more specified thresholds. In some examples, the SNR thresholds can be set by choosing the number of levels desired, and then moving movable sliders accordingly. The PTT HQ link notifications settings 414 may additionally or alternatively include notification volume settings, where a notification volume can be adjusted using one or more interactive components, such as a movable slider. Additionally or alternatively, the settings 414 can include one or more other settings for when a notification is played, such as a notification on link level transitions, or a setting to repeat notifications when there is no detected link to the user-specified node or device.

D. Example Multi Position Switch Feature

A radio or other device may have a multi-position switch that allows a user to change various settings of a radio. For example, a multi-position switch may be a physical switch on a radio or other device with one or more position (for example, 8 positions). Different settings associated with the radio or device may be associated with each of the one or more positions. For example, each position of the multi position switch may correspond to a different network frequency. When a user selects the position of the multi-position switch, the radio may change the network frequency settings to the network frequency associated with that position.

In some examples, when the multi-position switch is turned, the radio may display an indication, such as audio or the illumination of one or more LED lights. For example, the one or more LED lights can quickly flash green. The illumination of the one or more LED lights can indicate information associated with the multi-position switch, such as that settings are being applied for a particular position of the multi-position switch. When the LED stops quickly flashing, that can indicate that settings have been applied. Additionally or alternatively, an audio can indicate that settings have been applied or are being applied for a particular position of the multi-position switch.

Figure 5A:
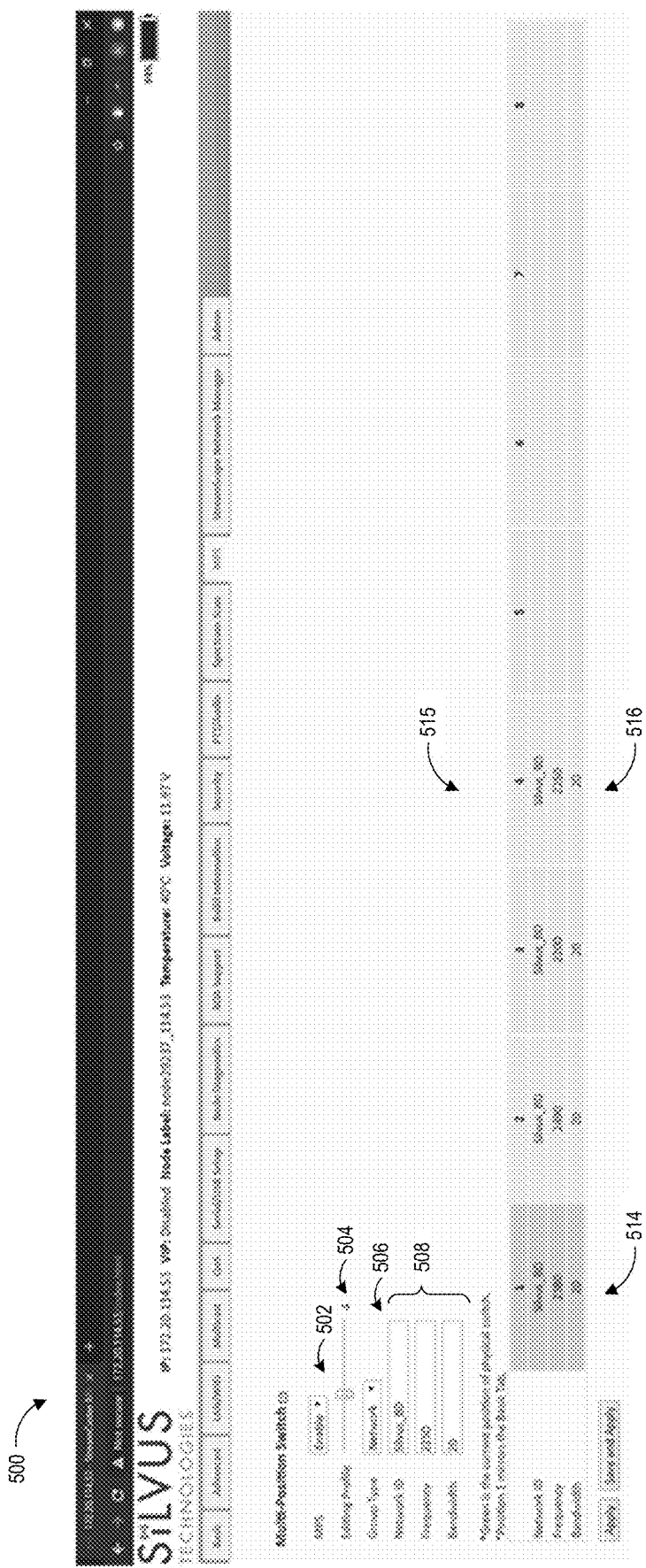
FIGS. 5A-5B illustrates aspects of an example multi position switch interface.
Figure 5B:
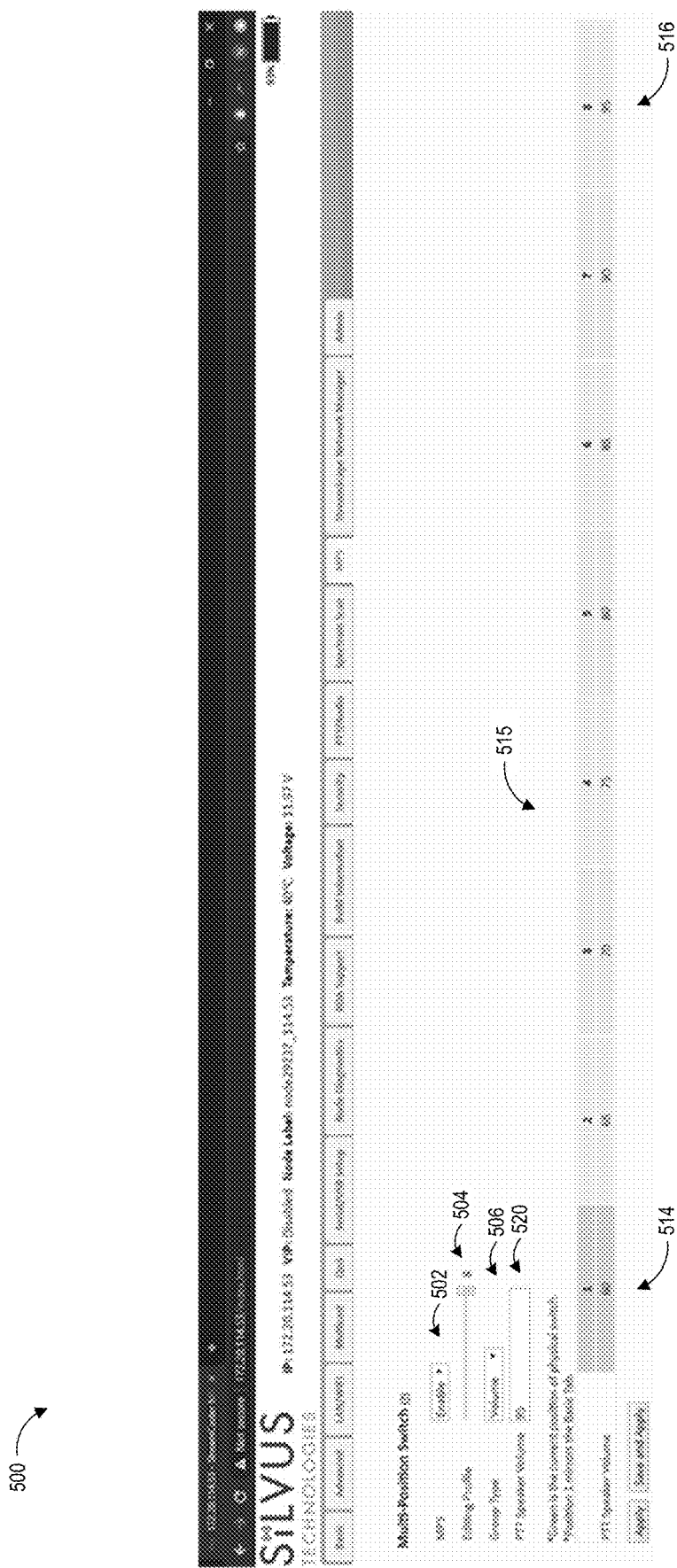
Figure 5C:
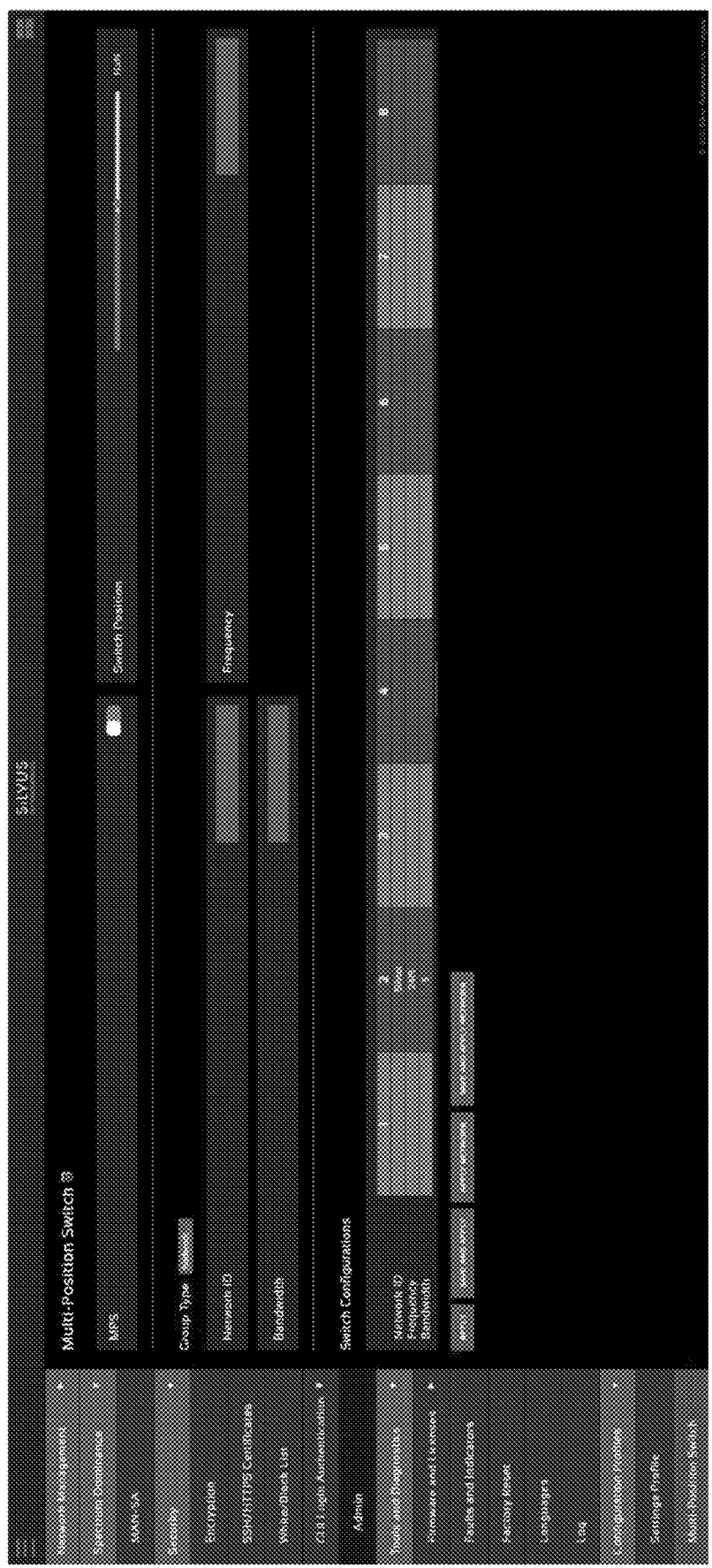
FIG. 5C illustrates another example multi-position switch interface.

Advantageously, the multi-position switch can allow the user to change settings on the radio without interfacing with a GUI. FIGS. 5A-5C illustrates aspects of an example multi-position switch interface 500 for configuring settings of a multi-position switch.

As illustrated in FIGS. 5A and 5B, a multi-position switch interface 500 can include a setting 502 to enable or disable the multi-position switch (MPS), a position selection setting (or editing profile setting) 504, and a group type setting 506. As illustrated in FIG. 5C, a variation of Push to talk interface 500 illustrated in FIG. 5C may include a dark color variation of the interface 500.

A position selection setting 504 can include one or more interactive components for selecting which position of the MPS to edit. For example, the position selection setting 504 can include an "Editing Profile" movable slider to determine which position is currently being edited.

A group type setting 506 can include one or more interactive components for selecting which collection of settings should be applied to the positions of the MPS. The group types can include network settings, volume settings, or other suitable settings. In some examples, only one group type may be active at a given time. In other examples, different group types may be active at the same time in interaction with other switches on the radio. For example, a radio may include two MPSs. A first MPS may determine a group type and a second MPS may determine settings with regard to the selected group type.

Group type specific settings may be displayed in the interface 500 depending on the group type selected in the group type setting 506. For example, as illustrated in FIG. 5A, where a type setting 506 is network, an interface may include a network settings 508, such as network ID, frequency, and bandwidth. In another example, as illustrated in FIG. 5B, where a group type setting 506 is volume, the interface 500 may include volume specific settings, such as PTT speaker volume 520. However, other examples of other settings associated with other group type settings are possible. Additionally or alternatively, the settings associated with each position on the MPS may be customizable such that settings on the MPS are associated with one or more group types. For example, the settings associated with each position may be associated with different group types.

Current settings for each MPS may be displayed within the interface 500 in a setting display area 515. A setting display area 515 can include an indication of settings for each position of a MPS. Additionally or alternatively, the setting display area 515 can indicate a current position of the MPS. For example, the setting display area 515 can include information associated with each position where the position associated with a current position of the MPS has a color difference from the information associated with the other positions. A position currently being edited 516 may or may not be indicated within the setting display area 515 by an indication, such as a color indication.

In some examples, the MPS can include a zeroize setting. For example, the MPS may have a position associated with a reset of one or more settings or features associated with the radio. The zeroize setting may be a position on the MPS that can be reached by turning, lifting, pushing, otherwise interacting with the MPS, or some combination thereof. In some examples, the MPS may include multiple positions (for example, 13 positions). An MPS may be lifted, pushed or turned from an off position to activate one or more settings associated with different positions on the MPS (for example, in a clockwise or counterclockwise rotation). To activate the zeroize setting, the MPS may be lifted or pushed and turned to the MPS setting (which, for example, may be the last of the multiple positions). In some examples, the position can include a reset of one or more network settings of the device. In another example, the position can include a reset of one or more security feature settings of the device. The interface 200 can include one or more settings associated with the zeroize position or setting on the device. For example, the interface 200 can include default settings to reset to. In another example, the interface 200 can include settings to set what types of settings the zeroize position may affect.

E. Example Networking Interface

Figure 5D:
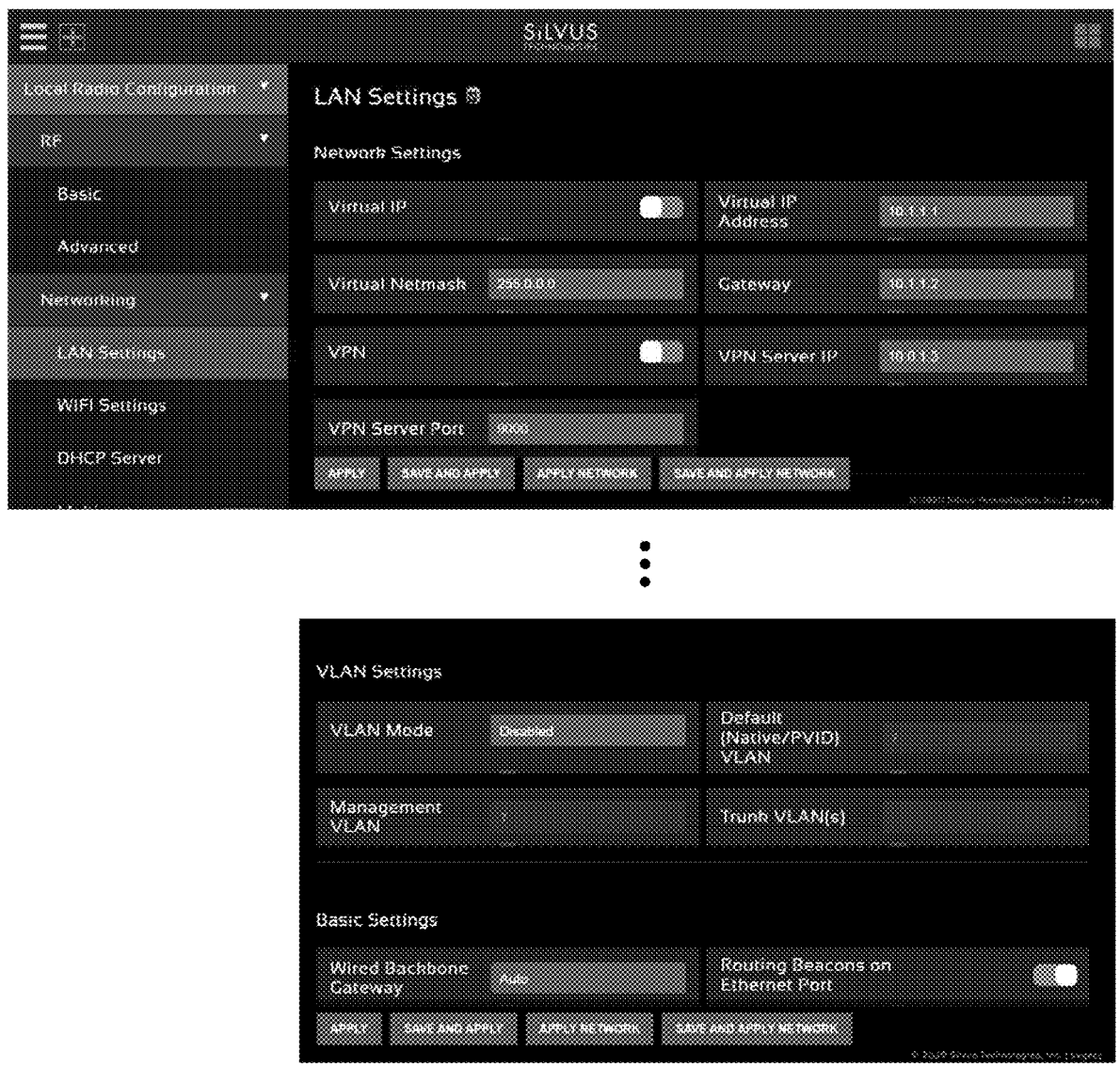
FIGS. 5D-5I illustrate example interface configurations of example networking aspects of a graphical user interface.

FIGS. 5D-5I illustrate aspects of an example networking interface. FIG. 5D illustrates aspects of LAN settings interface, which may include network settings such as virtual IP mode, virtual IP address, virtual network, gateway, VPN, VPN server IP, VPN server port, VLAN settings such as VLAN mode, default (native/PVID) YLAN settings, management VLAN settings, trunk VLAN(s) settings, and basic settings, such as wired backbone gateway setting, and setting for routing beacons on Ethernet port.

Figure 5E:
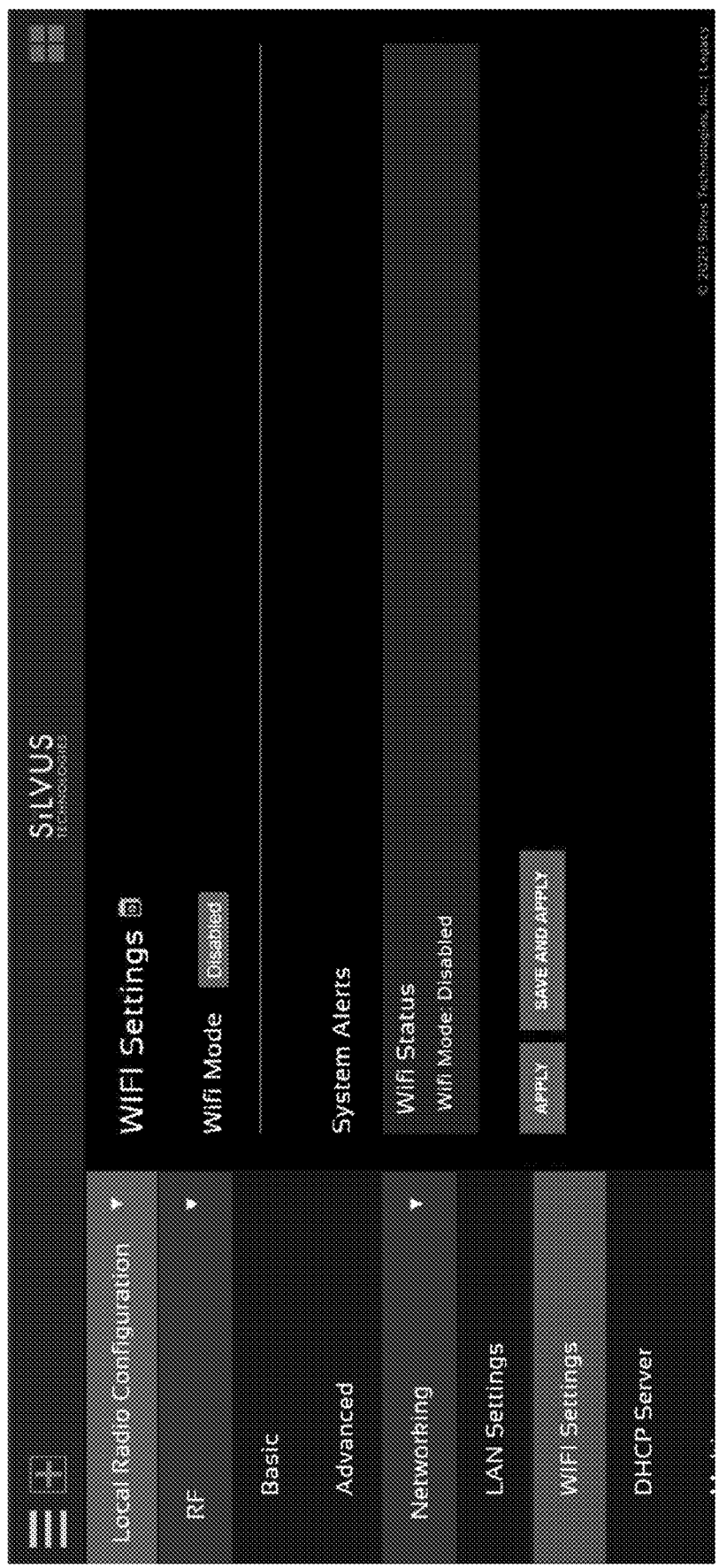

FIG. 5E illustrates aspects of a Wi-Fi settings interface, which may include wife mode setting and system alerts settings, such as Wi-Fi status and wife mode. Other Wi-Fi settings may also be included.

Figure 5F:
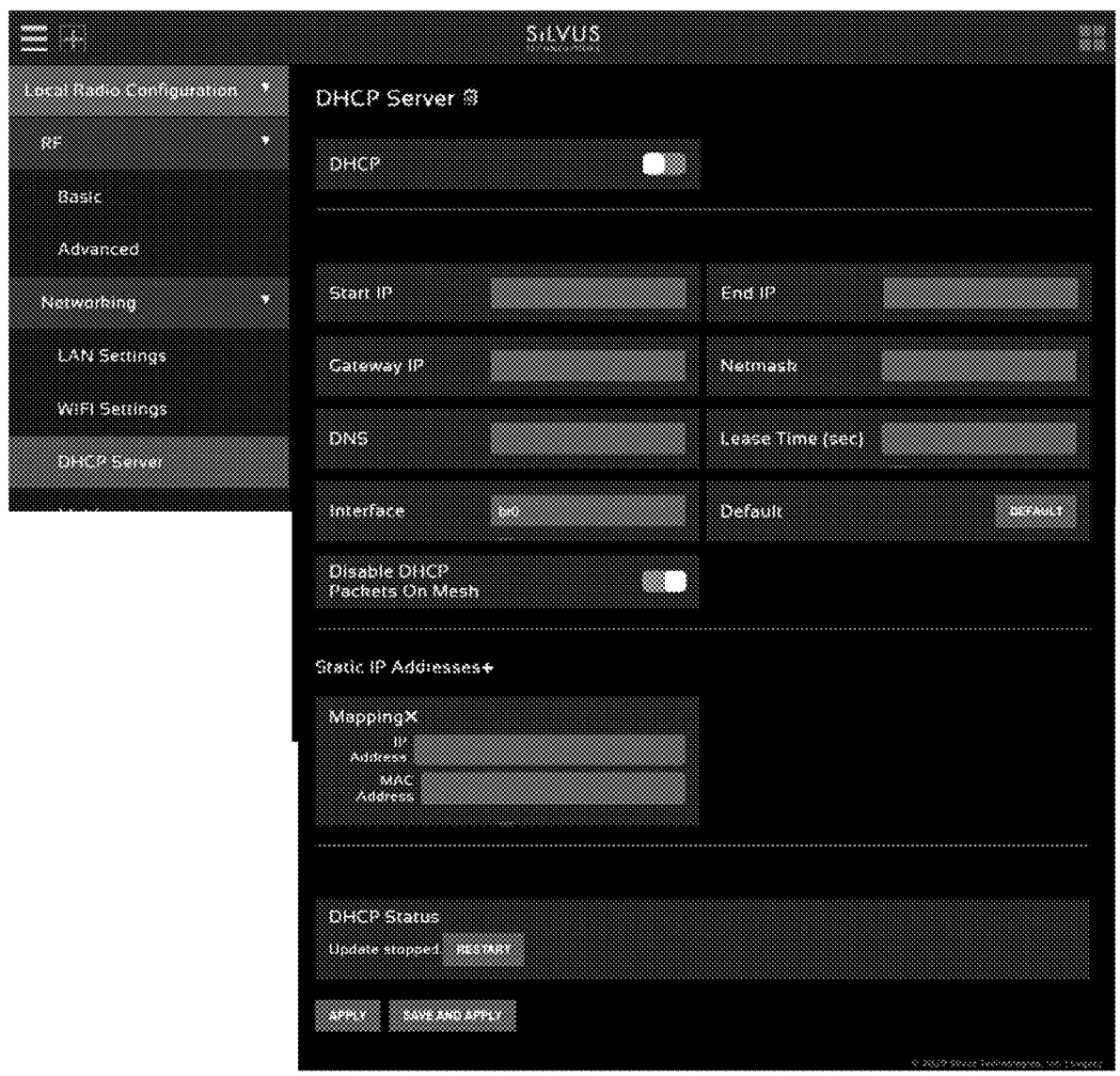

FIG. 5F illustrates aspects of a DHCP server interface, which may include DHCP server settings, such as a DHCP enable or disable mode, start IP, end IP, gateway IP, netmask, DNS stings, lease time (sec), interface, default or reset setting, disable DHCP packets on mesh setting, static IP address settings, DHCP status update and restart settings, the like or a combination thereof.

Figure 5G:
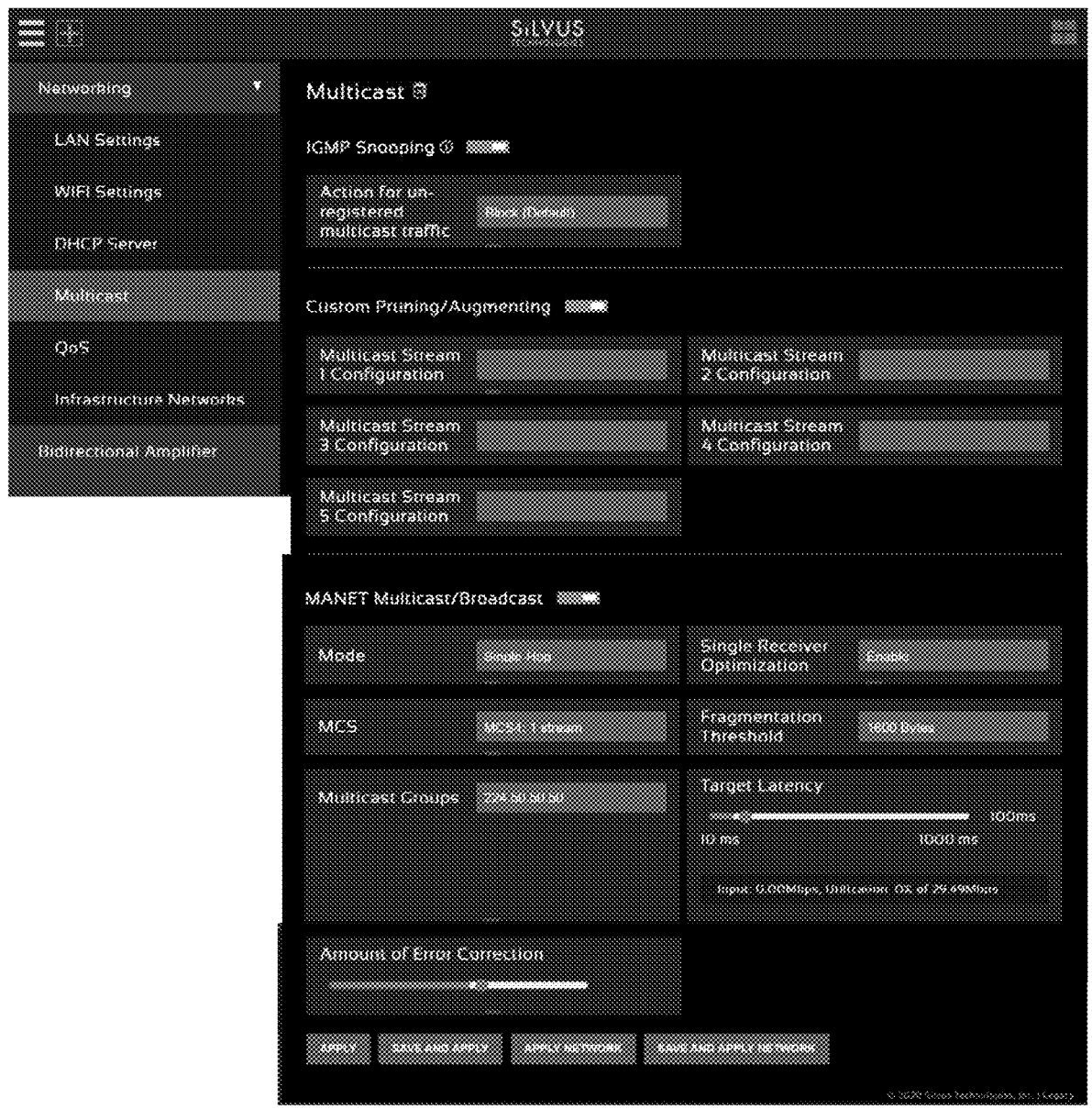

FIG. 5G illustrates aspects of an example multicast interface. For example, a multicast interface may include IGMP snooping mode setting to enable or disable IGMP snooping, settings to select an action for unregistered multicast traffic, such as block or allow, settings associated with custom pruning/augmenting, such as a setting to enable or disable custom pruning/augmenting and one or more settings to configure one or more multicast streams, and one or more MANET associated settings, such as a setting to enable or disable a multicast or broadcast mode, one or more mode selection settings to select a mode such as single-hop, one or more single receiver optimization settings, MCS setting, fragmentation threshold setting, multicast group address setting, target latency setting, and amount of error correction.

Figure 5H:
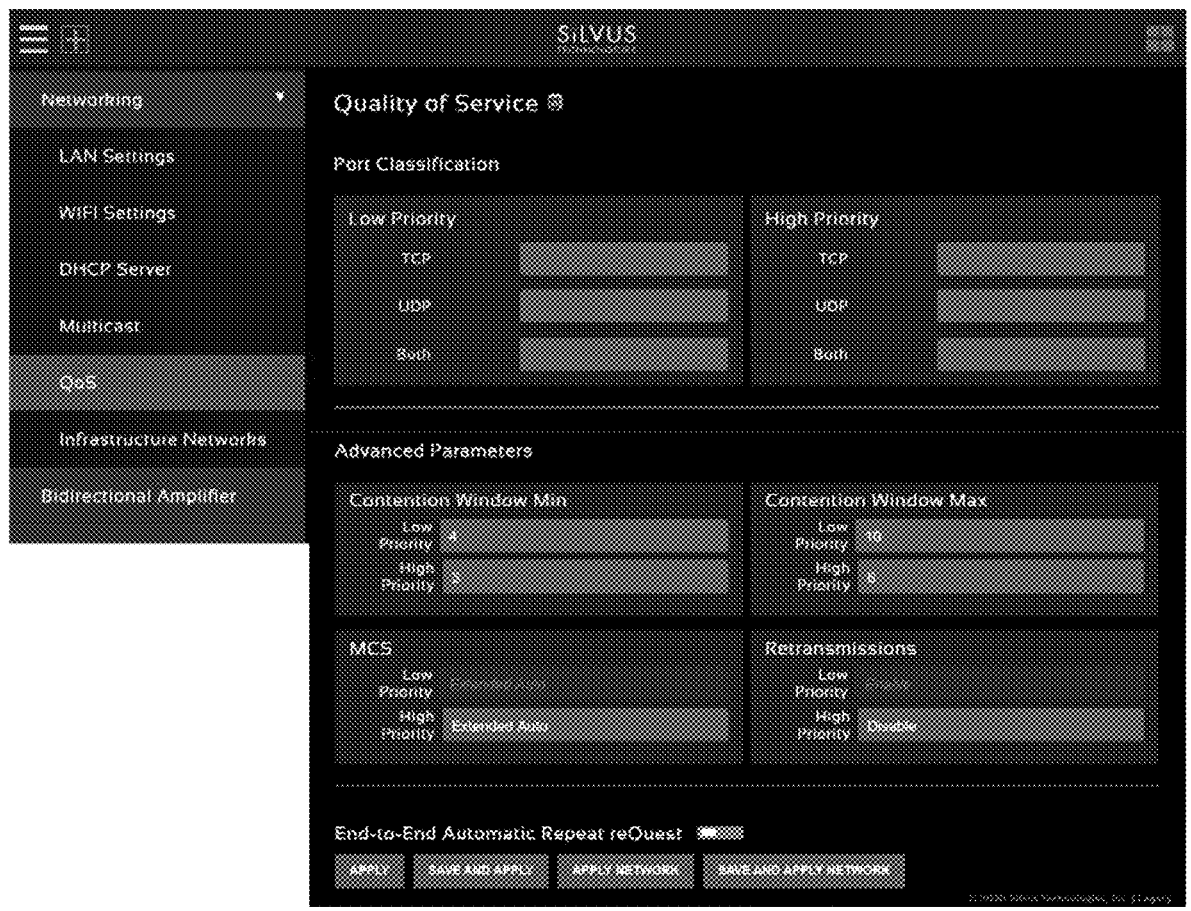

FIG. 5H illustrates aspects of an example Quality of Service (QoS) interface, which may include one or more settings associated with a QoS associated with the network of a device. One or more settings may include port classification settings, such as TCP and/or UDP settings for low or high priority traffic or nodes on a network. Further settings may include advanced parameters settings, including but not limited to contention window minimum and maximum settings, MCS settings, and retransmissions settings. In some examples, an end-to-end automatic repeat reQuest settings, such as an enable or disable setting.

Figure 5I:
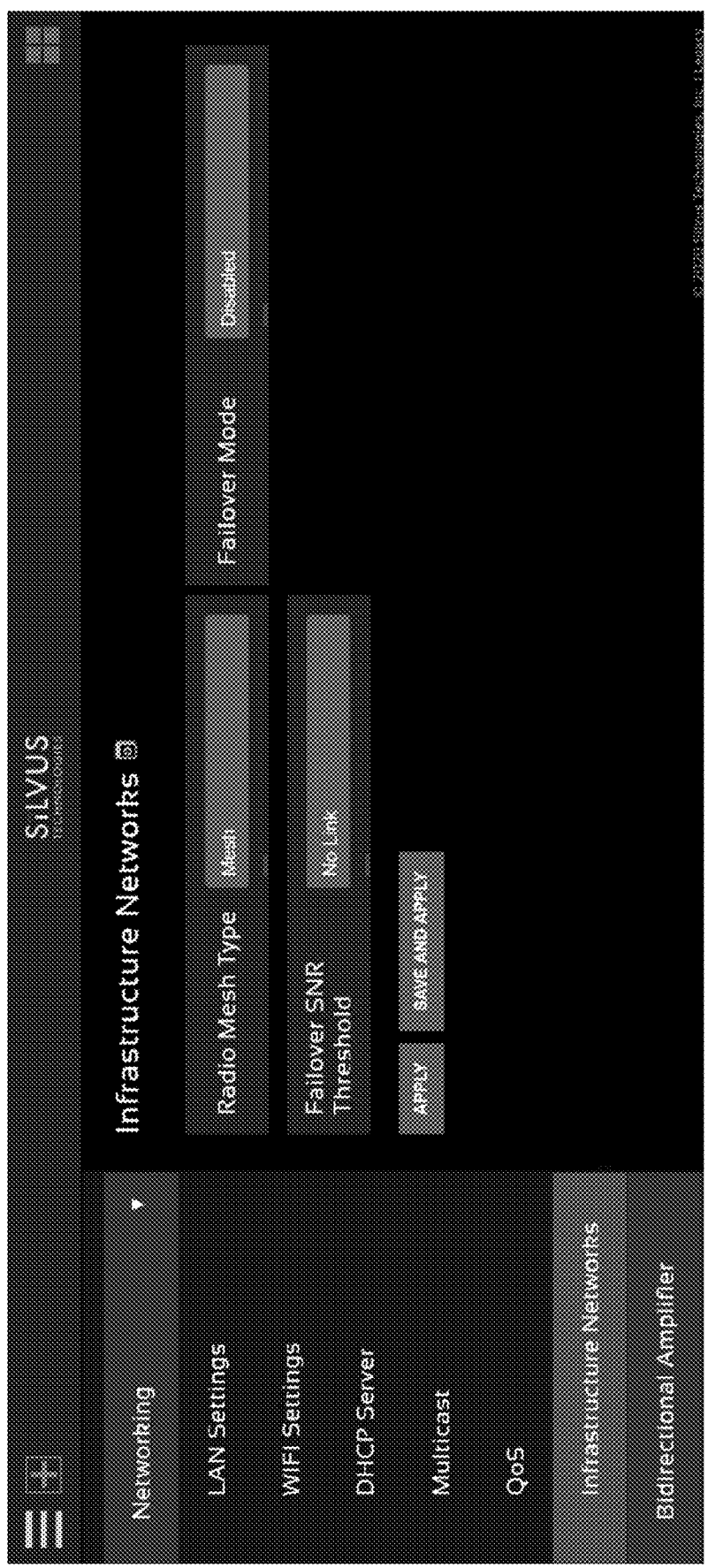

FIG. 5I illustrates aspects of an example infrastructure network setting, including but not limited to radio mesh type settings, failover mode settings, and failover SNR threshold settings.

F. Bidirectional Amplifier Interface

Figure 5J:
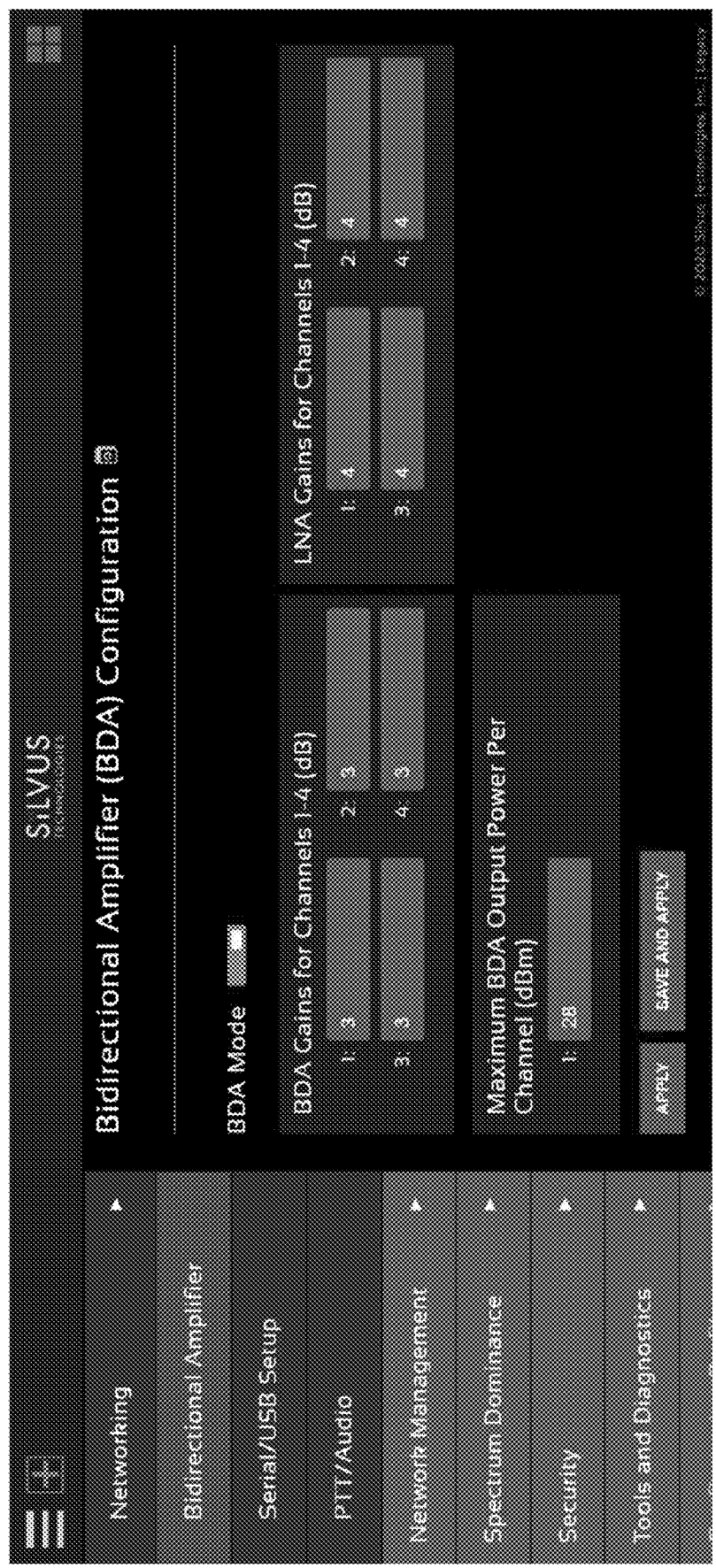
FIG. 5J illustrates an example bidirectional amplifier (BDA) configuration of a graphical user interface.

FIG. 5J illustrates aspects of an example bidirectional amplifier (BDA) configuration interface. For example, a BDA configuration interface may include one or more BDA associated settings, including but not limited to a BDA mode enable or disable setting, BDA gain settings for a plurality of channels, LNA gains for a plurality of channels, a maximum BDA output power per channel, the like or a combination thereof.

G. Example Serial/USB Setup Interface

Figure 5K:
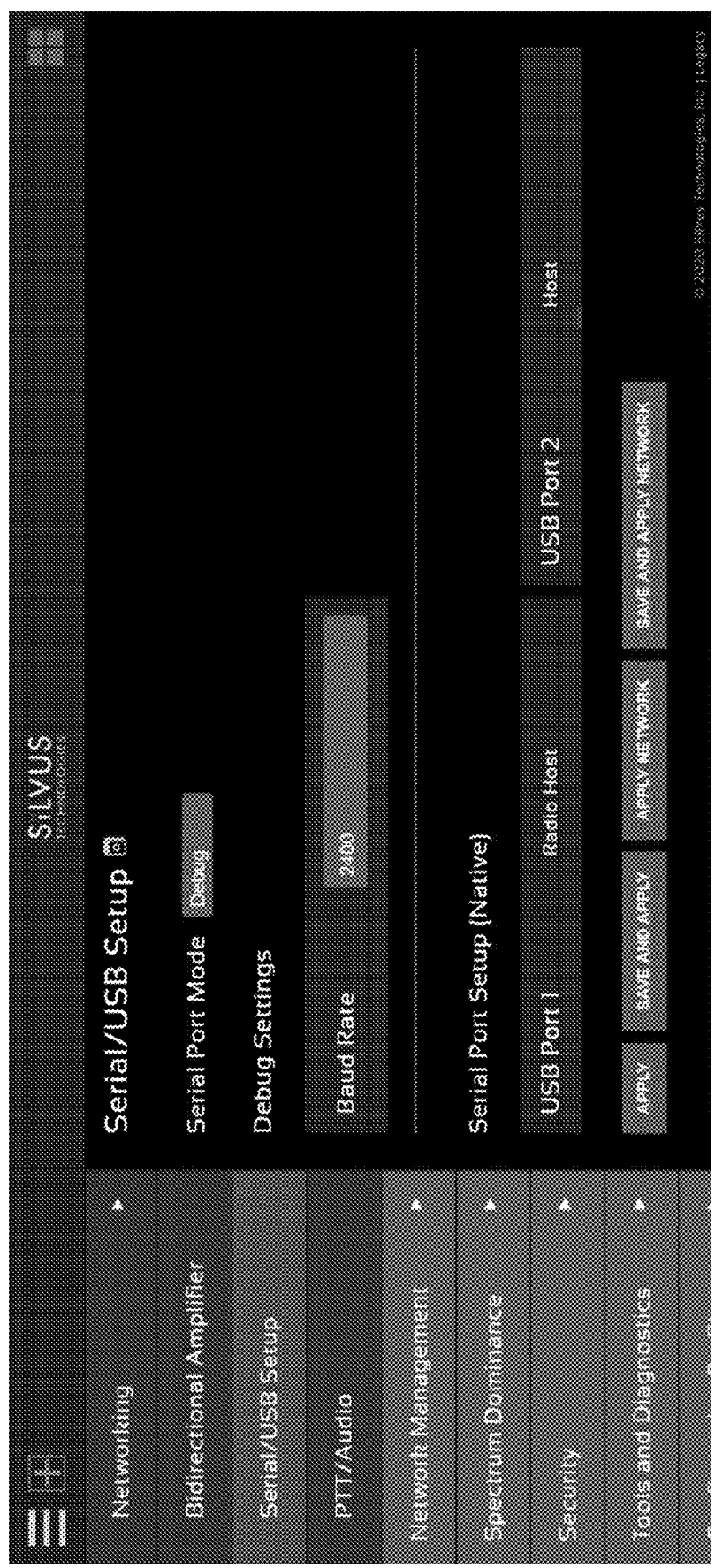
FIG. 5K illustrates an example serial/USB setup interface configuration of an example graphical user interface.

FIG. 5K illustrates aspects of an example serial/USB setup interface. For example, a serial/USB setup interface may include serial port or USB port settings and/or information for a serial or USB port on a wireless communication device, including but not limited to a serial port mode setting, debug settings, such as Baud rate, serial port setup (native) settings, such as USB port designations.

H. Example Large Network Topology Interface

In cases where there are many nodes or devices connected to a network, a network topology interface 600 can, advantageously, provide a user real-time visual feedback of the network due to a graphical representation, and allow users to determine several network characteristics at a glance.

1. Topology Diagram

Figure 6A:
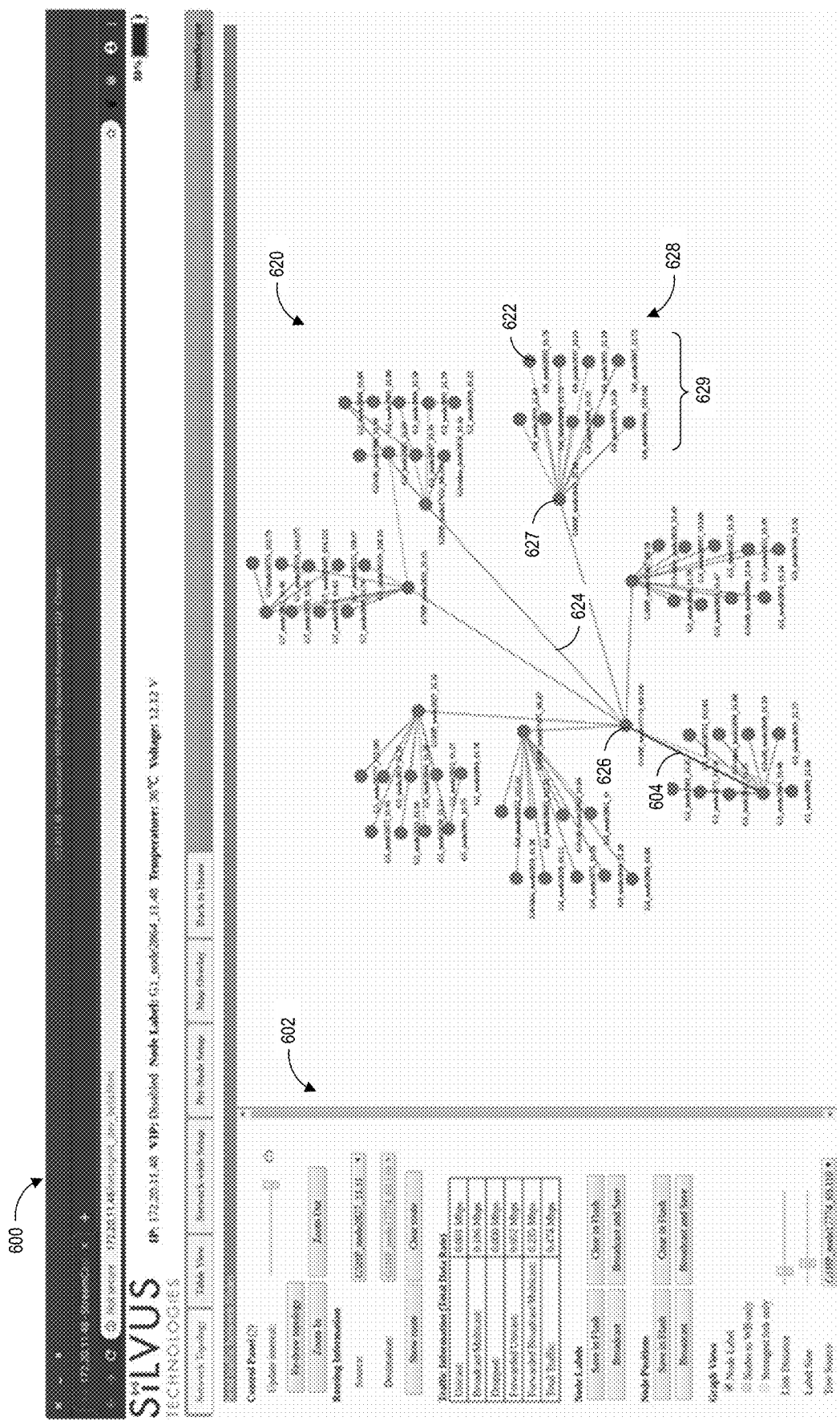
FIGS. 6A-6B illustrate aspects of an example large network topology interface.
Figure 6B:
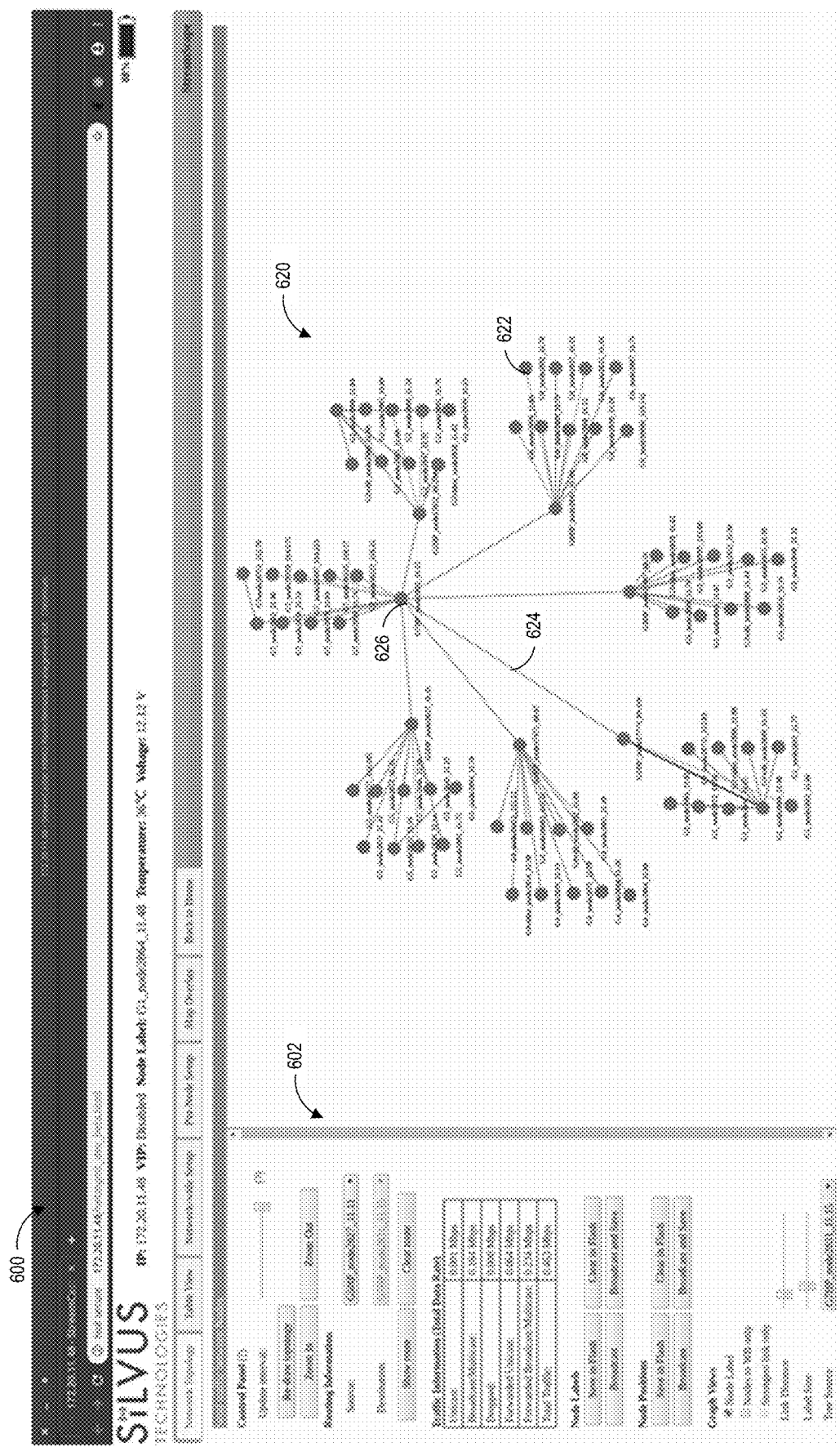

FIGS. 6A-6B illustrate aspects of an example large network topology interface 600. For example, a network topology interface 600 can include a control panel 602 and a network topology diagram 620.

A control panel 602 can include one or more interactive components for controlling an appearance of the network topology diagram 620. For example, the control panel 602 can include controls for an update interval of the diagram 620, controls for controlling zoom of the control panel or the topology diagram, controls for re-drawings the topology diagram or other diagram 620 related controls.

A control panel 602 can include one or more controls for displaying information associated with the network displayed in the network topology diagram 620, such as controls associated with the display of routing information in the network. For example, the control panel 602 can include controls to display or clear one or more currently displayed routes between one or more selected source nodes and one or more selected destination nodes. Once selected to display, a path may be emphasized or otherwise indicated on the network topology diagram 620. For example, a selected path 604 may be bolded.

A control panel 602 can include controls associated with nodes of a network as displayed in the network topology diagram 620. For example, the control panel 602 can include controls associated with node labels and node positions. Node labels controls can include save or clear controls for labeling nodes in the network or network topology diagram 620. Additionally or alternatively, node label controls can include broadcast or save controls for broadcasting node labels. Node position controls can include save or clear controls for positioning nodes in the network topology diagram 620. Additionally or alternatively, node position controls can include broadcast or save controls for broadcasting node positions within the network topology diagram 620.

A control panel 602 can include controls associated with how to display the network topology diagram 620. For example, the control panel 602 can include options on which nodes to display and the appearance of the topology diagram 620, such as the presence of labels, the link distance, label size, and node tree source. The tree source node 626 can include a node 626 within the network to serve as a tree source for the diagram 620. For example, the diagram 620 may display links 624 that indicated how every other displayed node in the network links to the node 626. Advantageously, the diagram 620 may exclude links from nodes that are not the tree source node 626 such that the diagram 620 will not be overcrowded by displayed links between every node in the network. A default tree source node may be the node or radio that a user has logged into via the interface 600.

Additionally or alternatively, a control panel 602 can include displayed information associated with the network displayed in the network topology diagram 620. For example, network traffic information may be displayed in table form within the control panel 602. The table may contain current network traffic information associated with the network, such as data rate associated with unicast, broadcast/multicast, dropped, forwarded unicast, forwarded broadcast/multicast, total traffic, or other traffic information.

Figure 6C:
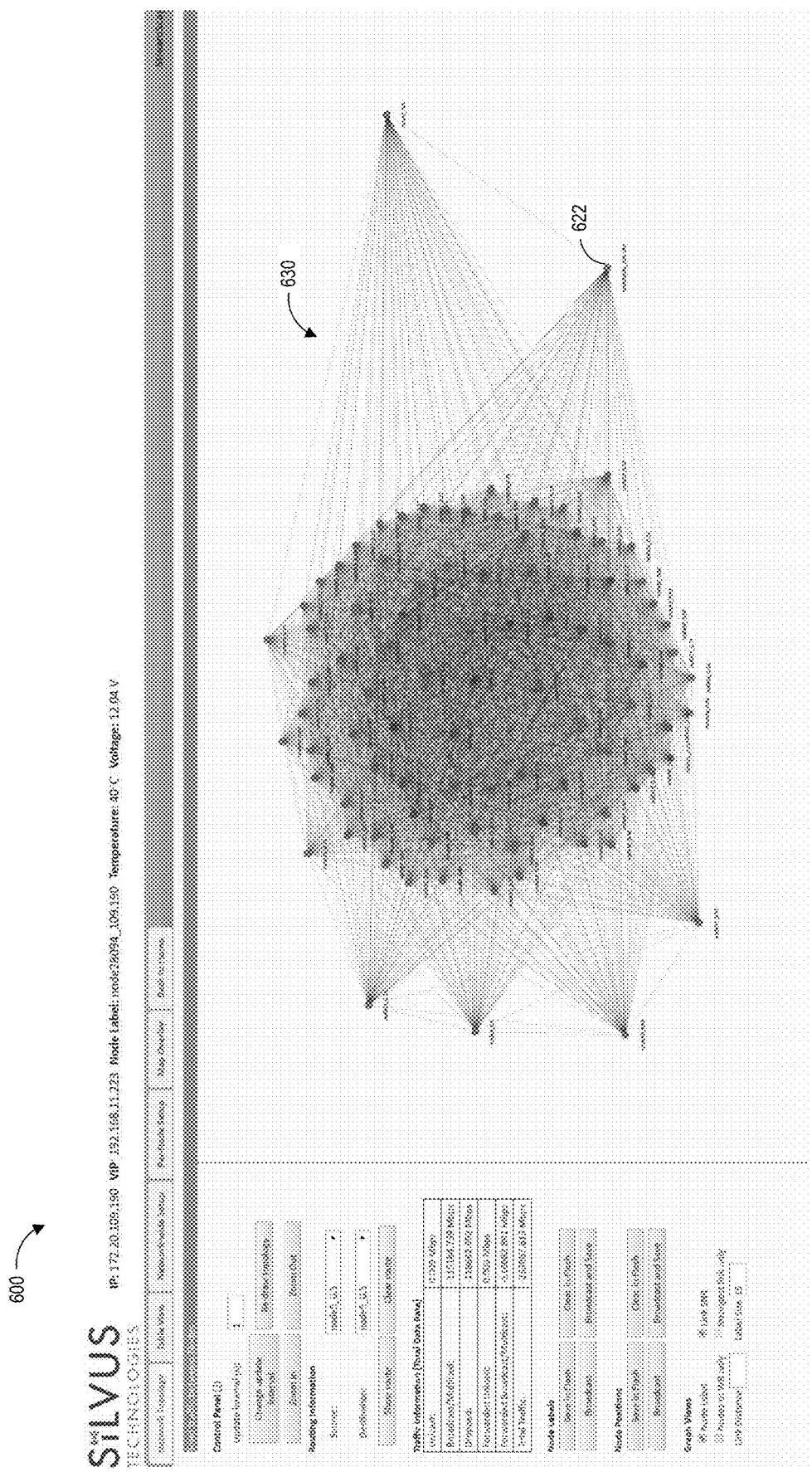
FIG. 6C illustrates an alternative view of an example large network topology interface.
Figure 6D:
FIG. 6D illustrates another aspect of an example network topology interface.

In another example, as illustrated in FIG. 6D, a control panel 602 may configured be hidden or displayed using a control panel access button 605 that may be part of the interface 600. The control panel may be displayed and/or populated adjacent to the network topology diagram 620. In some examples, the control panel may be displayed adjacent to an interface menu 309. A control panel 602 may be displayed in whole or in part on a single screen. In some examples, the control panel may be scrollable so that different aspects of the control panel may be displayed with a user's scrolling.

In some examples, other controls or network or system information may be accessed, displayed, or hidden using other access buttons 603. The access buttons 603 may be displayed adjacent to the network topology diagram 620 so that a user does not have to navigate away from a network topology diagram to change aspects of the network or devices on the network or access information associated with the network or devices on the network.

A network topology diagram 620 can display nodes 622 and links 624 associated with the network. Information associated with the nodes 622 and links 624 can be displayed by emphasizing various aspects of the network topology diagram 620. For example, route health can be indicated by color. In some examples, when too many packets are being routed through a single node, a color of a node 622 may change from green to yellow to red as the packet queue increases. Advantageously, the color change may allow a user to recognize issues related to the route and give the user the opportunity to rearrange the network accordingly. In some examples, a link with traffic of greater than 20 dB may be green, a link with 10-20 dB may be orange or yellow, and a link with traffic of less than 10 dB. In some examples, a node with less than 10 packets in queue may be green, a node with between 10 and 100 packers in queue may be orange or yellow, and a node with greater than 100 packets in queue may be red.

The location of the nodes 622 and links 624 within the network topology diagram 620 can form any number of geometric patterns and can be based on any number of criteria. In some examples, the location of the nodes 622 and the links 624 can be determined by a force-directed graph drawing algorithm or other computer algorithm. In some examples, nodes 622 may be grouped into clusters 628. The clusters 628 may be determined based on any number of criteria, such as an approximate shared physical location or shared network traffic. The number of nodes in a cluster may be fixed or vary based on the criteria. The clusters 628 can include a sub-tree source node 627 and one or more associated nodes 629. A sub-tree source node 627 may be arranged to have a location within the network topology diagram 620 that is more central than its one or more associated nodes 629. In cases where a new tree source node is selected, the diagram may arrange the nodes such that the tree source node 626 is a sub-tree source node 627 within the diagram 620. The one or more associated nodes 629 may be arranged in any suitable manner within the cluster, such as in one or more columns near the sub-tree source node, in a triangular pattern, in a circular pattern, or in any other pattern. The one or more clusters 628 may then be arranged in a geometric pattern.

In cases where a tree-source node 626 is selected, an interface 600 may select one or more links 624 associated with the tree source node 626 to display. For example, a system may determine one or more links 624 associated with the tree source node 626 to display by determining which link 624 are used in the network to transfer data between the tree source node and every other displayed node 622 in the network. The interface 600 may display only those links between nodes used to transfer that data.

Advantageously, displaying only those nodes can provide a more user friendly and useful interface 600 to a user. For example, as illustrated in FIG. 6C, a topology diagram 630 that displays every link between nodes may prevent a user from understanding a flow of traffic between nodes of interest due to too many overlapping links. Thus, by only displaying select links, a user may quickly determine information associated with their desired node.

Additionally or alternatively, nodes may be moved within the interface 600. For example, a user may click and drag a node from one location in the diagram 620 to another location in the diagram 620. Links can lengthen, shorten, change shape, disappear, or otherwise change as a result of the movement of one or more of the nodes. In some examples, a diagram 620 can be organized according to a rough grid. When a user moves a node within the diagram 620, the node may move to an area on the grid close to the location specified by the user during the movement. Advantageously, use of a grid can improve the readability of a large network when displayed in a diagram 620.

Figure 7A:
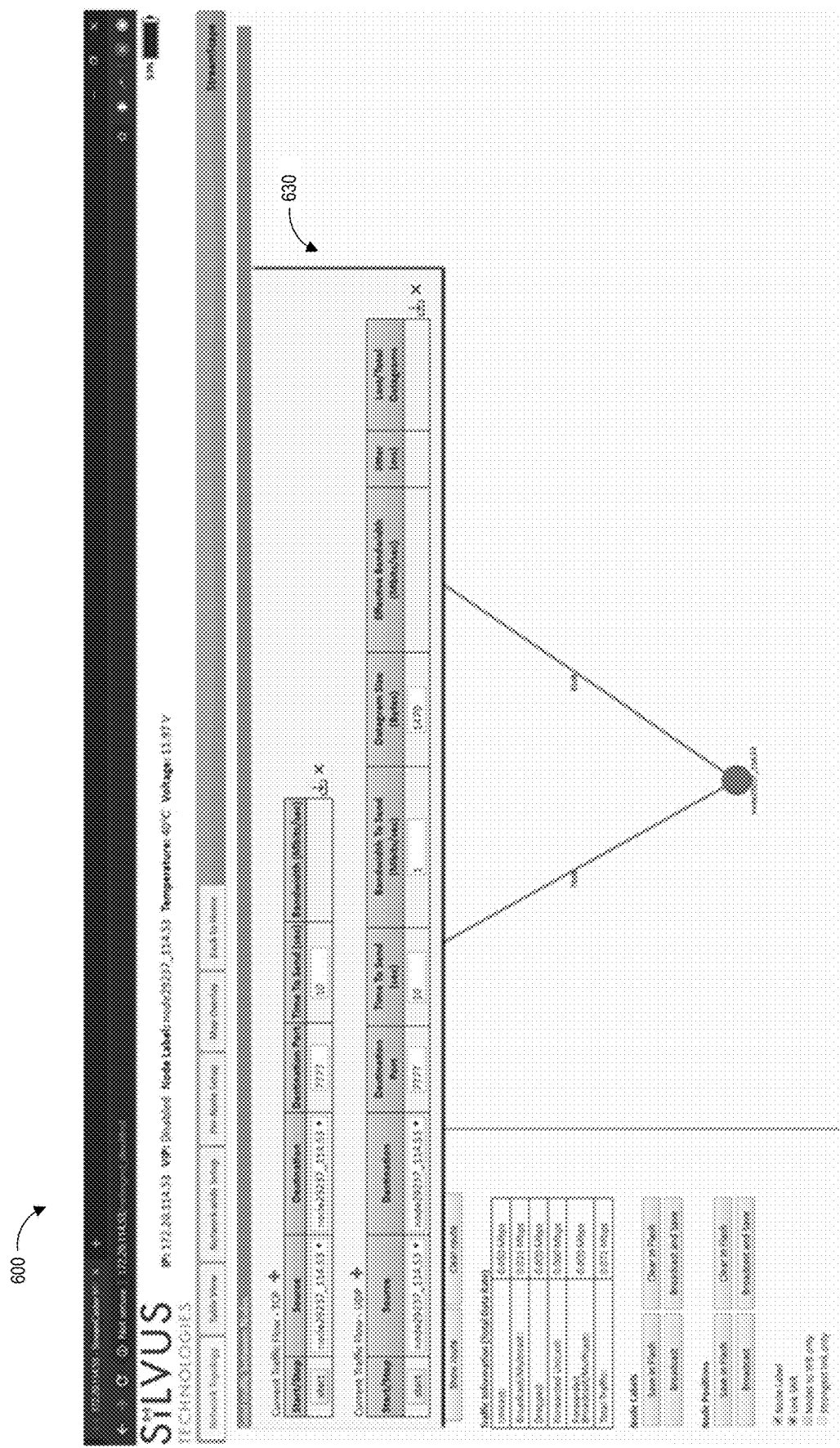
Figures 1, 7A:
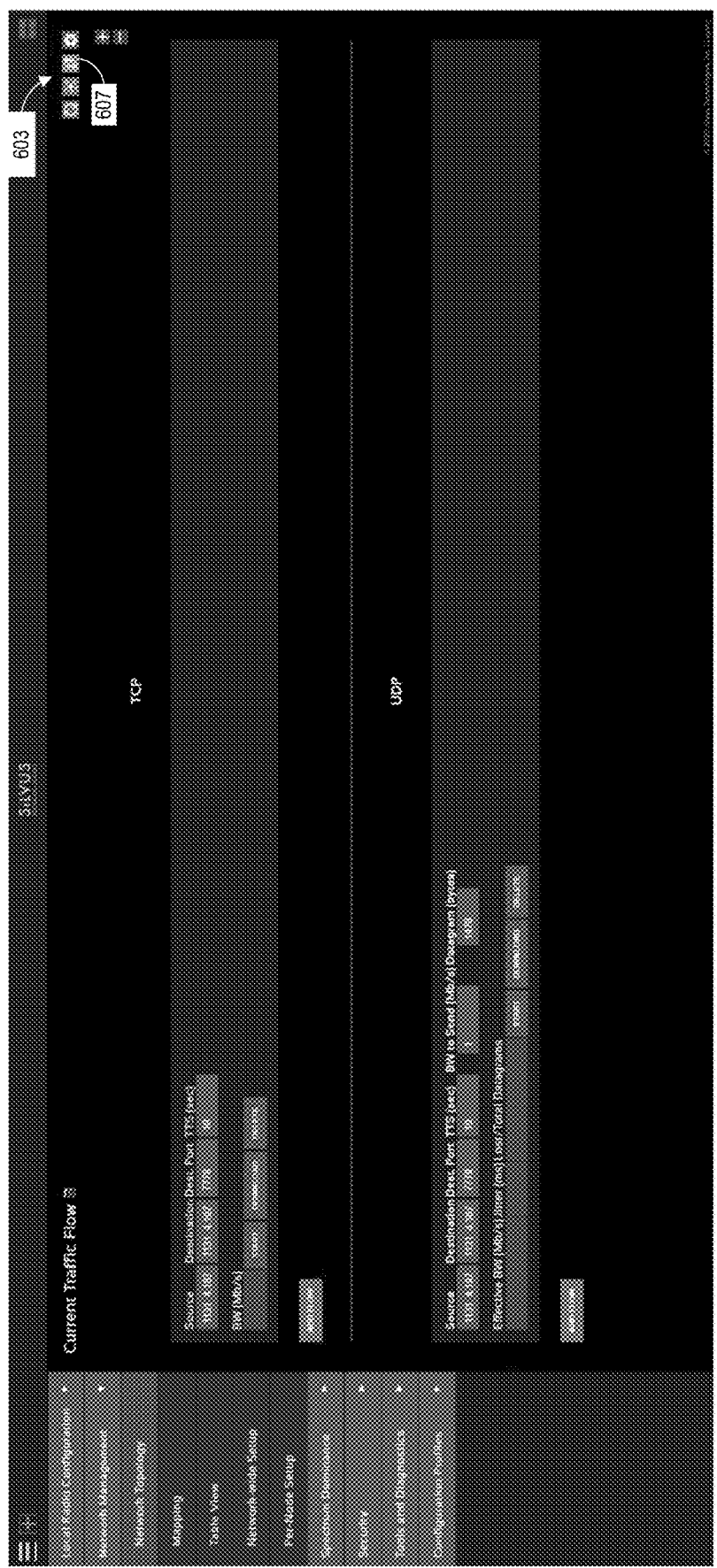

FIGS. 7A-7D illustrate example interactions with an example large network topology interface 600. For example, as illustrated in FIG. 7A, an interface 600 can include a test traffic interface 630 that may allow a user to send test traffic across radios or nodes within a network (for example, using an iPerf feature). In some examples, the test traffic interface 630 may be accessed by clicking an area of the interface 600. For example, the test traffic interface 630 may be accessed by clicking a bar at the top of the topology diagram 620. The bar may be titled "Send traffic between nodes" or the like. Clicking on the area of the interface 600 can open up a secondary menu where a user can specify settings for sending traffic between nodes, such as UDP/TCP data, source/destination, port, time to send, and datagram size. In some examples, the results of the test traffic may be displayed in the test traffic interface 630, such as effective bandwidth, jitter, and lost or total datagrams. Additionally or alternatively, as illustrated in FIG. 7A-1, the test traffic interface 630 may be accessed using an access button 607. In some examples, such as illustrated in FIG. 7A-1, a test traffic interface may be displayed separately from a network topology diagram. In some examples, such as illustrated in FIG. 7A, the test traffic interface 630 may be displayed in an overlay over the network topology diagram.

Figure 7B:
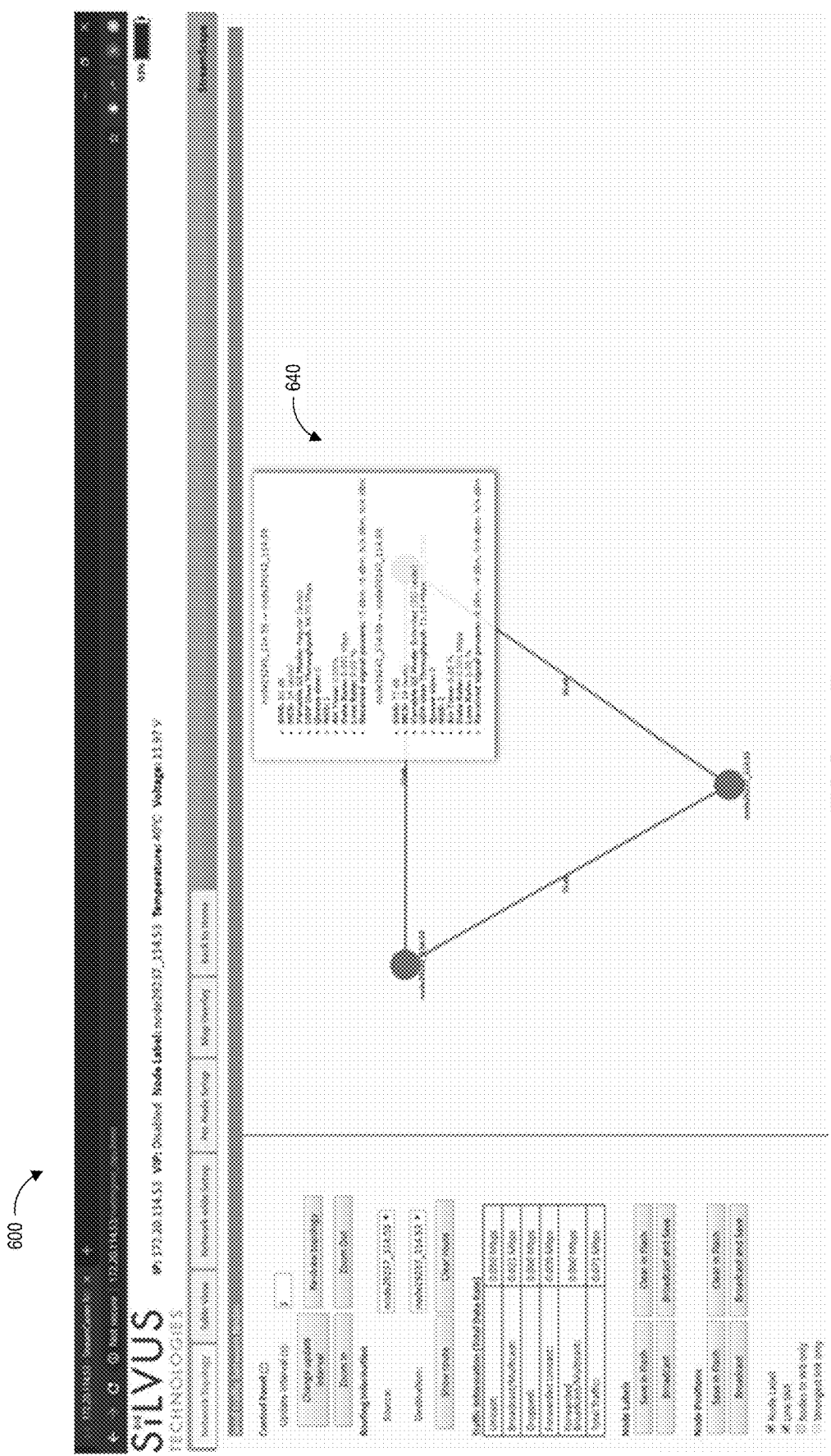
Figures 1, 7B:
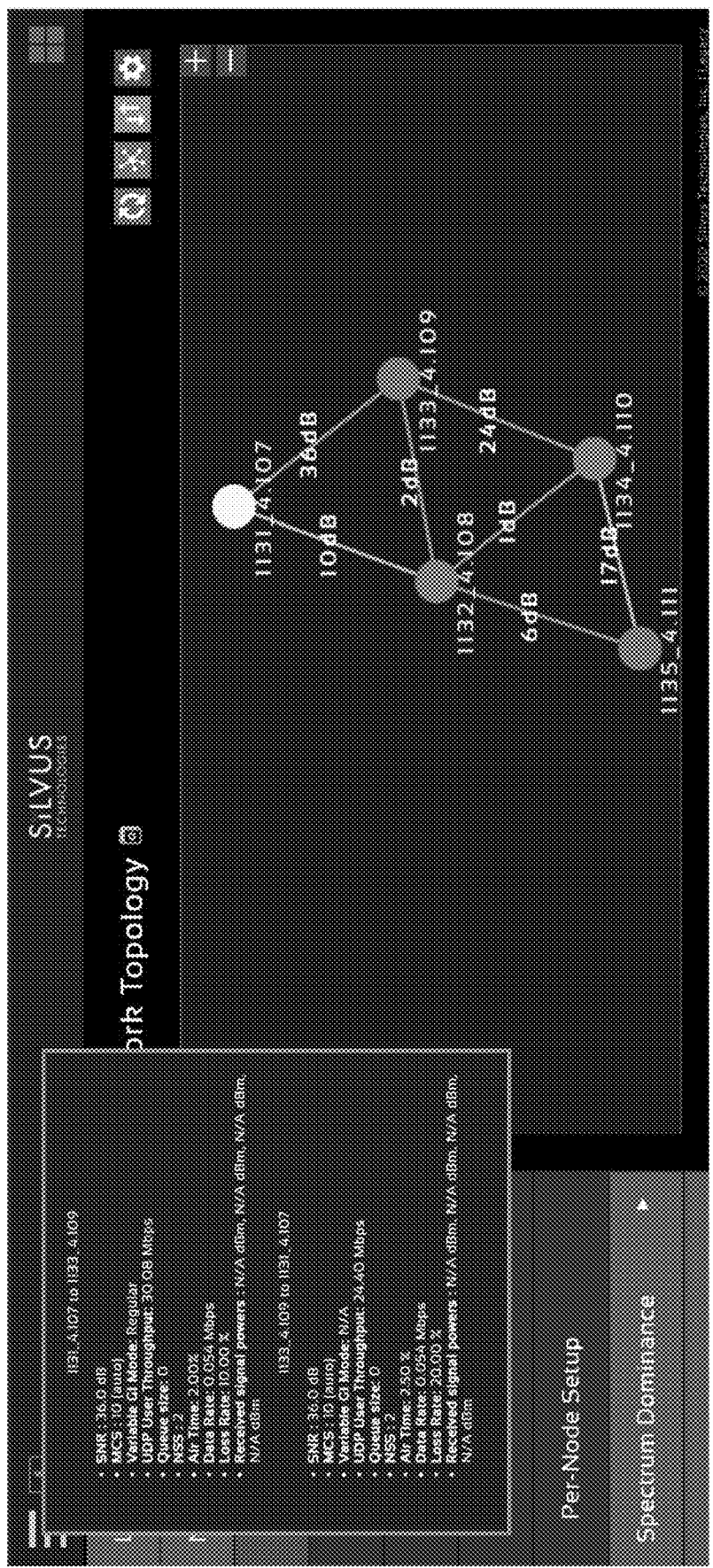

In another example, as illustrated in FIG. 7B, a user may retrieve information associated with a one or more links in a network by interacting with the diagram 620. For example, the user may scroll over or click on a link to retrieve information associated with the link. The information associated with a link may be displayed in a window 640 near, on, or in the diagram 620, such as overlayed over the diagram. The information can include SNR, MCS, Variable GI mode, UDP user throughput, queue size, NSS, air time, data rate, loss rate, and received signal powers in one or more directions between nodes. FIG. 7B-1 illustrates an alternative configuration of displayed information.

An MCS mode can include MCS used to transfer data in each direction. UDP User Throughput can include the estimated UDP User Throughput available for each direction of the link. This may be estimated based on the current MCS used for transmission. Queue Size can include the number of packets in a TX Queue in each direction. NSS can include the number of spatial streams in each direction. Air time can include the percentage of air time used in each direction. Data rate can include the data rate in each direction along the link. Data loss rate can include the percentage of data lost during transmission between the nodes. Received Signal Powers can include the received signal power for each antenna in each direction.

Figure 7C:
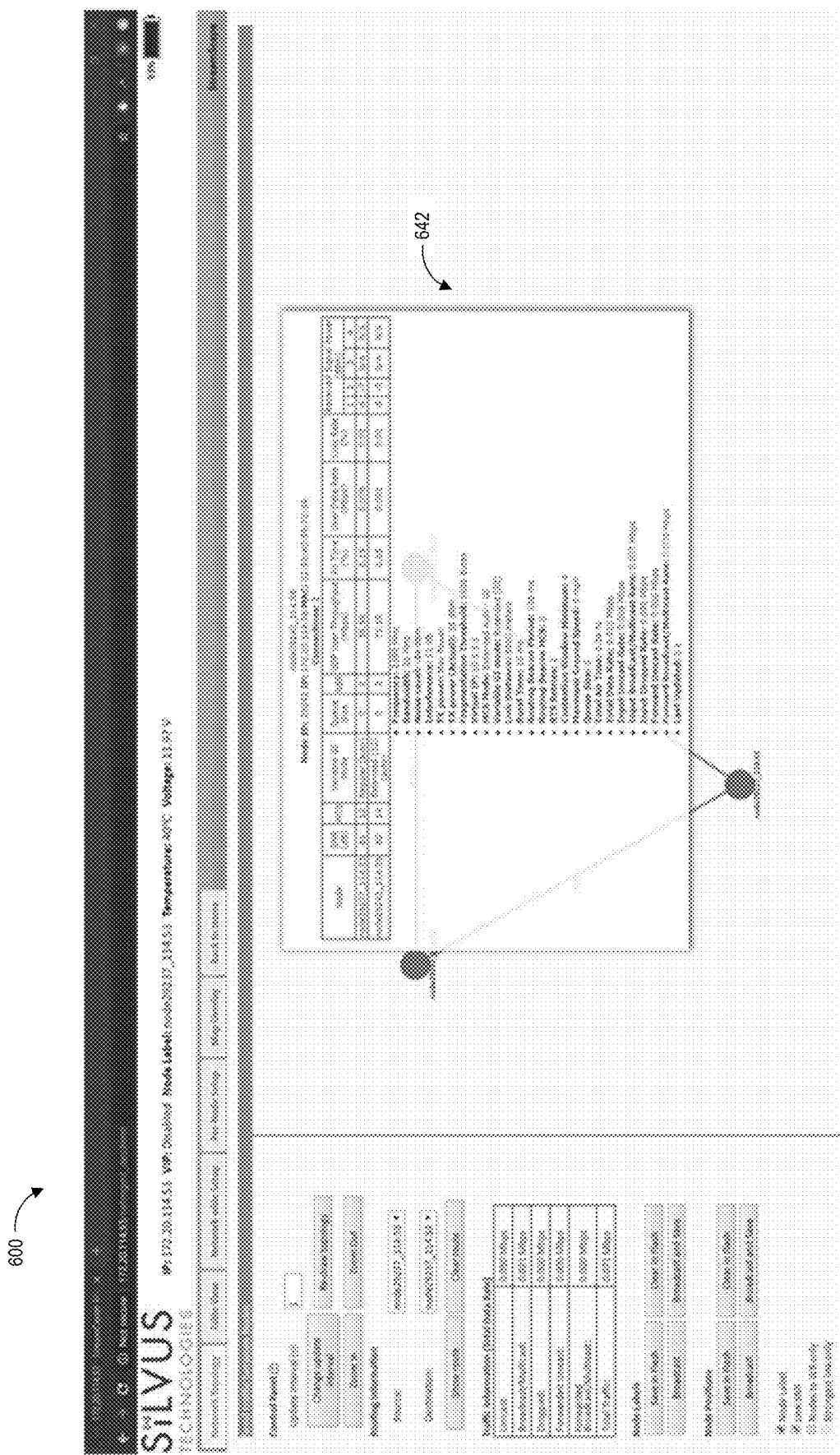
Figures 1, 7C:
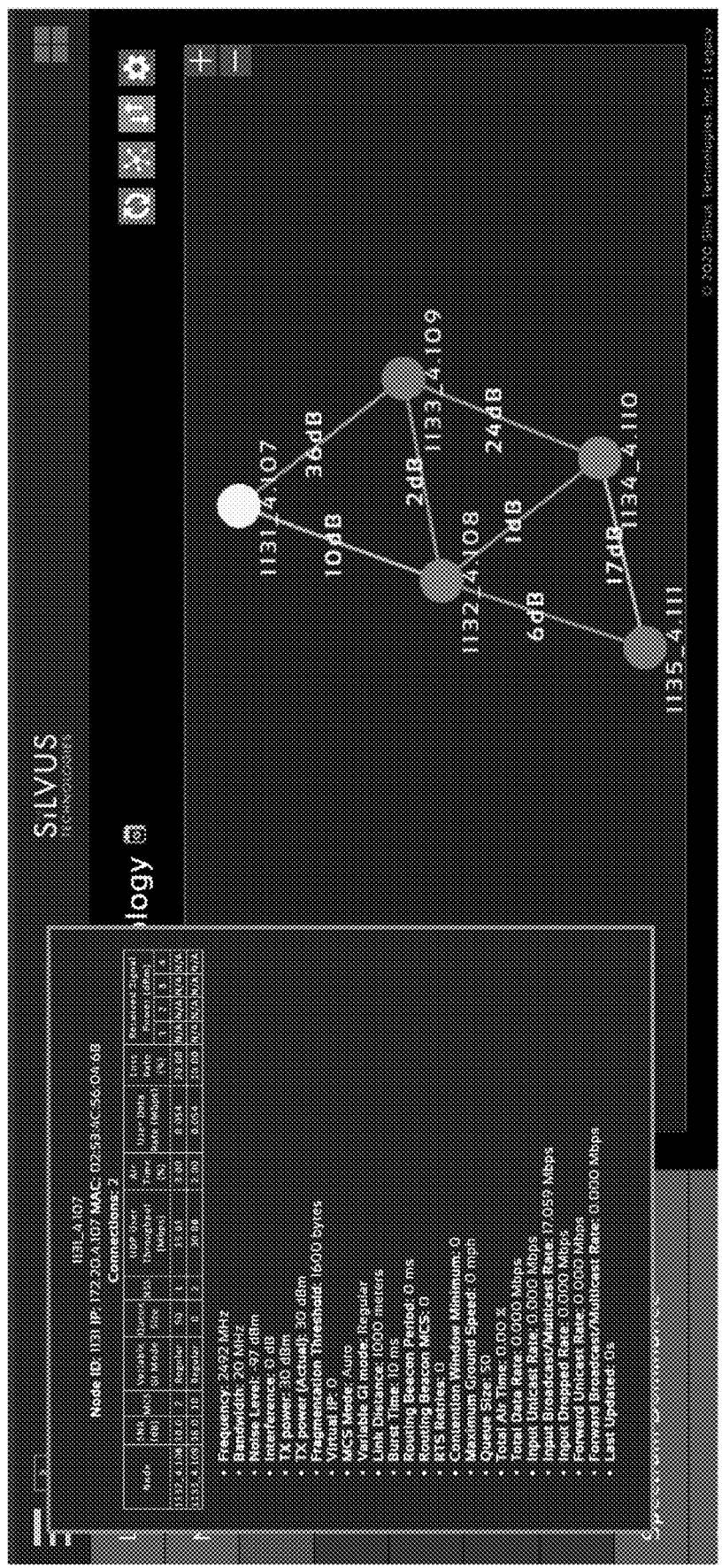

In another example, as illustrated in FIG. 7C, a user may retrieve information associated with a one or more nodes in a network by interacting with the diagram 620. For example, the user may scroll over or click on a node to retrieve information associated with the node. The information associated with a node may be displayed in a window 642 near, on, or in the diagram 620. The information can include a node ID, IP, MAC, connections, node name, SNR, MCS, variable GI mode, queue size NSS, UDP User throughput, air time, user data rate, loss rate, and received signal power associated with connections to the node. Additionally or alternatively, the information can include frequency, bandwidth, noise level, interference, TX power, TX power (Actual), fragmentation threshold, virtual IP, MCS mode, variable GI mode, link distance, burst time, routing beacon period, routing beacon MCS, RTS retries, contention window minimum, maximum ground speed, queue size, total air time, total data rate, input unicast rate, input broadcast/multicast rate, input dropped rate, forward unicast rate, forward broadcast/multicast rate, and last updated. FIG. 7C-1 illustrates an alternative configuration of displayed information.

Node ID can include the unique node ID assigned to each node at time of manufacture. IP can include the IP address of the node. MAC can be the MAC address of the node. Connections can be the number of direct connections to the node. Frequency can be the RF center frequency of the node. Bandwidth can be the RF bandwidth of the node. Noise Level can be the received noise level of the node. Interference can be the approximate in-band interference level of the node. TX Power can be the total target transmit power of the node. TX Power (Actual) can be the actual transmit power of the node. This value may differ from the target transmit due to temperature variation or inability to transmit a clean signal with the selected MCS at the target power. Fragmentation threshold can be a chosen fragmentation threshold of the node. Virtual IP can be the secondary IP address of the node (which may be 0 if none is set). MCS mode can be the transmit MCS of the node. Variable GI mode can be the variable GI mode setting for this node. Distance can be the link distance setting of the node. Burst Time can be the burst time setting of the node. Routing Beacon period can be the routing beacon period setting of the node. RTS Retries can be the RTS retry setting of the node or radio. Contention window minimum can be the low priority contention window minimum setting of the node. Maximum ground speed can be the maximum ground speed setting of the node. Queue size can include the number of packets currently waiting to be transmitted at the node. Total air time can include the total percentage of air time being used by this radio or node. Total data rate can include the total data rate in Mbps being transmitted from this radio or node. Input unicast rate can include the total data rate pushed into the radio as Unicast. Input Broadcast/Multicast Rate can include the total data pushed into the radio as Multicast. Input Dropped Rate can include the total data rate dropped by the radio. Forwarded Unicast Rate can include the total data rate forwarded by the radio as Unicast. Forwarded Broadcast/Multicast Rate can include the total data rate forwarded by the radio as Multicast. Last Updated can include the duration that has passed in seconds since last update.

Figure 7D:
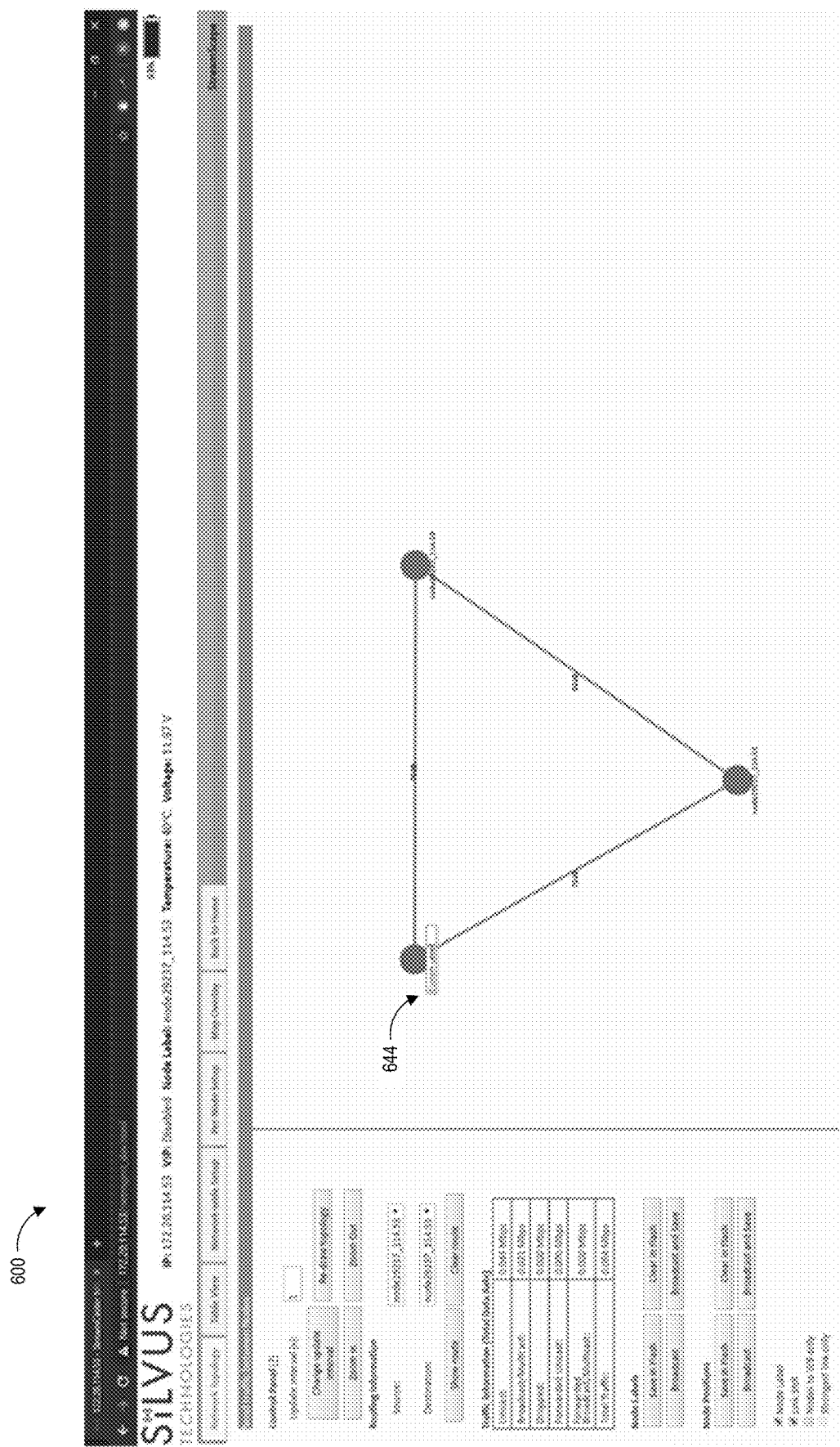
FIG. 7D illustrate further example interactions with an example large network topology interface.

As illustrated in FIG. 7D, a user may interact with a diagram 620 by customizing labels 644 on the diagram. Labels 644 can include node, link, or other labels. Customizing a label can be done by clicking or double-clicking on a part of the diagram 620, such as a node name or link name and typing in a new name. Once this is done, the label may be saved automatically or the user may save the label by, for example, hitting enter on a keyboard. In some examples, where a user does not save the label by hitting enter, the label may change back to what it was. Advantageously, this feature may enable quick identification of nodes in the field and is especially useful in mission critical situations with many mobile assets.

In some examples, a user can save labels by interacting with the control panel 602. For example, a user may click on the 'Save Labels in Flash' button in the left pane to store the node names to the radio's flash memory. This will store the names on the radio even after the radio is powered off. The saved labels can also be cleared back to the defaults by clicking 'Clear Labels in Flash'. The node labels set in one radio can also be broadcasted to other radios in the network by clicking the 'Broadcast Node Labels' button.

2. Table View of Network

Figure 8A:
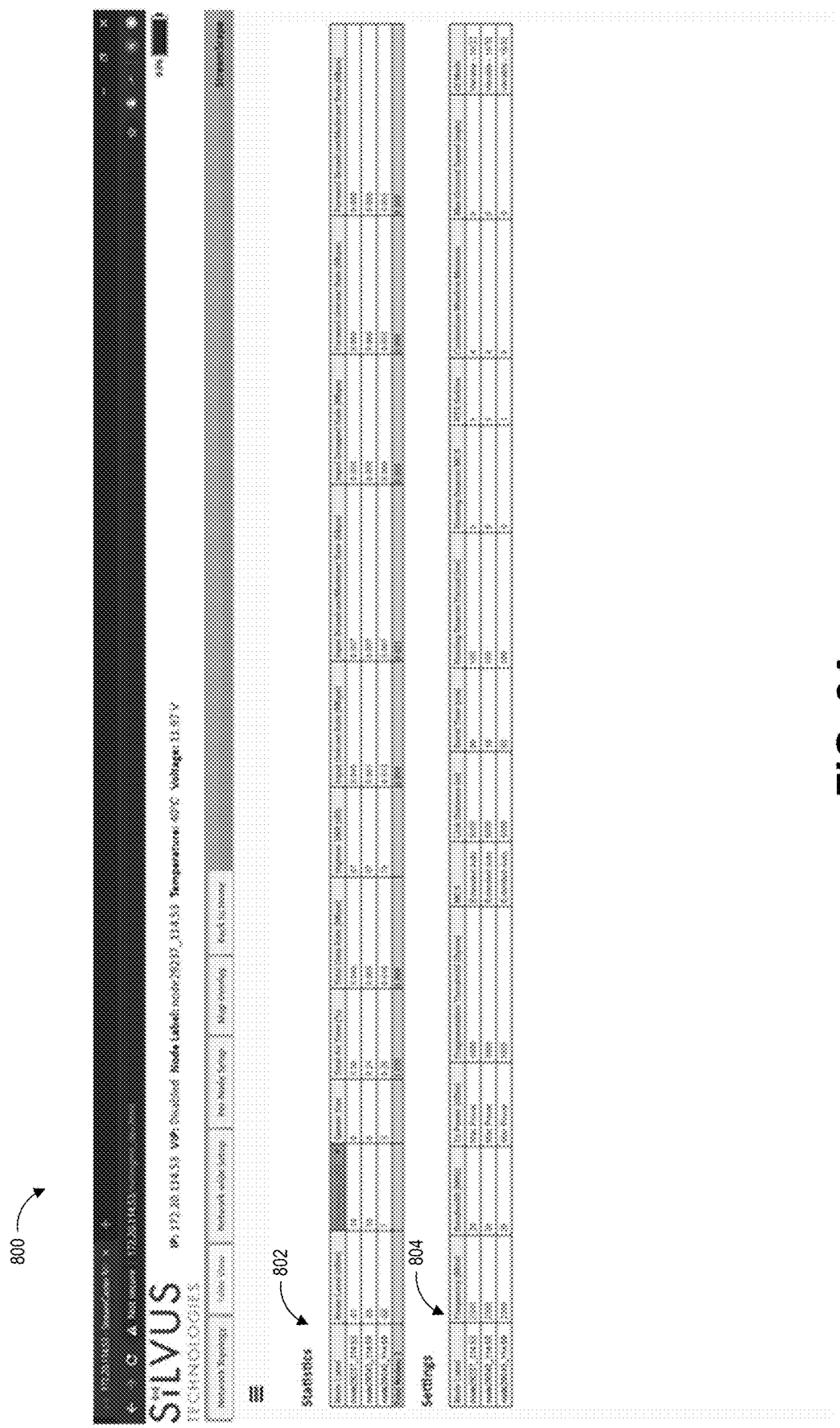
FIGS. 8A-8D illustrate aspects of an example table view interface of an example graphical user interface.
Figure 8B:
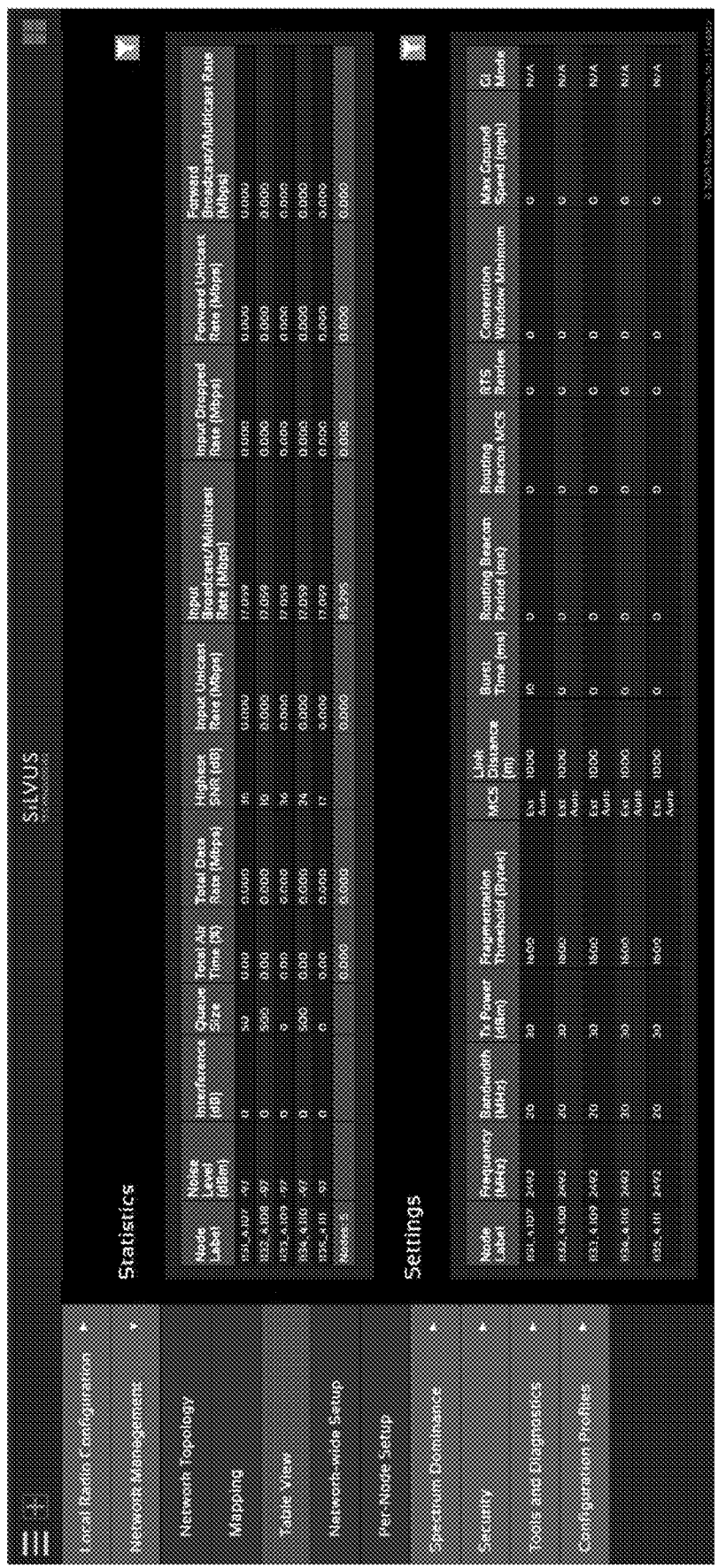

FIGS. 8A-8B illustrate aspects of an example table view interface 800 of an example network. The table view 800 can show information associated with the network. For example, the table view 800 can show statistics 802 or setting profiles 804.

The statistics 802 can include information associated with one or more nodes in the network, such as the number of nodes in the network, node labels for one or more nodes in the network, noise level, interference, queue size, total air time, total data rate, highest SNR, input unicast rate, input broadcast/multicast rate, input dropped rate, forward unicast rate, forward broadcast/multicast rate, or other information associated with one or more nodes in the network.

The settings 804 can include information associated with the one or more nodes in the network, such as node labels for one or more nodes in the network, frequency, bandwidth, TX power, fragmentation threshold, MCS, link distance, burst time, routing beacon period, routing beacon MCS, RTS retries, contention window minimum, max ground speed, GI mode, or other settings associated with one or more nodes in the network.

Figure 8C:
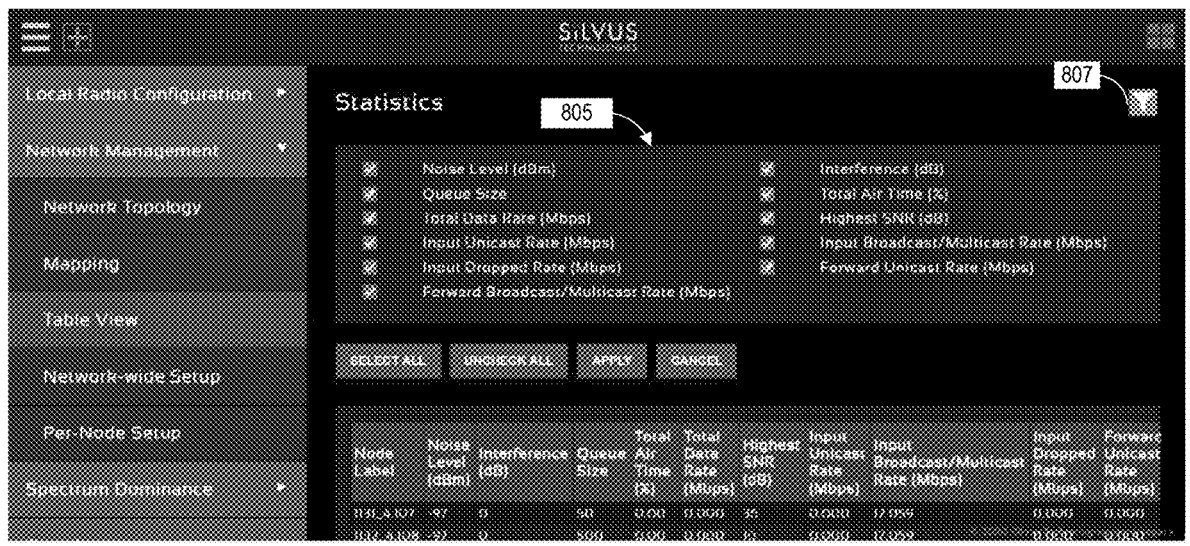
Figure 8D:
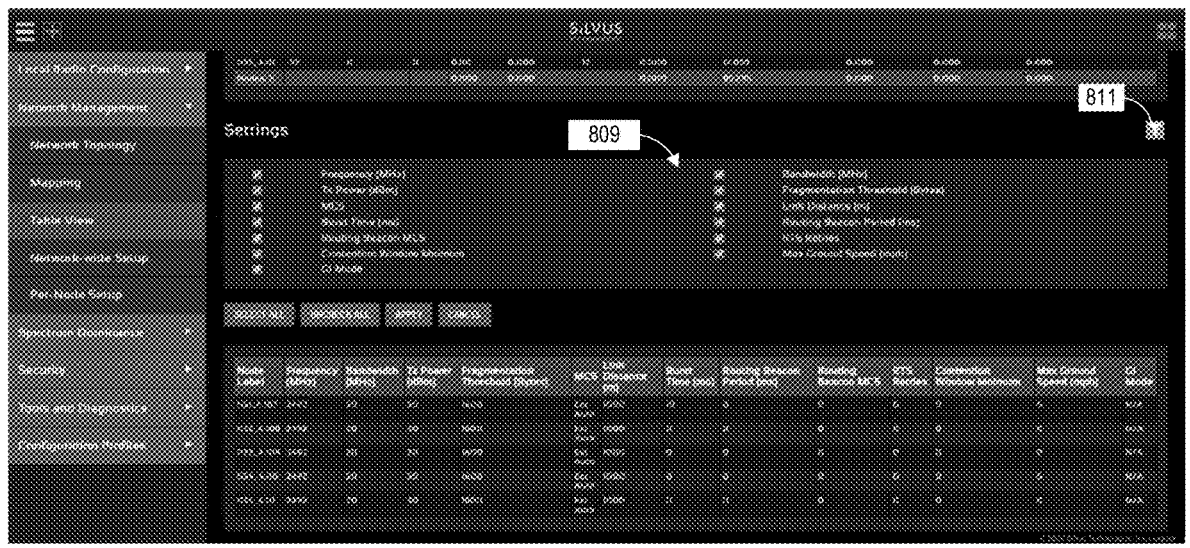

In some examples, users can select or modify the information displayed in the table view. For example, a user may select statistics or settings to display through a drop-down menu or other interactive component. FIGS. 8C-8D illustrate example configurations of the interface 800 that may include an interactive component to modify information. For example, FIG. 8C illustrates an example menu 805 may be accessed, hidden, or displayed by an access button 807. The menu 805 may include options to select one or more values for display relating to network statistics in the interface 800, such as noise level, queue size, total data rate, input unicast rate, input dropped rate, forward broadcast/multicast rate, interference, total air time, highest SNR, input broadcast/multicast rate, forward unicast rate, the like or a combination thereof. In another example, FIG. 8D illustrates an example menu 809 may be accessed, hidden, or displayed by an access button 811. The menu 809 may include options to select one or more values for display relating to network settings, such as frequency, Tx power, MCS<burst time, routing beacon MCS, contention window minimum, GI mode, bandwidth, fragmentation threshold, link distance, routing beacon period, RTS retries, max ground speed, the like or a combination thereof.

3. Map View of Network

Figure 9A:
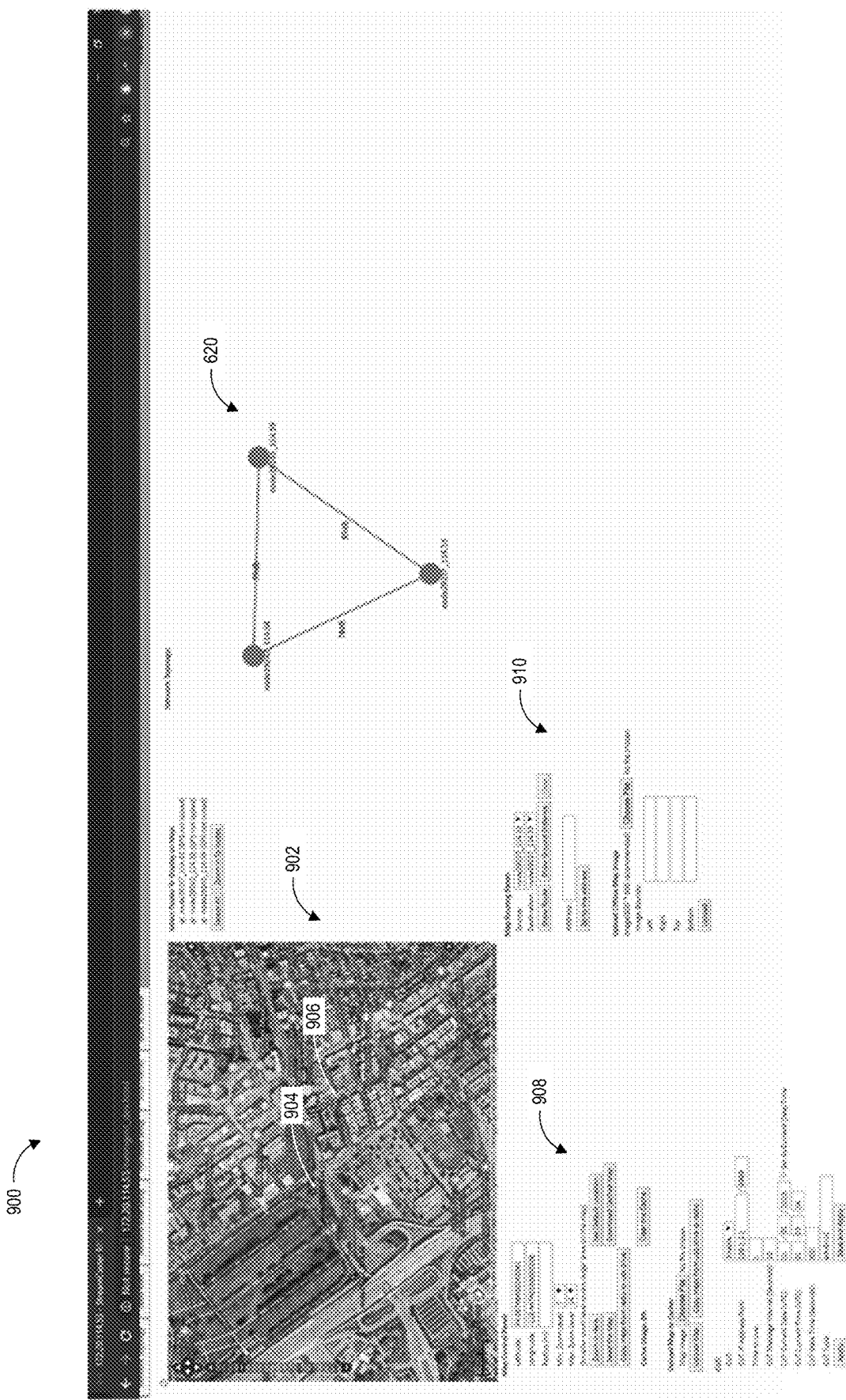
FIGS. 9A-9D illustrate aspects of an example map view interface of an example graphical user interface.

In some examples, an interface may include a map view of a network topology. FIGS. 9A-9D illustrates an example map view 900 of an example network. As illustrated in FIG. 9A, a map view interface 900 can include a map overlay 902, a map control panel 908, and a map routing panel 910.

The map overlay 902 can include a map, such as an openstreet map, google maps, google satellite, other online map, an offline map image, custom image, or other map or image. Locations 904 of one or more nodes can be displayed on the map overlay 902 at points corresponding to the physical locations of the one or more nodes. Additionally or alternatively, locations 904 of one or more nodes can be moved manually by a user to a location on the map. Links 906 between the one or more nodes can be displayed on the map overlay 902 between the displayed locations 904 of the nodes. Graphical representations of the nodes and the links may correspond to the route information on the network at those links and nodes. For example, route health can be indicated by color. In some examples, too many packets are being routed through a single node, a color of a node 622 may change from green to yellow to red as the packet queue increases. Advantageously, the color change may allow a user to recognize issues related to the route and give the user the opportunity to rearrange the network accordingly. In some examples, a link with traffic of greater than 20 dB may be green, a link with 10-20 dB may be orange, and a link with traffic of less than 10 dB. In some examples, a node with less than 10 packets in queue may be green, a node with between 10 and 100 packets in queue may be orange, and a node with greater than 100 packets in queue may be red.

Figure 9B:
Figure 9C:

As illustrated in FIG. 9B, in some examples, a map view interface may include one or more selections or menus 912 associated with a base layer map and overlay of devices on the network. The menu 912 may be displayed adjacent, on, or near the map. In some examples, selections in the menu 912 may include base layer selections to modify the base layer of the map view, such as OpenStreet Maps or a variation of OpenStreet Maps, Google Maps, Google Satellite, or no map. Other base layers may also be possible. In some examples, selections in the menu 912 may include overlay selections to modify overlay data displayed over the base layer, such as SNR data, line data, or node data. Other overlay data may also be possible. In some examples, the overlay data may share properties or colors with the network topology diagram, such as color, size, or labeling of the nodes and lines. A placement of the overlay nodes and lines on the base layer may be based on GPS data or other location data. For example, an interface may display a node at an approximate real world location as represented on a base layer map.

A map control panel 908 can include controls and information associated with the map overlay 902. For example, the map control panel 908 can include input settings for map latitude, longitude, and radius. Additionally or alternatively, the map control panel 908 can include zoom settings, such as minimum and maximum zoom settings and interactive components for zooming in and out of the map. Additionally or alternatively, the map control panel 908 can include controls for uploading or downloading a map for use with the network or node. In some example, a control panel 908 may configured be hidden or displayed using a control panel access button 913 that may be part of the interface 900. The control panel may be displayed and/or populated adjacent to the map view 915. In some examples, the control panel may be displayed adjacent to an interface menu 309. A control panel 908 may be displayed in whole or in part on a single screen. In some examples, the control panel may be scrollable so that different aspects of the control panel may be displayed with a user's scrolling.

The map routing panel 910 can include controls and information associated with nodes or links that may be displayed on the map overlay 902. For example, the map routing panel 910 can include input settings for source and destination nodes. Additionally or alternatively, the controls can include interactive components for show a route, ground distance, or other information relating to the source and destination nodes. When the route is selected, a link between the two nodes may be graphically displayed on the map overlay between the source and destination nodes. When the ground distance is selected, a physical distance between the source and destination node made be displayed on the map overlay or otherwise on the map view 900.

In some examples, a user may be able to zoom in or zoom out of one or more portions of the map 915 by touching or otherwise interacting with portions of the map. Zoom interactions may include, but are not limited to pinching the map with two fingers. In another example, a user may be able to change the map view 915 by touching or otherwise interacting with the map 915. For example, a user may scroll through the map using a scroll bar or move the map with a touch based interaction.

Figure 9D:
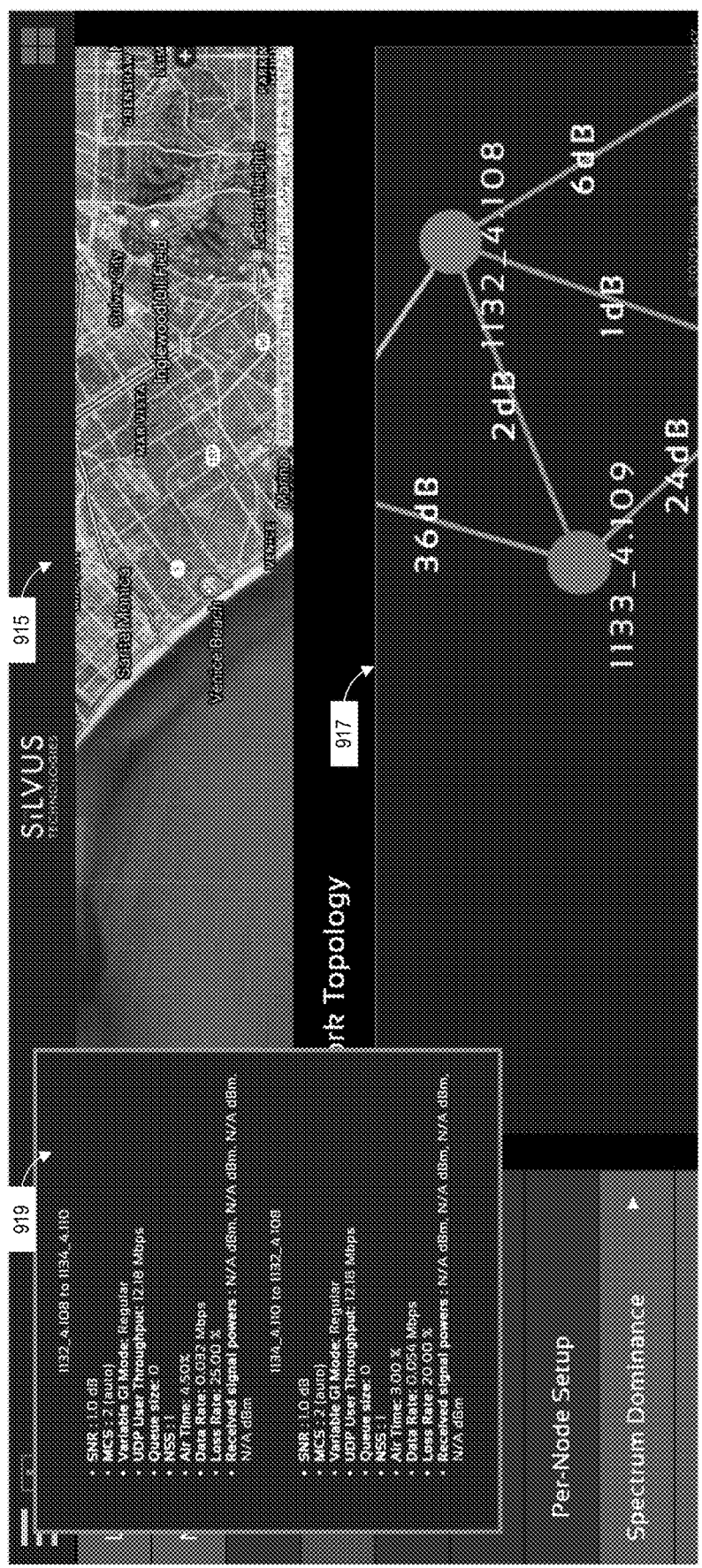

As illustrated in FIG. 9D, a map interface 900 may additionally display a network topology diagram 917 adjacent to the map view 915. Advantageously, displaying both the network topology diagram 917 and the map view 915 in the same screen space or interface space may facilitate easier understanding of the status of a network being displayed. For example, a map view 915 may allow a user to understand physical distances and location information associated with a network and a network topology diagram 917 may allow a user to quickly perceive the interactions of the network that may be large and otherwise difficult to perceive in a map setting.

In some examples, as illustrated in FIG. 9D, one or more information display aspects of a network interface, such as an overlay 919 of information relating to network traffic, node information, the like or a combination thereof.

I. Example Network Wide Setup

Figure 9E:
FIG. 9E illustrates example aspects of network wide setup for a graphical user interface.

FIG. 9E illustrates an example network-wide setup that may be part of a network management aspect of an interface. The network-wide setup may include one or more settings for managing configurations of a plurality of devices on a network. Advantageously, a network-wide setup may allow a user to perform updates on a plurality of devices at the same time as opposed to individually updating each device. In some examples, settings may include frequency, bandwidth, TX power, fragmentation threshold, MCS mode, GI mode, link distance, maximum ground speed, burst time, routing beacon period, routing beacon MCS, RTS retries, contention window minimum (low priority), multicast stream configuration for one or more multicast streams, a broadcast update interval setting, the like or a combination thereof.

J. Example Per-Node Setup

Figure 9F:
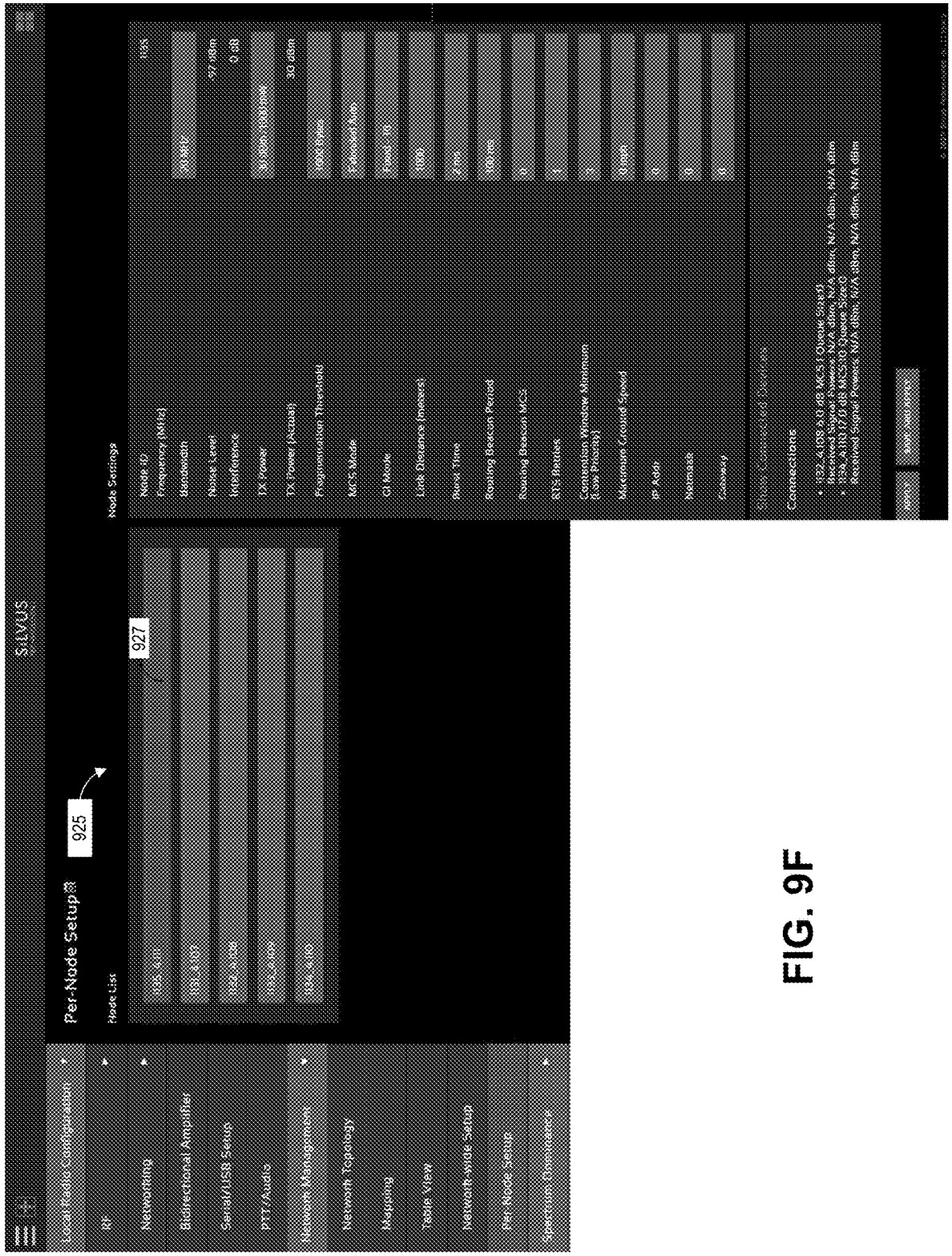
FIG. 9F illustrates example aspects of per node setup for a graphical user interface.

FIG. 9F illustrates an example per-node setup that may be part of a network management aspect of an interface. The per-node setup may include one or more settings associated with individual nodes. In some examples, a per-node setup may include a list of available nodes 925. A user may select a node 927 to update from the list 925. An interface may then display node information or a plurality of node settings that may allow a user to update a configuration of the node or view a current configuration of the node, including but not limited to Node ID, Frequency, Bandwidth, Noise level, interference, TX power, actual TX power, actual TX power, fragmentation threshold, MCS mode, GI mode, link distance, burst time, routing beacon period, routing beacon MCS, RTS retries, contention window minimum (low priority), maximum ground speed, IP address, netmask, gateway, the like or a combination thereof. In some examples, an interface may additionally or alternatively display information related to devices connected to the selected node on the network.

K. Example Spectrum Scan Interface

Figure 10:
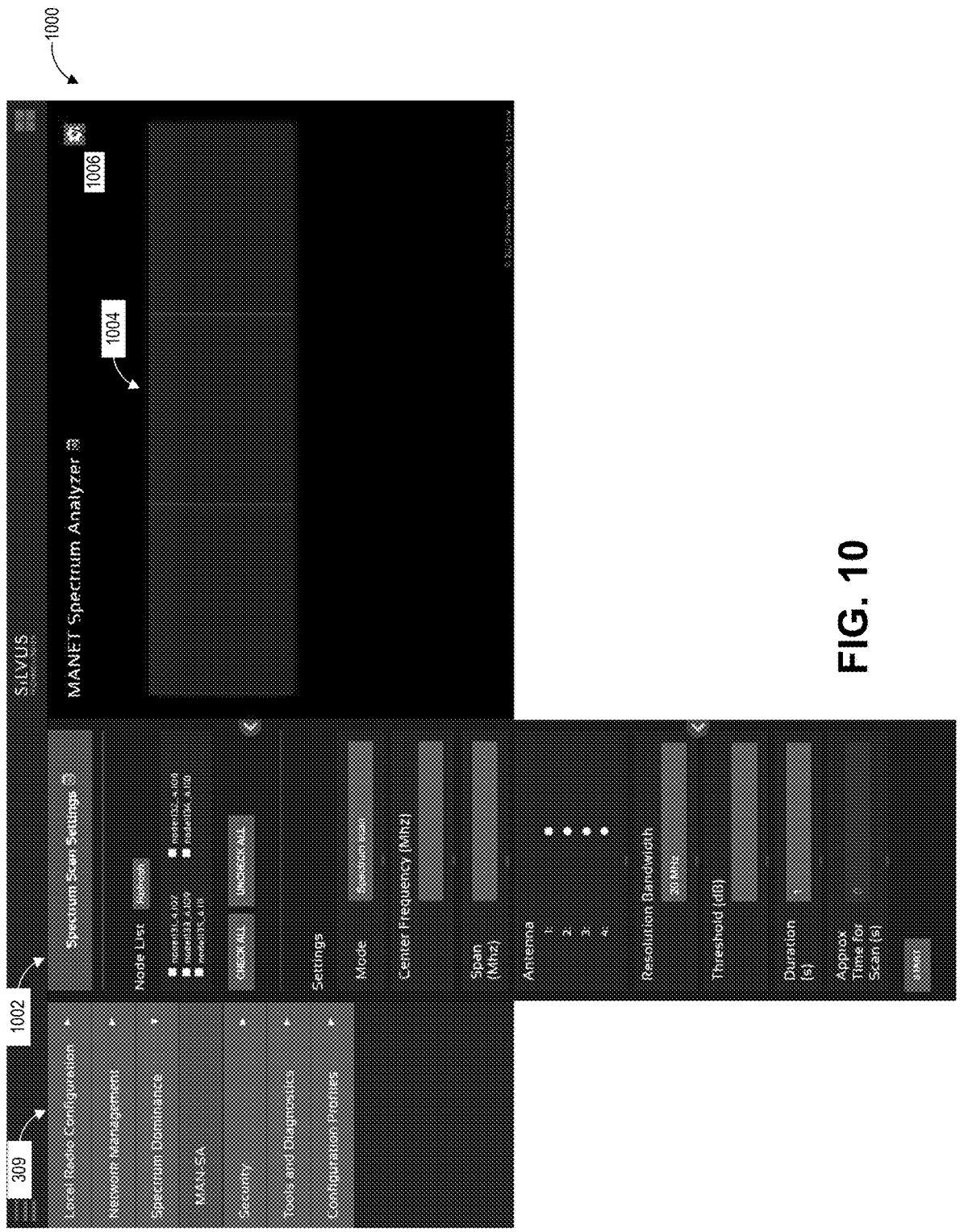
FIG. 10 illustrates aspects of an example spectrum scan configuration of a graphical user interface.

FIG. 10 illustrates an example spectrum scan interface 1000. The spectrum scan interface may allow a user to perform a spectrum scan or a spectrum analysis. In some examples, a spectrum scan interface 1000 may include an analysis display area 1004 configured to display information associated with a resulting spectrum scan analysis after a spectrum scan is configured and run by a user. In some examples, a spectrum scan interface 1000 may include a spectrum scan control panel 1002 for configuring and running a spectrum scan. In some examples, the control panel 1002 may be accessed, hidden, or displayed using an access button 1006. A control panel 1002 may be displayed adjacent to the display area 1004 or menu 309.

A control panel 1002 may include settings for configuring and running a spectrum scan. Settings may include, but are not limited to a node selection list to select one or more nodes on the network for analysis. Additionally or alternatively, a setting for type of analysis, such as a spectrum scan or other analysis. In some examples, such as for a spectrum scan, a setting may include settings for a center frequency, span, selection of antenna, resolution bandwidth, threshold (dB), duration (s), approx. time for scan(s), the like or a combination thereof.

L. Example Interface Settings

Figure 11:
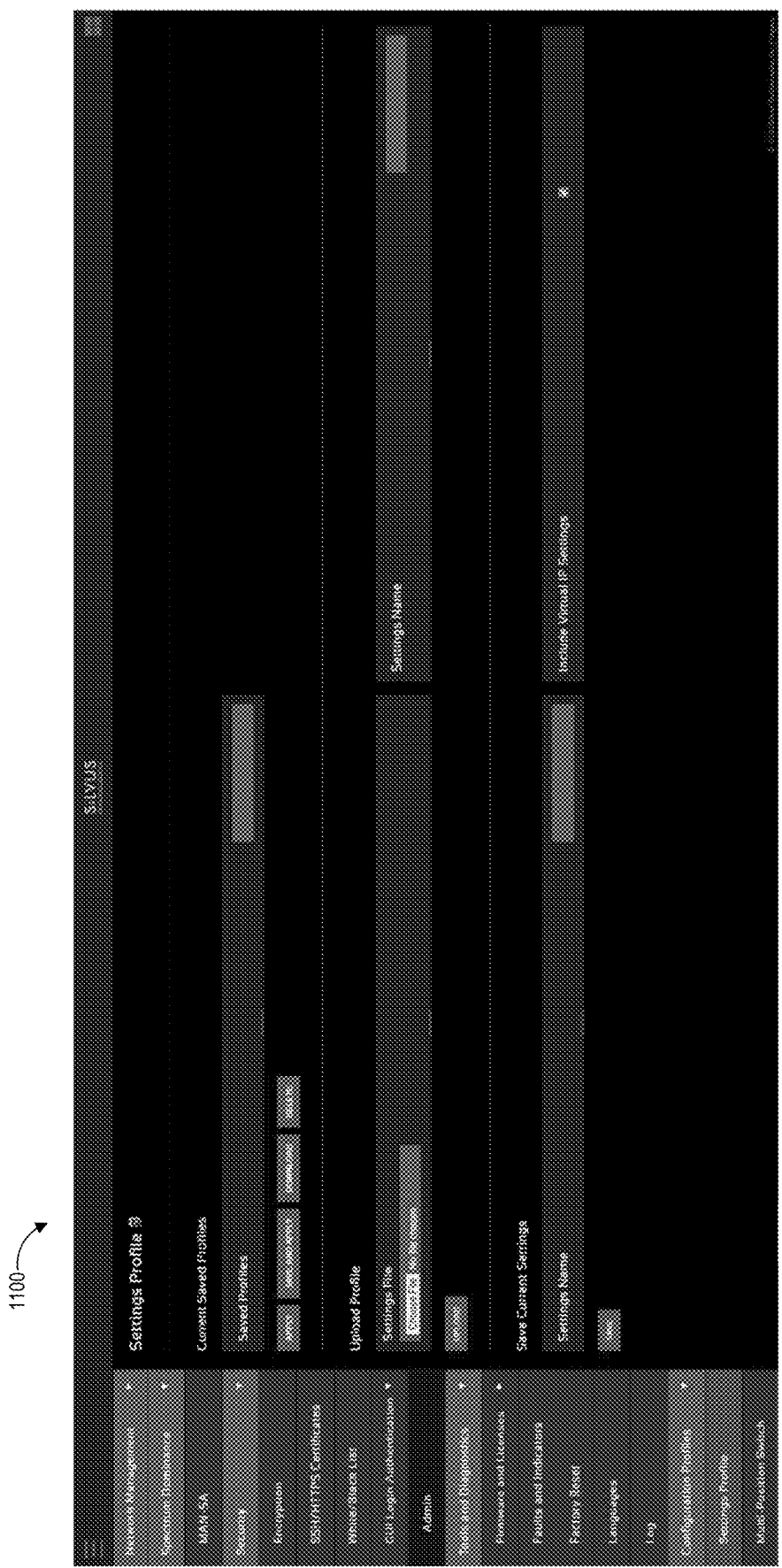
FIG. 11 illustrates aspects of an example settings profile configuration of a graphical user interface.

FIG. 11 illustrates an example settings profile interface 1100 that may be part of a graphical user interface. The settings profile interface 1100 may include settings associated with profiles for a network, device, or user. For example, a settings profile may include a profile associated with a configuration of the interface associated with a particular device, a profile associated with a configuration of a device or network, or a profile associated with a user of the device. In some examples, settings profile interface 1100 may include settings to view or access currently saved profiles, upload profiles, or save profiles.

M. Example Hardware Systems

Examples of hardware that may be used in conjunction with aspects of a graphical user interface, such as disclosed herein, may include, but are not limited to a wireless communication system, such as described in U.S. Patent Publication No. 2020/0260464, titled "SINGLE TRANSCEIVER-DSA VIA MAC-UNDERLAY SENSING AND SIGNALING," published Aug. 13, 2020, which is incorporated by reference herein. The examples in U.S. Patent Publication No. 2020/02460464, titled "SINGLE TRANSCEIVER-DSA VIA MAC-UNDERLAY SENSING AND SIGNALING," published Aug. 13, 2020, are intended to illustrate functionalities that can be provided by some embodiments of the graphical user interface and are not intended to be limiting.

N. Terminology

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system comprising:
a non-transitory computer storage medium configured to at least store computer-readable instructions; and
one or more hardware processors in communication with the non-transitory computer storage medium, the one or more hardware processors configured to execute the computer-readable instructions to at least:
for each radio of the plurality of radios, assign a radio into a cluster of radios comprising a subset of the plurality of radios based on shared network traffic within the subset of the plurality of radios;
determine, based on a user selection, a root node for display comprising a first radio of a plurality of radios;
select for display at least one signal route involving the root node between each of the plurality of radios;
display, within a window on a display, a representation of each radio of the plurality of radios within the radio's assigned cluster; and display, within the window on the display, a representation of the selected at least one signal route based on route health.

2. The system of claim 1, wherein the representation of each radio and the representation of the selected at least one signal route are displayed on a single screen without scrolling.

3. The system of claim 1, wherein the representation of each radio and the representation of the selected at least one signal route are displayed to improve clarity of the graphical display of traffic information between each radio.

4. The system of claim 1, wherein the one or more hardware processors are configured to execute the computer-readable instructions to:
receive an updated user selection of a new root node comprising a second radio of the plurality of radios;
select for display at least one new signal route involving the new root node between each of the plurality of radios; and
display, within the window on the display, a representation of the selected at least one new signal route based on route health.

5. The system of claim 4, wherein the location of each radio of the plurality of radios within the window on the display is not changed.

6. The system of claim 4, wherein the representation of the plurality of selected at least one signal route is not displayed simultaneously with the representation of the plurality of selected at least one new signal route.

7. The system of claim 1, wherein the cluster of radios comprises a cluster source node and at least one peripheral node.

8. The system of claim 7, wherein signal routes between the radios in the cluster involve the cluster source node.

9. The system of claim 8, wherein the representation of the at least one signal route comprises a representation of a signal route between the cluster source node and the root node.

10. The system of claim 1, wherein to assign the radio into a cluster of radios, the one or more hardware processors are configured to execute the computer-readable instructions to: assign radios to a cluster of radios that share traffic with at least one cluster source node radio.

11. The system of claim 1, wherein the selected at least one signal route excludes routes that do not include traffic that originated from or is destined for the root node.

12. The system of claim 1, wherein the one or more hardware processors are configured to execute the computer-readable instructions to: select a color of the representation of each radio based on the traffic data associated with each radio.

13. The system of claim 12, wherein to select a color of the representation based on the received information, the one or more hardware processors are configured to: determine that the number of data packets falls within a range of values.

14. The system of claim 13, wherein the range of values comprises greater than 100 data packets.

15. The system of claim 13, wherein the range of values comprises between 10 and 100 data packets.

16. The system of claim 13, wherein the range of values comprises less than 10 data packets.

17. The system of claim 1, wherein the representation of the selected at least one signal route comprises a red line when there is greater than 20 dB of traffic associated with the route.

18. The system of claim 1, wherein the representation of the selected at least one signal route comprises a yellow line when there is between 10 dB and 20 dB of traffic associated with the route.

19. The system of claim 1, wherein the representation of the selected at least one signal route comprises a green line when there is less than 10 dB of traffic associated with the route.

20. The system of claim 1 wherein the one or more hardware processors are configured to execute the computer-readable instructions to: update a location on the display of a representation of a selected radio of the plurality of radios based on a user input.

21. The system of claim 1, wherein one or more hardware processors are configured to execute the computer-readable instructions to: display the representation of each of the plurality of radios at a location on the display corresponding to a location in a force directed graph configuration.

22. The system of claim 1, wherein one or more hardware processors are configured to execute the computer-readable instructions to: display the representation of each of the plurality of radios at a location on the display corresponding to a location on a grid.

23. The system of claim 1 wherein the one or more hardware processors are configured to execute the computer-readable instructions to:
determine a test source radio and a test destination radio of the plurality of radios;
generate test traffic between the test source radio and the test destination radio; and
display information associated with the test traffic in a second window on the display.

* * * * *